US012805540B2

(12) United States Patent
Lerman et al.

(10) Patent No.: US 12,805,540 B2
(45) Date of Patent: Nov. 24, 2026

(54) DRINK MAKER HAVING PHASE CHANGE DETECTION AND NOTIFICATION

(71) Applicant: SharkNinja Operating LLC, Needham, MA (US)

(72) Inventors: Michael Lerman, Providence, RI (US); Vipul Mone, Brighton, MA (US)

(73) Assignee: SharkNinja Operating LLC, Needham, MA (US)

( * ) Notice: Subject to any disclaimer, the term of this patent is extended or adjusted under 35 U.S.C. 154(b) by 0 days.

(21) Appl. No.: 18/817,411

(22) Filed: Aug. 28, 2024

(65) Prior Publication Data

US 2025/0234883 A1 Jul. 24, 2025

Related U.S. Application Data

(63) Continuation-in-part of application No. 18/423,894, filed on Jan. 26, 2024, now Pat. No. 12,593,855,
(Continued)

(51) Int. Cl.
*A23G 9/04* (2006.01)
*A23G 9/22* (2006.01)

(52) U.S. Cl.
CPC ............. *A23G 9/045* (2013.01); *A23G 9/228* (2013.01)

(58) Field of Classification Search
CPC ................................ A23G 9/228; A23G 9/045
See application file for complete search history.

(56) References Cited

U.S. PATENT DOCUMENTS 531,718 A 1/1895 Detwiler et al.
718,319 A 1/1903 Cunningham
(Continued)

FOREIGN PATENT DOCUMENTS

AU 2015202472 A1 11/2015
CA 2465482 C 2/2008
(Continued)

OTHER PUBLICATIONS

Complaint For Declaratory Judgment, *Foshan Macjerry Technology Co., Ltd.* v. *SharkNinja Operating LLC*, No. 2:25-cv-00954 (W.D. Wash. May 19, 2025), 59 pages.
(Continued)

*Primary Examiner* — Erik Kashnikow
*Assistant Examiner* — Steven N Leff
(74) *Attorney, Agent, or Firm* — The Webb Law Firm

(57) ABSTRACT

A drink maker is provided for phase change detection and notification. The drink maker includes a mixing vessel arranged to receive a drink product. The drink product is mixed within the mixing vessel. The drink maker also includes a cooling circuit configured to cool the drink product within the mixing vessel. The drink maker further includes a temperature sensor configured to repeatedly detect a temperature associated with the drink product and output temperature signals indicative of the detected temperatures. The drink maker further includes a controller. The controller is configured to determine that a condition associated with a phase change of the drink product has been satisfied based on the temperature signals. The controller is also configured to, in response to determining the condition, alert a user of the drink maker.

10 Claims, 26 Drawing Sheets

Related U.S. Application Data which is a continuation-in-part of application No. 18/415,817, filed on Jan. 18, 2024.

(60) Provisional application No. 63/669,144, filed on Jul. 9, 2024.

(56) References Cited

U.S. PATENT DOCUMENTS 789,599 A 5/1905 Flatau
970,823 A 9/1910 Hopkins
975,380 A 11/1910 Berntson
1,425,814 A 8/1922 Valerius et al.
1,685,189 A 9/1928 Cover
1,818,896 A 8/1931 Kohr
1,896,081 A 2/1933 Hampson
1,953,766 A 4/1934 McMath et al.
2,064,861 A 12/1936 Stroud
2,134,261 A 10/1938 Oswell et al.
2,136,224 A 11/1938 Weinreich
2,141,045 A 12/1938 Ruttiman
2,188,551 A 1/1940 Kaltenbach et al.
2,252,205 A 8/1941 Reynolds
2,278,125 A 3/1942 Landgraf
2,284,155 A 5/1942 Landgraf
2,316,165 A 4/1943 Howser
2,352,205 A 6/1944 Karlson
2,352,232 A 6/1944 Strauss
2,411,081 A 11/1946 Carothers
2,541,814 A 2/1951 Gaddini
2,794,627 A 6/1957 Rodwick
2,828,113 A 3/1958 Knibb
2,896,421 A 7/1959 Rader
2,897,862 A 8/1959 Malz et al.
2,928,660 A 3/1960 Knibb
2,972,239 A 2/1961 Vasby
3,155,053 A 11/1964 Vito et al.
3,175,594 A 3/1965 Jepson et al.
3,191,398 A 6/1965 Rader
3,228,203 A 1/1966 Swenson
3,240,246 A 3/1966 Dewenter
3,292,911 A 12/1966 Paul
3,300,094 A 1/1967 Rockola
3,319,436 A 5/1967 Wilch
3,400,551 A 9/1968 Booth et al.
3,460,716 A 8/1969 Thomas
3,460,717 A 8/1969 Thomas
3,465,540 A 9/1969 Carpigiani
3,580,812 A 5/1971 Bender et al.
3,632,245 A 1/1972 Getman
3,661,303 A 5/1972 Prosenbauer
3,822,565 A 7/1974 Arzberger
3,939,667 A 2/1976 Halverson
3,988,902 A 11/1976 Jacobs
4,078,263 A 3/1978 Campbell
4,084,407 A 4/1978 Anhalt
4,108,054 A 8/1978 Klocker et al.
4,157,017 A 6/1979 Reid
4,162,127 A 7/1979 Wakeman et al.
4,201,112 A 5/1980 Owens
4,241,590 A 12/1980 Martineau
4,245,680 A 1/1981 Greenfield, Jr. et al.
4,275,567 A 6/1981 Schwitters
4,332,539 A 6/1982 Zani
4,394,938 A 7/1983 Frassanito
4,401,607 A 8/1983 Child et al.
4,429,549 A 2/1984 Randolphi
4,476,146 A 10/1984 Manfroni
4,487,024 A 12/1984 Fletcher et al.
4,521,116 A 6/1985 Adsit
4,528,824 A 7/1985 Herbert
4,547,076 A 10/1985 Maurer
4,637,221 A 1/1987 Levine
4,653,281 A 3/1987 Van Der Veer
4,664,529 A 5/1987 Cavalli
4,681,030 A 7/1987 Herbert
4,681,458 A 7/1987 Cavalli
4,698,984 A 10/1987 Manfroni
4,708,487 A 11/1987 Marshall
4,711,374 A 12/1987 Gaunt et al.
4,711,376 A 12/1987 Manfroni
4,712,920 A 12/1987 Ames et al.
4,725,008 A 2/1988 Rebordosa et al.
4,736,593 A 4/1988 Williams
4,740,088 A 4/1988 Kelly, Jr.
4,796,440 A 1/1989 Shiotani et al.
4,900,158 A 2/1990 Ugolini
4,906,486 A 3/1990 Young
4,964,542 A 10/1990 Smith
5,020,698 A 6/1991 Crossley
5,158,506 A 10/1992 Kusano et al.
5,205,129 A 4/1993 Wright et al.
5,212,954 A 5/1993 Black et al.
5,305,923 A 4/1994 Kirschner et al.
5,363,746 A 11/1994 Gordon
5,389,209 A 2/1995 Paquette
5,419,150 A 5/1995 Kaiser et al.
5,463,878 A 11/1995 Parekh et al.
5,524,451 A 6/1996 Tippmann
5,603,229 A 2/1997 Cocchi et al.
5,644,926 A 7/1997 Kress
5,676,462 A 10/1997 Fraczek et al.
5,692,392 A 12/1997 Swier
5,706,720 A 1/1998 Goch et al.
5,735,602 A 4/1998 Salvatore
5,788,370 A 8/1998 Pedrazzi
5,799,726 A 9/1998 Frank
5,823,672 A 10/1998 Barker
5,906,105 A 5/1999 Ugolini
5,967,226 A 10/1999 Choi
6,010,035 A 1/2000 Estruch
6,055,900 A 5/2000 Bunn
6,058,721 A 5/2000 Midden et al.
6,070,417 A 6/2000 Benson
6,082,123 A 7/2000 Johnson
6,119,472 A 9/2000 Ross
6,176,090 B1 1/2001 Ufema
6,182,862 B1 2/2001 McGill
6,220,047 B1 4/2001 Vogel et al.
6,253,573 B1 7/2001 Schwitters et al.
6,264,066 B1 7/2001 Vincent et al.
6,301,918 B1 10/2001 Quartarone et al.
6,349,852 B1 2/2002 Ford
6,370,892 B1 4/2002 Ross
6,438,987 B1 8/2002 Pahl
6,490,872 B1 12/2002 Beck et al.
6,513,578 B2 2/2003 Frank
6,546,843 B2 4/2003 Ugolini
6,553,779 B1 4/2003 Boyer et al.
6,557,835 B2 5/2003 Dijk
6,619,056 B2 9/2003 Midden et al.
6,622,511 B2 9/2003 Ashworth et al.
6,637,214 B1 10/2003 Leitzke et al.
6,679,314 B2 1/2004 Frank
6,694,752 B2 2/2004 Nomura et al.
6,705,106 B1 3/2004 Cunha et al.
6,735,967 B1 5/2004 Bischel et al.
6,761,036 B2 7/2004 Teague et al.
6,766,650 B2 7/2004 Cunha et al.
6,772,675 B2 8/2004 Ervin
D495,915 S 9/2004 Cahen
6,808,305 B2 10/2004 Sharpe et al.
6,817,749 B2 11/2004 Saunders et al.
6,830,239 B1 12/2004 Weber et al.
6,863,916 B2 3/2005 Henriksen et al.
6,907,743 B2 6/2005 Cocchi et al.
6,918,258 B2 7/2005 Cunha et al.
6,923,010 B2 8/2005 Small et al.
6,932,503 B2 8/2005 Fallowes
6,948,327 B2 9/2005 Bischel et al.
7,028,607 B2 4/2006 Zweben
7,047,758 B2 5/2006 Ross
7,100,392 B2 9/2006 Cortese
7,152,765 B1 12/2006 Midden et al.
7,165,699 B2 1/2007 McGill

(56) References Cited

U.S. PATENT DOCUMENTS 7,213,965 B2 5/2007 Daniels, Jr.
7,251,905 B2 8/2007 Doh et al.
7,264,187 B1 9/2007 Kolar
7,269,960 B2 9/2007 Elsom et al.
7,270,473 B2 9/2007 Donthnier et al.
7,275,666 B2 10/2007 Rukavina et al.
7,278,276 B2 10/2007 Boyer et al.
7,278,555 B2 10/2007 McGill
7,451,613 B2 11/2008 Barraclough et al.
7,543,717 B2 6/2009 Hinkle
7,547,135 B2 6/2009 Kocienski
7,587,972 B2 9/2009 Katz et al.
D601,846 S 10/2009 Rousselin et al.
7,603,870 B2 10/2009 Mavridis et al.
7,607,821 B2 10/2009 Schmidt
7,647,782 B2 1/2010 Bucceri
7,648,264 B2 1/2010 Breviere et al.
7,698,899 B2 4/2010 Lewitus et al.
7,712,321 B2 5/2010 Kadyk
7,712,951 B2 5/2010 Bohannon, Jr. et al.
7,726,136 B2 6/2010 Baxter et al.
7,754,266 B2 7/2010 Waletzko et al.
7,870,749 B2 1/2011 Franck et al.
7,878,702 B2 2/2011 Peng
7,908,871 B2 3/2011 Baxter et al.
7,942,094 B2 5/2011 Kounlavong et al.
7,976,883 B2 7/2011 Guerrero et al.
8,016,168 B2 9/2011 Goulet
8,123,075 B2 2/2012 Kadyk
8,157,435 B2 4/2012 Pryor, Jr.
8,289,514 B2 10/2012 Sukavaneshvar et al.
8,297,182 B2 10/2012 Cocchi et al.
8,323,015 B2 12/2012 Day et al.
8,434,319 B2 5/2013 Klier et al.
8,459,043 B2 6/2013 Bertone
8,479,532 B2 7/2013 Cocchi et al.
8,485,393 B2 7/2013 Van Zeeland
8,550,695 B2 10/2013 Conti
8,561,839 B2 10/2013 Cocchi et al.
8,572,998 B2 11/2013 Cocchi et al.
8,584,894 B1 11/2013 Mulvaney et al.
8,584,897 B2 11/2013 Belcham
8,591,097 B2 11/2013 Cocchi et al.
8,616,250 B2 12/2013 Herbert
8,685,477 B2 4/2014 Almblad et al.
8,701,435 B2 4/2014 Gist et al.
8,769,973 B2 7/2014 Leaver et al.
8,770,093 B2 7/2014 Cahen et al.
8,820,213 B2 9/2014 Lang et al.
8,876,366 B2 11/2014 Saubert
8,887,522 B2 11/2014 Grampassi
8,899,063 B2 12/2014 Ugolini
8,998,037 B2 4/2015 Cahen et al.
9,016,077 B2 4/2015 Cho et al.
9,066,529 B2 6/2015 Fassberg et al.
9,089,821 B2 7/2015 Seidler et al.
9,127,881 B2 9/2015 Anderson et al.
9,131,709 B2 9/2015 Hammonds et al.
9,198,536 B2 12/2015 Lardelli et al.
9,233,829 B2 1/2016 Grampassi
9,301,537 B2 4/2016 Cocchi et al.
9,302,233 B1 4/2016 Lowell
9,314,043 B2 4/2016 Grampassi
9,326,529 B2 5/2016 Sipp et al.
9,326,530 B2 5/2016 Ugolini
9,326,531 B1 5/2016 Reich et al.
9,328,948 B2 5/2016 Billman et al.
9,364,114 B2 6/2016 Claesson et al.
9,397,591 B2 7/2016 Hyde et al.
9,398,774 B2 7/2016 Grampassi
9,402,408 B2 8/2016 Cocchi et al.
9,408,495 B2 8/2016 Gugerli et al.
9,420,915 B2 8/2016 Dickson, Jr. et al.
9,457,386 B2 10/2016 Gates et al.
9,462,826 B2 10/2016 Cocchi et al.
9,474,410 B2 10/2016 Hudgins et al.
9,528,740 B1 12/2016 Gist et al.
9,565,868 B2 2/2017 D'Agostino
9,591,871 B2 3/2017 Ugolini
9,648,896 B2 5/2017 Ugolini
9,656,227 B2 5/2017 Paget
9,681,778 B2 6/2017 Pendleton et al.
9,723,857 B2 8/2017 Endo et al.
9,725,228 B2 8/2017 Py et al.
9,763,462 B2 9/2017 He et al.
9,765,891 B2 9/2017 Bischel
D801,112 S 10/2017 Struggl
9,833,109 B2 12/2017 Farrell et al.
9,845,982 B2 12/2017 Knatt
9,854,820 B2 1/2018 Cocchi et al.
9,867,387 B2 1/2018 Davis et al.
9,894,912 B2 2/2018 Jacobsen et al.
9,895,028 B2 2/2018 Gerard et al.
9,986,748 B2 6/2018 Lazzarini et al.
9,993,016 B1 6/2018 Dyer
10,004,250 B2 6/2018 Ugolini
10,039,297 B2 8/2018 Grampassi
10,039,298 B2 8/2018 Noth et al.
10,094,607 B2 10/2018 Broadbent
10,111,558 B2 10/2018 Dickson, Jr. et al.
10,123,551 B2 11/2018 Beth Halachmi
10,137,032 B2 11/2018 Williamson et al.
10,151,523 B2 12/2018 Sadot et al.
10,159,270 B2 12/2018 Cocchi et al.
10,238,129 B2 3/2019 Cocchi et al.
10,306,905 B2 6/2019 Cocchi
10,306,906 B2 6/2019 Elsom et al.
10,321,700 B2 6/2019 Cocchi et al.
10,327,455 B2 6/2019 Gates
10,333,451 B2 6/2019 Ortmann
10,334,868 B2 7/2019 Fonte
10,357,131 B2 7/2019 Dickson, Jr. et al.
10,375,973 B2 8/2019 Noth et al.
10,405,562 B2 9/2019 Cocchi et al.
10,448,780 B2 10/2019 Ryser et al.
10,463,059 B2 11/2019 Bush
10,477,878 B2 11/2019 Cocchi et al.
10,492,513 B1 12/2019 Sullivan
10,548,336 B2 2/2020 Tuchrelo et al.
10,555,545 B2 2/2020 Bischel
10,570,897 B2 2/2020 Cocchi et al.
10,571,041 B2 2/2020 Bischel
10,588,330 B2 3/2020 Cocchi et al.
10,624,364 B2 4/2020 Cocchi et al.
10,638,774 B2 5/2020 Grampassi
10,645,947 B2 5/2020 Versteeg et al.
10,660,348 B2 5/2020 Cheung
10,660,349 B2 5/2020 Cocchi et al.
10,674,743 B2 6/2020 Ugolini
10,674,744 B2 6/2020 Cocchi et al.
10,712,063 B2 7/2020 Cobabe et al.
10,712,087 B2 7/2020 Cui et al.
10,712,094 B2 7/2020 Cocchi et al.
10,721,944 B2 7/2020 Dong et al.
10,736,336 B2 8/2020 Cocchi et al.
10,736,337 B2 8/2020 Seiler et al.
10,743,563 B2 8/2020 Mohammed et al.
10,788,246 B2 9/2020 Frank et al.
10,806,163 B2 10/2020 Dong et al.
10,856,697 B2 12/2020 Boozer et al.
10,865,459 B2 12/2020 Latva-Kokko
10,894,705 B2 1/2021 Cocchi et al.
10,952,455 B2 3/2021 Cocchi et al.
10,952,456 B2 3/2021 Cocchi et al.
11,027,300 B2 6/2021 Crossdale et al.
11,051,531 B2 7/2021 Cocchi et al.
11,064,715 B2 7/2021 Herbert et al.
11,118,841 B2 9/2021 Minard
11,122,816 B2 9/2021 Yang et al.
11,134,703 B2 10/2021 Cocchi et al.
11,140,911 B2 10/2021 Cocchi et al.
11,147,289 B2 10/2021 San Miguel et al.
11,154,074 B2 10/2021 Greenberg et al.
11,154,163 B1 10/2021 He et al.

(56) References Cited

U.S. PATENT DOCUMENTS

| | | | |
|---|---|---|---|
| 11,185,091 | B2 | 11/2021 | Koehl et al. |
| 11,187,443 | B2 | 11/2021 | Cocchi et al. |
| 11,213,046 | B2 | 1/2022 | Cocchi et al. |
| 11,219,328 | B2 | 1/2022 | Dees et al. |
| 11,261,073 | B2 | 3/2022 | Showalter |
| 11,278,040 | B2 | 3/2022 | Newton et al. |
| 11,291,218 | B2 | 4/2022 | Soffientini et al. |
| 11,337,549 | B2 | 5/2022 | Tuchrelo et al. |
| 11,344,045 | B2 | 5/2022 | Tuchrelo et al. |
| 11,399,552 | B2 | 8/2022 | Cocchi et al. |
| 11,406,119 | B2 | 8/2022 | Cocchi et al. |
| 11,412,757 | B2 | 8/2022 | Velez et al. |
| 11,412,884 | B2 | 8/2022 | Herbert et al. |
| D964,082 | S | 9/2022 | De Gooijer |
| 11,470,855 | B2 | 10/2022 | Fonte et al. |
| 11,484,042 | B2 | 11/2022 | Cocchi et al. |
| 11,490,635 | B2 | 11/2022 | Dong |
| 11,497,228 | B2 | 11/2022 | Wadle et al. |
| 11,503,841 | B2 | 11/2022 | Fonte et al. |
| 11,510,421 | B2 | 11/2022 | Mfrach |
| 11,519,650 | B2 | 12/2022 | Rupp |
| 11,528,922 | B2 | 12/2022 | Beth Halachmi |
| RE49,350 | E | 1/2023 | Barniol Gutierrez et al. |
| 11,540,533 | B2 | 1/2023 | Cocchi et al. |
| 11,571,006 | B2 | 2/2023 | Luca et al. |
| 11,576,398 | B2 | 2/2023 | Tassi et al. |
| 11,582,985 | B2 | 2/2023 | Cocchi et al. |
| 11,590,466 | B2 | 2/2023 | Charopoulos et al. |
| 11,627,747 | B2 | 4/2023 | Fonte et al. |
| 11,634,312 | B2 | 4/2023 | Fonte et al. |
| 11,643,321 | B2 | 5/2023 | Bush et al. |
| 11,696,589 | B2 | 7/2023 | Cocchi et al. |
| 11,751,582 | B2 | 9/2023 | Lazzarini et al. |
| 11,758,920 | B1 | 9/2023 | Frank et al. |
| 11,771,108 | B2 | 10/2023 | Lazzarini et al. |
| 11,805,789 | B2 | 11/2023 | Springer et al. |
| 11,963,638 | B2 | 4/2024 | Eissengarthen et al. |
| D1,059,928 | S | 2/2025 | Wang |
| 2001/0052239 | A1 | 12/2001 | Dorner |
| 2002/0162339 | A1 | 11/2002 | Harrison et al. |
| 2003/0000240 | A1 | 1/2003 | Pahl |
| 2003/0080644 | A1 | 5/2003 | Nelson et al. |
| 2003/0142581 | A1 | 7/2003 | Barton et al. |
| 2003/0192325 | A1 | 10/2003 | Cocchi et al. |
| 2003/0227817 | A1 | 12/2003 | Martel et al. |
| 2004/0056053 | A1 | 3/2004 | Hollander et al. |
| 2004/0187514 | A1 | 9/2004 | Franck et al. |
| 2004/0226305 | A1 | 11/2004 | Grampassi |
| 2006/0043088 | A1 | 3/2006 | Ancona et al. |
| 2006/0044935 | A1 | 3/2006 | Benelli et al. |
| 2006/0156754 | A1 | 7/2006 | Liu |
| 2006/0169147 | A1 | 8/2006 | Cocchi et al. |
| 2006/0169727 | A1 | 8/2006 | Cocchi et al. |
| 2006/0196366 | A1 | 9/2006 | Jeuch |
| 2006/0213903 | A1 | 9/2006 | Lin |
| 2007/0119867 | A1 | 5/2007 | Nakato et al. |
| 2007/0151101 | A1 | 7/2007 | Cocchi et al. |
| 2008/0073376 | A1 | 3/2008 | Gist et al. |
| 2008/0098765 | A1 | 5/2008 | Bond |
| 2008/0149655 | A1 | 6/2008 | Gist et al. |
| 2008/0173027 | A1 | 7/2008 | Kim et al. |
| 2008/0202130 | A1 | 8/2008 | Kadyk |
| 2008/0282722 | A1 | 11/2008 | Edmonds et al. |
| 2009/0009042 | A1 | 1/2009 | Kim et al. |
| 2009/0052143 | A1 | 2/2009 | Chiu |
| 2009/0127295 | A1 | 5/2009 | Cocchi et al. |
| 2009/0139257 | A1 | 6/2009 | Cocchi et al. |
| 2010/0004109 | A1 | 1/2010 | Ballhause |
| 2010/0050655 | A1 | 3/2010 | Bravo et al. |
| 2010/0116846 | A1 | 5/2010 | Cortese et al. |
| 2010/0147875 | A1 | 6/2010 | Santos et al. |
| 2010/0293965 | A1 | 11/2010 | Frank et al. |
| 2011/0041542 | A1 | 2/2011 | Brunner et al. |
| 2011/0101039 | A1 | 5/2011 | Cocchi et al. |
| 2011/0262600 | A1 | 10/2011 | McGill |
| 2011/0289947 | A1 | 12/2011 | Chadwell et al. |
| 2012/0096876 | A1 | 4/2012 | Ravji et al. |
| 2012/0223094 | A1 | 9/2012 | Rickard, Jr. et al. |
| 2012/0285331 | A1 | 11/2012 | Mori et al. |
| 2012/0298690 | A1 | 11/2012 | Skobel et al. |
| 2012/0300954 | A1 | 11/2012 | Ku |
| 2012/0312049 | A1 | 12/2012 | Downs, III et al. |
| 2013/0077433 | A1 | 3/2013 | Conti |
| 2013/0098098 | A1 | 4/2013 | Ugolini |
| 2013/0263747 | A1 | 10/2013 | Ugolini |
| 2013/0334262 | A1 | 12/2013 | Banning et al. |
| 2014/0043931 | A1 | 2/2014 | Figueroa |
| 2014/0134299 | A1 | 5/2014 | Guidorzi et al. |
| 2014/0209635 | A1 | 7/2014 | Gates et al. |
| 2014/0212566 | A1 | 7/2014 | Herbert et al. |
| 2014/0246456 | A1 | 9/2014 | Huang |
| 2014/0263340 | A1 | 9/2014 | Audette |
| 2014/0263415 | A1 | 9/2014 | San Miguel et al. |
| 2014/0319146 | A1 | 10/2014 | Ye et al. |
| 2015/0150408 | A1 | 6/2015 | Schlee |
| 2015/0191685 | A1 | 7/2015 | Kyle |
| 2015/0245636 | A1 | 9/2015 | Forrester, Jr. |
| 2015/0264959 | A1 | 9/2015 | Colwell et al. |
| 2016/0015217 | A1 | 1/2016 | Rojas Restrepo et al. |
| 2016/0016129 | A1 | 1/2016 | Vermeulen et al. |
| 2016/0139604 | A1 | 5/2016 | Ito |
| 2016/0157509 | A1 | 6/2016 | Cocchi |
| 2016/0262422 | A1 | 9/2016 | Biglari et al. |
| 2016/0353766 | A1 | 12/2016 | Jacobsen et al. |
| 2017/0027188 | A1 | 2/2017 | Raybin et al. |
| 2017/0030467 | A1 | 2/2017 | Versteeg et al. |
| 2017/0160007 | A1 | 6/2017 | Liptak et al. |
| 2017/0304784 | A1 | 10/2017 | Kasprzycki |
| 2017/0332658 | A1 | 11/2017 | Mitchell et al. |
| 2017/0367370 | A1 | 12/2017 | Frisque et al. |
| 2018/0014553 | A1 | 1/2018 | Ugolini |
| 2018/0020875 | A1 | 1/2018 | Kolar et al. |
| 2018/0087827 | A1 | 3/2018 | Lee et al. |
| 2018/0184682 | A1 | 7/2018 | Bertone |
| 2018/0206519 | A1 | 7/2018 | Noth et al. |
| 2018/0216875 | A1 | 8/2018 | Caswell et al. |
| 2018/0228180 | A1 | 8/2018 | Cocchi et al. |
| 2018/0231318 | A1 | 8/2018 | Cocchi et al. |
| 2019/0056182 | A1 | 2/2019 | Bischel et al. |
| 2019/0070643 | A1 | 3/2019 | Wong et al. |
| 2019/0110496 | A1 | 4/2019 | Cocchi et al. |
| 2019/0124944 | A1 | 5/2019 | Caiano |
| 2019/0125122 | A1 | 5/2019 | Feola |
| 2019/0166873 | A1 | 6/2019 | Grampassi |
| 2019/0313664 | A1 | 10/2019 | Haas et al. |
| 2019/0357562 | A1 | 11/2019 | San Miguel et al. |
| 2020/0107559 | A1 | 4/2020 | Deshpande et al. |
| 2020/0156019 | A1 | 5/2020 | Sawyer et al. |
| 2020/0173697 | A1 | 6/2020 | Resnick |
| 2020/0288746 | A1 | 9/2020 | Luca et al. |
| 2020/0288747 | A1 | 9/2020 | Greenberg et al. |
| 2020/0339407 | A1 | 10/2020 | Caiano |
| 2020/0391990 | A1 | 12/2020 | Yamashita et al. |
| 2021/0000133 | A1 | 1/2021 | Meldrum et al. |
| 2021/0003549 | A1 | 1/2021 | Ino et al. |
| 2021/0022364 | A1 | 1/2021 | Meldrum et al. |
| 2021/0084930 | A1 | 3/2021 | Fonte |
| 2021/0085129 | A1 | 3/2021 | Boozer et al. |
| 2021/0152649 | A1 | 5/2021 | Ciepiel |
| 2021/0161182 | A1 | 6/2021 | Stoenescu et al. |
| 2021/0177211 | A1 | 6/2021 | Siu et al. |
| 2021/0186267 | A1 | 6/2021 | Hammond et al. |
| 2021/0251418 | A1 | 8/2021 | Dussault et al. |
| 2021/0354100 | A1 | 11/2021 | Sapire et al. |
| 2021/0360979 | A1 | 11/2021 | Leb et al. |
| 2021/0368821 | A1 | 12/2021 | Tassi et al. |
| 2021/0371265 | A1 | 12/2021 | Fonte et al. |
| 2022/0001344 | A1 | 1/2022 | Zdanow et al. |
| 2022/0030906 | A1 | 2/2022 | Springer et al. |
| 2022/0073336 | A1 | 3/2022 | Savioz |
| 2022/0087284 | A1 | 3/2022 | Savioz |
| 2022/0110339 | A1 | 4/2022 | Beth Halachmi et al. |
| 2022/0117255 | A1 | 4/2022 | Lazzarini et al. |
| 2022/0117256 | A1 | 4/2022 | Wang |

(56) References Cited

U.S. PATENT DOCUMENTS

| | | | |
|---|---|---|---|
| 2022/0174978 | A1 | 6/2022 | Douer |
| 2022/0205712 | A1 | 6/2022 | Fonte |
| 2022/0211072 | A1 | 7/2022 | Tran et al. |
| 2022/0225636 | A1 | 7/2022 | Minard et al. |
| 2022/0240533 | A1 | 8/2022 | Dees et al. |
| 2022/0257031 | A1 | 8/2022 | Veettil et al. |
| 2022/0273141 | A1 | 9/2022 | Atinaja |
| 2022/0295822 | A1 | 9/2022 | Lazzarini et al. |
| 2022/0394996 | A1 | 12/2022 | Lazzarini et al. |
| 2023/0000289 | A1 | 1/2023 | Kolar et al. |
| 2023/0038281 | A1 | 2/2023 | Gee, II et al. |
| 2023/0040750 | A1 | 2/2023 | Ciepiel et al. |
| 2023/0055322 | A1 | 2/2023 | Griffiths et al. |
| 2023/0074503 | A1 | 3/2023 | Kanellos et al. |
| 2023/0107530 | A1 | 4/2023 | Kadyk et al. |
| 2023/0180785 | A1 | 6/2023 | Feola |
| 2023/0292785 | A1 | 9/2023 | Collins et al. |
| 2023/0413851 | A1 | 12/2023 | Resnick et al. |
| 2024/0074453 | A1 | 3/2024 | Herbert et al. |
| 2024/0251821 | A1 | 8/2024 | Freebairn et al. |
| 2024/0292979 | A1 | 9/2024 | Weinstock et al. |
| 2024/0292980 | A1 | 9/2024 | Weinstock et al. |

FOREIGN PATENT DOCUMENTS

| | | | |
|---|---|---|---|
| CH | 168408 | A | 4/1934 |
| CN | 3029700 | | 1/1995 |
| CN | 3032479 | | 6/1995 |
| CN | 2305134 | | 1/1999 |
| CN | 2317778 | | 5/1999 |
| CN | 2681650 | Y | 3/2005 |
| CN | 2719037 | Y | 8/2005 |
| CN | 200968762 | | 10/2007 |
| CN | 201085021 | | 7/2008 |
| CN | 100417354 | C | 9/2008 |
| CN | 100462498 | C | 2/2009 |
| CN | 301023332 | | 9/2009 |
| CN | 100584257 | C | 1/2010 |
| CN | 101035719 | B | 9/2010 |
| CN | 301366044 | S | 10/2010 |
| CN | 101897379 | A | 12/2010 |
| CN | 101933555 | A | 1/2011 |
| CN | 101953631 | A | 1/2011 |
| CN | 301472931 | S | 2/2011 |
| CN | 102118992 | A | 7/2011 |
| CN | 301716398 | S | 11/2011 |
| CN | 102395280 | A | 3/2012 |
| CN | 1981590 | B | 7/2012 |
| CN | 202287939 | U | 7/2012 |
| CN | 302035884 | S | 8/2012 |
| CN | 101073373 | B | 9/2012 |
| CN | 302156707 | S | 10/2012 |
| CN | 102791172 | A | 11/2012 |
| CN | 102869269 | A | 1/2013 |
| CN | 101433257 | B | 3/2013 |
| CN | 202773994 | U | 3/2013 |
| CN | 302432950 | S | 5/2013 |
| CN | 101263838 | B | 6/2013 |
| CN | 203194450 | U | 9/2013 |
| CN | 203207109 | | 9/2013 |
| CN | 103649748 | A | 3/2014 |
| CN | 302768884 | S | 3/2014 |
| CN | 103732024 | A | 4/2014 |
| CN | 101842022 | B | 5/2014 |
| CN | 302912326 | S | 8/2014 |
| CN | 102802432 | B | 9/2014 |
| CN | 104222447 | A | 12/2014 |
| CN | 204047886 | U | 12/2014 |
| CN | 102791142 | B | 2/2015 |
| CN | 103052324 | B | 2/2015 |
| CN | 104351455 | A | 2/2015 |
| CN | 303162244 | S | 4/2015 |
| CN | 204467878 | | 7/2015 |
| CN | 104839419 | A | 8/2015 |
| CN | 103727718 | B | 5/2016 |
| CN | 104146140 | B | 6/2016 |
| CN | 105685363 | A | 6/2016 |
| CN | 105767441 | A | 7/2016 |
| CN | 105876067 | A | 8/2016 |
| CN | 303857445 | S | 9/2016 |
| CN | 2025745589 | U | 11/2016 |
| CN | 104349681 | B | 12/2016 |
| CN | 106472801 | A | 3/2017 |
| CN | 106472802 | A | 3/2017 |
| CN | 206021124 | U | 3/2017 |
| CN | 103619187 | B | 5/2017 |
| CN | 103796562 | B | 5/2017 |
| CN | 106720895 | A | 5/2017 |
| CN | 106720899 | A | 5/2017 |
| CN | 206137910 | U | 5/2017 |
| CN | 103190521 | B | 6/2017 |
| CN | 106900971 | A | 6/2017 |
| CN | 106998739 | A | 8/2017 |
| CN | 304230014 | S | 8/2017 |
| CN | 206480820 | U | 9/2017 |
| CN | 105636681 | B | 2/2018 |
| CN | 105928284 | B | 3/2018 |
| CN | 107799959 | A | 3/2018 |
| CN | 207531846 | U | 6/2018 |
| CN | 108471774 | A | 8/2018 |
| CN | 108473299 | A | 8/2018 |
| CN | 108967640 | A | 12/2018 |
| CN | 109068679 | A | 12/2018 |
| CN | 208228808 | U | 12/2018 |
| CN | 109152386 | A | 1/2019 |
| CN | 305030064 | S | 2/2019 |
| CN | 305037389 | S | 2/2019 |
| CN | 109497252 | A | 3/2019 |
| CN | 105979830 | B | 4/2019 |
| CN | 208724808 | | 4/2019 |
| CN | 305125664 | S | 4/2019 |
| CN | 109952049 | A | 6/2019 |
| CN | 209034166 | U | 6/2019 |
| CN | 305238453 | S | 6/2019 |
| CN | 305239624 | S | 7/2019 |
| CN | 106414244 | B | 8/2019 |
| CN | 110168296 | A | 8/2019 |
| CN | 105142417 | B | 10/2019 |
| CN | 305404778 | S | 10/2019 |
| CN | 105517448 | B | 11/2019 |
| CN | 110432373 | A | 11/2019 |
| CN | 110477182 | A | 11/2019 |
| CN | 305442869 | S | 11/2019 |
| CN | 305442892 | S | 11/2019 |
| CN | 104782875 | B | 12/2019 |
| CN | 105992518 | B | 12/2019 |
| CN | 110547702 | A | 12/2019 |
| CN | 110573023 | A | 12/2019 |
| CN | 110604206 | A | 12/2019 |
| CN | 305488015 | S | 12/2019 |
| CN | 110678107 | A | 1/2020 |
| CN | 210092302 | U | 2/2020 |
| CN | 104543313 | B | 3/2020 |
| CN | 111011572 | A | 4/2020 |
| CN | 305701088 | S | 4/2020 |
| CN | 111096388 | A | 5/2020 |
| CN | 305830872 | S | 6/2020 |
| CN | 305830874 | S | 6/2020 |
| CN | 111386045 | A | 7/2020 |
| CN | 111465337 | A | 7/2020 |
| CN | 305908111 | S | 7/2020 |
| CN | 111887338 | A | 11/2020 |
| CN | 111903828 | A | 11/2020 |
| CN | 111918557 | A | 11/2020 |
| CN | 111918558 | A | 11/2020 |
| CN | 306204401 | S | 12/2020 |
| CN | 112155113 | A | 1/2021 |
| CN | 112262910 | A | 1/2021 |
| CN | 306282727 | S | 1/2021 |
| CN | 306305200 | S | 1/2021 |
| CN | 105767440 | B | 3/2021 |
| CN | 105795089 | B | 3/2021 |
| CN | 306415926 | S | 3/2021 |
| CN | 112638214 | A | 4/2021 |

(56) References Cited

FOREIGN PATENT DOCUMENTS

| | | | |
|---|---|---|---|
| CN | 212872077 | U | 4/2021 |
| CN | 111609640 | B | 5/2021 |
| CN | 213095924 | U | 5/2021 |
| CN | 306516598 | S | 5/2021 |
| CN | 106562677 | B | 6/2021 |
| CN | 112911941 | A | 6/2021 |
| CN | 306651752 | S | 6/2021 |
| CN | 105028886 | B | 7/2021 |
| CN | 105580972 | B | 7/2021 |
| CN | 213663494 | U | 7/2021 |
| CN | 213995516 | U | 8/2021 |
| CN | 109689530 | B | 9/2021 |
| CN | 113382952 | A | 9/2021 |
| CN | 214223471 | U | 9/2021 |
| CN | 214284224 | U | 9/2021 |
| CN | 306833593 | S | 9/2021 |
| CN | 106234750 | B | 10/2021 |
| CN | 107279447 | B | 10/2021 |
| CN | 113483505 | A | 10/2021 |
| CN | 214316889 | U | 10/2021 |
| CN | 214841943 | U | 11/2021 |
| CN | 306946279 | S | 11/2021 |
| CN | 113729494 | A | 12/2021 |
| CN | 113748301 | A | 12/2021 |
| CN | 113776237 | A | 12/2021 |
| CN | 215176200 | U | 12/2021 |
| CN | 113892544 | A | 1/2022 |
| CN | 113892551 | A | 1/2022 |
| CN | 113907172 | A | 1/2022 |
| CN | 113925109 | A | 1/2022 |
| CN | 114017963 | A | 2/2022 |
| CN | 114072624 | A | 2/2022 |
| CN | 216088684 | U | 3/2022 |
| CN | 111854249 | B | 4/2022 |
| CN | 216205431 | U | 4/2022 |
| CN | 307297544 | S | 4/2022 |
| CN | 108471775 | B | 5/2022 |
| CN | 114424796 | A | 5/2022 |
| CN | 114449928 | A | 5/2022 |
| CN | 111977198 | B | 6/2022 |
| CN | 114728780 | A | 7/2022 |
| CN | 114760847 | A | 7/2022 |
| CN | 114760848 | A | 7/2022 |
| CN | 216906702 | U | 7/2022 |
| CN | 114868828 | A | 8/2022 |
| CN | 114870688 | A | 8/2022 |
| CN | 217284664 | U | 8/2022 |
| CN | 115005314 | A | 9/2022 |
| CN | 307613129 | S | 10/2022 |
| CN | 115348822 | A | 11/2022 |
| CN | 115397250 | A | 11/2022 |
| CN | 108402274 | B | 12/2022 |
| CN | 218495421 | U | 2/2023 |
| CN | 109414034 | B | 3/2023 |
| CN | 109463523 | B | 3/2023 |
| CN | 218790281 | U | 4/2023 |
| CN | 218892950 | U | 4/2023 |
| CN | 219047235 | U | 5/2023 |
| CN | 107788200 | B | 6/2023 |
| CN | 109090329 | B | 6/2023 |
| CN | 219146674 | U | 6/2023 |
| CN | 219282746 | U | 6/2023 |
| CN | 110269127 | B | 7/2023 |
| CN | 116473154 | A | 7/2023 |
| CN | 219374430 | U | 7/2023 |
| CN | 113892548 | B | 8/2023 |
| CN | 113925107 | B | 8/2023 |
| CN | 113892544 | B | 9/2023 |
| CN | 113728208 | B | 10/2023 |
| CN | 114009573 | B | 10/2023 |
| CN | 114009574 | B | 10/2023 |
| CN | 219846092 | | 10/2023 |
| CN | 219995441 | U | 11/2023 |
| CN | 117295920 | A | 12/2023 |
| CN | 220235933 | U | 12/2023 |
| CN | 220287817 | U | 1/2024 |
| CN | 308416570 | S | 1/2024 |
| CN | 308422196 | S | 1/2024 |
| CN | 117928143 | A | 4/2024 |
| CN | 117958344 | A | 5/2024 |
| CN | 221059481 | U | 6/2024 |
| CN | 308671658 | S | 6/2024 |
| CN | 118383446 | A | 7/2024 |
| CN | 118383447 | A | 7/2024 |
| CN | 118383448 | A | 7/2024 |
| CN | 308729489 | S | 7/2024 |
| CN | 118415268 | A | 8/2024 |
| CN | 118442732 | A | 8/2024 |
| CN | 118463436 | A | 8/2024 |
| CN | 118489792 | A | 8/2024 |
| CN | 118645963 | A | 9/2024 |
| CN | 221881850 | U | 10/2024 |
| CN | 118873002 | A | 11/2024 |
| CN | 118912748 | A | 11/2024 |
| CN | 118948103 | A | 11/2024 |
| CN | 118949740 | A | 11/2024 |
| CN | 119097039 | A | 12/2024 |
| CN | 119111683 | A | 12/2024 |
| CN | 222278939 | U | 12/2024 |
| CN | 119344398 | A | 1/2025 |
| DE | 1981857 | U | 3/1968 |
| DE | 2225460 | | 12/1973 |
| DE | 19701379 | A1 | 6/1998 |
| DE | 102013015012 | | 3/2015 |
| DE | 102016219197 | A1 | 4/2018 |
| DE | 202021105580 | U1 | 2/2022 |
| EM | 001766817 | | 10/2010 |
| EP | 0022090 | B1 | 9/1984 |
| EP | 0133844 | A1 | 3/1985 |
| EP | 0250245 | B1 | 3/1991 |
| EP | 0793535 | B1 | 6/1999 |
| EP | 0861597 | A3 | 11/1999 |
| EP | 0827480 | B1 | 9/2002 |
| EP | 0876765 | B1 | 10/2002 |
| EP | 0910269 | B1 | 10/2002 |
| EP | 1132007 | A3 | 9/2003 |
| EP | 0893070 | B1 | 9/2005 |
| EP | 1787526 | A1 | 5/2007 |
| EP | 1230882 | B1 | 6/2007 |
| EP | 1808622 | A1 | 7/2007 |
| EP | 1635682 | B1 | 8/2007 |
| EP | 1787524 | A3 | 11/2008 |
| EP | 1738652 | B1 | 5/2009 |
| EP | 2266416 | A1 | 12/2010 |
| EP | 2332450 | A1 | 6/2011 |
| EP | 1980156 | B1 | 6/2012 |
| EP | 2062481 | B1 | 6/2012 |
| EP | 2342997 | B1 | 6/2012 |
| EP | 2478774 | A1 | 7/2012 |
| EP | 2064957 | B1 | 1/2013 |
| EP | 2446750 | B1 | 1/2013 |
| EP | 2578119 | A1 | 4/2013 |
| EP | 2096967 | B1 | 9/2013 |
| EP | 2267340 | B1 | 3/2014 |
| EP | 2613643 | B1 | 4/2014 |
| EP | 2508080 | B1 | 5/2015 |
| EP | 2708169 | B1 | 6/2015 |
| EP | 2680708 | B1 | 1/2016 |
| EP | 2550869 | B1 | 2/2017 |
| EP | 2805620 | B1 | 2/2017 |
| EP | 2269469 | B1 | 4/2017 |
| EP | 2277386 | B1 | 4/2017 |
| EP | 2713765 | B1 | 8/2017 |
| EP | 2653808 | A3 | 1/2018 |
| EP | 2863777 | B1 | 6/2018 |
| EP | 3348516 | A1 | 7/2018 |
| EP | 3360422 | A1 | 8/2018 |
| EP | 3172970 | B1 | 1/2019 |
| EP | 3399865 | B1 | 7/2019 |
| EP | 3324804 | B1 | 3/2020 |
| EP | 3245430 | B1 | 5/2020 |
| EP | 3669661 | A1 | 6/2020 |
| EP | 3351113 | B1 | 12/2020 |
| EP | 3340844 | B1 | 10/2022 |

(56) References Cited

FOREIGN PATENT DOCUMENTS

| | | | | |
|---|---|---|---|---|
| EP | 3473950 B1 | 3/2023 | | |
| EP | 3519347 B1 | 3/2023 | | |
| EP | 3554252 B1 | 5/2023 | | |
| EP | 3793416 B1 | 5/2023 | | |
| EP | 3616528 B1 | 7/2023 | | |
| FR | 1202961 | 1/1960 | | |
| FR | 1202961 A | 1/1960 | | |
| FR | 2574253 B1 | 2/1990 | | |
| FR | 2705550 A1 | 12/1994 | | |
| GB | 1183551 | 3/1970 | | |
| GB | 1367786 A | 9/1974 | | |
| GB | 2424081 A | 9/2006 | | |
| GB | 2444979 B | 6/2008 | | |
| IT | BO20100713 A1 | 5/2012 | | |
| IT | 201900002923 A1 | 8/2020 | | |
| JP | H06207768 A | 7/1994 | | |
| JP | H11113498 A | 4/1999 | | |
| JP | H11299429 A | 11/1999 | | |
| JP | 2001169730 A | 6/2001 | | |
| JP | 2009149316 | 7/2009 | | |
| JP | 2010094175 A | 4/2010 | | |
| JP | 2013102786 A | 5/2013 | | |
| JP | 1510182 S | 10/2014 | | |
| JP | 2014222404 A | 11/2014 | | |
| JP | 1525793 S | 6/2015 | | |
| JP | 2022035551 | 3/2022 | | |
| KR | 9761081 A | 9/1997 | | |
| KR | 100214695 B1 | 8/1999 | | |
| KR | 200303628 Y1 | 2/2003 | | |
| KR | 300432449 S | 12/2006 | | |
| KR | 300777160 S | 12/2014 | | |
| KR | 1020180105925 A | 10/2018 | | |
| KR | 102052851 B1 | 12/2019 | | |
| KR | 1020200136121 A | 12/2020 | | |
| KR | 20230007648 A | 1/2023 | | |
| TW | 161842 S | 6/1991 | | |
| WO | 0125673 A1 | 4/2001 | | |
| WO | 0197628 A1 | 12/2001 | | |
| WO | 2004054380 A1 | 7/2004 | | |
| WO | 2008001520 A1 | 1/2008 | | |
| WO | 2008119980 A1 | 10/2008 | | |
| WO | 2011081301 A2 | 7/2011 | | |
| WO | WO-2014123842 A1 | * | 8/2014 | ............. A23G 9/228 |
| WO | WO-2015063094 A1 | * | 5/2015 | ............... A23G 9/08 |
| WO | 2016069106 A1 | 5/2016 | | |
| WO | 2017072531 A1 | 5/2017 | | |
| WO | WO2017087970 A2 | 5/2017 | | |
| WO | 2019057130 A1 | 3/2019 | | |
| WO | WO-2020163551 A1 | * | 8/2020 | ............. A23G 9/045 |
| WO | 2020191221 A1 | 9/2020 | | |
| WO | 2021009788 A1 | 1/2021 | | |
| WO | 2021250682 A1 | 12/2021 | | |
| WO | 2022205902 A1 | 10/2022 | | |
| WO | 2023286000 A1 | 1/2023 | | |
| WO | 2023042084 A1 | 3/2023 | | |
| WO | 2023091416 A3 | 5/2023 | | |
| WO | 2023131944 A1 | 7/2023 | | |
| WO | WO2023248079 A1 | 12/2023 | | |
| WO | 2024111011 A1 | 5/2024 | | |
| WO | 2024250152 A1 | 12/2024 | | |

OTHER PUBLICATIONS

Complaint For Declaratory Judgment, *Shenzhen Tao Yi An E-Commerce Co., Ltd.* v. *SharkNinja Operating LLC*, No. 5:25-cv-04656 (N.D. Cal. Jun. 3, 2025), 13 pages.

Answer and Affirmative Defenses to Counterclaims, *Foshan Macjerry Technology Co., Ltd.* v. *SharkNinja Operating LLC*, No. 2:25-cv-00954 (W.D. Wash. Jul. 11, 2025), 14 pages.

Answer and Counterclaims, *SharkNinja Operating LLC et al.* v. *RJ Brands, LLC*, No. 1:25-cv-05650 (D.N.J. Aug. 11, 2025), 37 pages.

Complaint for Declaratory Judgment, *Shenzhen SaLilan Technology Co., Ltd et al* v. *SharkNinja Operating LLC*, No. 1:25-cv-12447-WGY, D. Mass., Sep. 3, 2025, 11 pages.

Complaint, *SharkNinja Operating LLC et al.* v. *The Individuals, Corporations, Limited Liability Companies, Partnerships, And Unincorporated Associations Identified on Schedule A*, No. 1:25-cv-25323-RAR, 2025, pp. 1-29.

Expedited Motion to Dissolve Temporary Restraining Order and Deny Preliminary Injunction, *SharkNinja Operating LLC et al.* v. *The Individuals, Corporations, Limited Liability Companies, Partnerships, and Unincorporated Associations Identified on Schedule A*, No. 1:25-cv-25323-RAR, 2025, pp. 1-20.

Exhibit Claim 1 Analysis, *SharkNinja Operating LLC et al.* v. *The Individuals, Corporations, Limited Liability Companies, Partnerships, and Unincorporated Associations Identified on Schedule A*, No. 1:25-cv-25323-RAR, 2025, pp. 1-7.

Motion to Dissolve Ex Parte TRO and Opposition To Plaintiff's Motion for Entry of Preliminary Injunction, *SharkNinja Operating LLC et al.* v. *The Individuals, Corporations, Limited Liability Companies, Partnerships, and Unincorporated Associations Identified on Schedule A*, No. 1:25-cv-25323-RAR, 2025, pp. 1-13.

Limited Opposition to Plaintiffs' Motion for Entry of Preliminary Injunction, *SharkNinja Operating LLC et al.* v. *The Individuals, Corporations, Limited Liability Companies, Partnerships, and Unincorporated Associations Identified on Schedule A*, No. 1:25-cv-25323-RAR, 2025, pp. 1-12.

Answer and Counterclaims to Plaintiffs Second Amended Complaint, *SharkNinja Operating LLC et al.* v. *RJ Brands, LLC*, No. 1:25-cv-05650 (D.N.J. Aug. 11, 2025).

Complaint, *SharkNinja Operating LLC et al.* v. *The Individuals, Corporations, Limited Liability Companies, Partnerships, and Unincorporated Associations Identified on Schedule A*, 2025, pp. 1-29, No. 1:25-cv-25323-RAR.

Defendants Opposition to Plaintiffs Motion for Entry of Preliminary Injunction, *SharkNinja Operating LLC et al.* v. *The Individuals, Corporations, Limited Liability Companies, Partnerships, and Unincorporated Associations Identified on Schedule A*, 2025, pp. 1-29, No. 1:25-cv-25323-RAR.

Exhibit Claim 1 Analysis, *SharkNinja Operating LLC et al.* v. *The Individuals, Corporations, Limited Liability Companies, Partnerships, and Unincorporated Associations Identified on Schedule A*, 2025, pp. 1-7, No. 1:25- CV-25323-RAR.

Exhibit I to Glacier Parties' Opposition to Plaintiffs' Motion for Preliminary Injunction, *SharkNinja Operating LLC et al.* v. *The Individuals, Corporations, Limited Liability Companies, Partnerships, and Unincorporated Associations Identified on Schedule A*, Jan. 15, 2026, No. 1:25-cv-25323-RAR, 73 pages.

Exhibit J to Glacier Parties' Opposition to Plaintiffs' Motion for Preliminary Injunction, *SharkNinja Operating LLC et al.* v. *The Individuals, Corporations, Limited Liability Companies, Partnerships, and Unincorporated Associations Identified on Schedule A*, Jan. 15, 2026, No. 1:25-cv-25323-RAR, 57 pages.

Exhibit K to Glacier Parties' Opposition to Plaintiffs' Motion for Preliminary Injunction, *SharkNinja Operating LLC et al.* v. *The Individuals, Corporations, Limited Liability Companies, Partnerships, and Unincorporated Associations Identified on Schedule A*, Jan. 15, 2026, No. 1:25-cv-25323-RAR, 47 pages.

Expedited Motion to Dissolve Temporary Restraining Order and Deny Preliminary Injunction, *SharkNinja Operating LLC et al.* v. *The Individuals, Corporations, Limited Liability Companies, Partnerships, and Unincorporated Associations Identified on Schedule A*, 2025, pp. 1-20, No. 1:25-cv-25323-RAR.

First Amended Complaint for Declaratory Judgment, *Shenzhen SaLilan Technology Co., Ltd et al* v. *SharkNinja Operating LLC*, No. 1:25-cv-12447-WGY (D. Mass. Sep. 3, 2025).

Glacier Parties' Opposition to Plaintiffs' Motion For Preliminary Injunction, *SharkNinja Operating LLC et al.* v. *The Individuals, Corporations, Limited Liability Companies, Partnerships, and Unincorporated Associations Identified on Schedule A*, Jan. 15, 2026, No. 1:25-cv-25323-RAR, 37 pages.

Limited Opposition to Plaintiffs Motion for Entry of Preliminary Injunction, *SharkNinja Operating LLC et al.* v. *The Individuals, Corporations, Limited Liability Companies, Partnerships, and Unincorporated Associations Identified on Schedule A*, 2025, pp. 1-12, No. 1:25-cv-25323-RAR.

(56) References Cited

OTHER PUBLICATIONS

Motion to Dissolve Ex Parte Tro and Opposition to Plaintiffs Motion For Entry of Preliminary Injunction, *SharkNinja Operating LLC et al.* v. *The Individuals, Corporations, Limited Liability Companies, Partnerships, and Unincorporated Associations Identified on Schedule A*, 2025, pp. 1-13, No. 1:25-cv-25323-RAR.

Omnibus Reply in Support of the Motion for Entry of Preliminary Injunction, *SharkNinja Operating LLC et al.* v. *The Individuals, Corporations, Limited Liability Companies, Partnerships, and Unincorporated Associations Identified on Schedule A*, 2025, pp. 1-44, No. 1:25-cv-25323-RAR.

Order Dissolving Temporary Restraining Order and Referring Case to Magistrate Judge, *SharkNinja Operating LLC et al.* v. *The Individuals, Corporations, Limited Liability Companies, Partnerships, and Unincorporated Associations Identified on Schedule A*, 2025, pp. 1-29, No. 1:25-cv-25323-RAR.

Shenzhen Fengkai E-commerco Co., Ltd. and Hong Kong Huayun Economic & Trade Co., Ltd. Defendants Opposition to Plaintiffs Motion for Entry of Preliminary Injunction, *SharkNinja Operating LLC et al.* v. *The Individuals, Corporations, Limited Liability Companies, Partnerships, and Unincorporated Associations Identified on Schedule A*, 2025, pp. 1-29, No. 1:25-cv-25323-RAR.

Xu Defendants' Opposition to Plaintiffs Motion for Preliminary Injunction, *SharkNinja Operating LLC et al.* v. *The Individuals, Corporations, Limited Liability Companies, Partnerships, And Unincorporated Associations Identified on Schedule A*, 2025, pp. 1-29, No. 1:25-cv-25323-RAR.

Defendants' answer to complaint and counterclaims, *Sharkninja Operating LLC*, v *The Individuals, Corporations, Limited liability companies, partnerships and unincorporated associations identified on schedule A*, Case No. 1:25- cv-25323, Doc. 239, Jan. 28, 2026.

Crathco I-Pro Slush Machine, R290, R452a, R449, Dec. 2023, 52 pages.

Defendant RJ Brands, LLCS Invalidity and Non-Infringement Contentions, *SharkNinja Operating LLC* v. *RJ Brands, LLC*, No. 1:25-cv-05650, (D.N.J. Apr. 9, 2026), 58 pages.

Exhibit A1—Claim Chart U.S. Appl. No. 12/279,629, *Sharkninja Operating LLC* v. *RJ Brands*, LLC d/b/a CHEFMAN District of New Jersey No. 25-cv-05650, 115 pages.

Exhibit A2—Claim Chart U.S. Appl. No. 12/279,629, *Sharkninja Operating LLC* v. *RJ Brands, LLC* d/b/a CHEFMAN District of New Jersey No. 25-cv-05650, 114 pages.

Exhibit B1—Claim Chart U.S. Appl. No. 12/285,028, *Sharkninja Operating LLC* v. *RJ Brands, LLC* d/b/a CHEFMAN District of New Jersey No. 25-cv-05650, 31 pages.

Exhibit B2—Claim Chart U.S. Appl. No. 12/285,028, *Sharkninja Operating LLC* v. *RJ Brands, LLC* d/b/a CHEFMAN District of New Jersey No. 25-cv-05650, 49 pages.

Exhibit B3—Claim Chart U.S. Appl. No. 12/285,028, *Sharkninja Operating LLC* v. *RJ Brands, LLC* d/b/a CHEFMAN District of New Jersey No. 25-cv-05650, 52 pages.

Exhibit B4—Claim Chart U.S. Appl. No. 12/285,028, *Sharkninja Operating LLC* v. *RJ Brands, LLC* d/b/a CHEFMAN District of New Jersey No. 25-cv-05650, 29 pages.

Exhibit B5—Claim Chart U.S. Appl. No. 12/285,028, *Sharkninja Operating LLC* v. *RJ Brands, LLC* d/b/a CHEFMAN District of New Jersey No. 25-cv-05650, 61 pages.

Exhibit B6—Claim Chart U.S. Appl. No. 12/285,028, *Sharkninja Operating LLC* v. *RJ Brands, LLC* d/b/a CHEFMAN District of New Jersey No. 25-cv-05650, 54 pages.

Exhibit B7—Claim Chart U.S. Appl. No. 12/285,028, *Sharkninja Operating LLC* v. *RJ Brands, LLC* d/b/a CHEFMAN District of New Jersey No. 25-cv-05650, 61 pages.

Exhibit C1—Claim Chart U.S. PAt. No. D1,076,580, *Sharkninja Operating LLC* v. *RJ Brands, LLC* d/b/a CHEFMAN District of New Jersey No. 25-cv-05650, 72 pages.

Exhibit C2—Claim Chart U.S. Pat. No. D1,076580, *Sharkninja Operating LLC* v. *RJ Brands, LLC* d/b/a CHEFMAN District of New Jersey No. 25-cv-05650, 9 pages.

Exhibit D1—Claim Chart U.S. Appl. No. 12/446,594, *Sharkninja Operating LLC* v. *RJ Brands, LLC* d/b/a CHEFMAN District of New Jersey No. 25-cv-05650, 51 pages.

Exhibit D2—Claim Chart U.S. Appl. No. 12/446,594, *Sharkninja Operating LLC* v. *RJ Brands, LLC* d/b/a CHEFMAN District of New Jersey No. 25-cv-05650, 40 pages.

Exhibit D3—Claim Chart U.S. Appl. No. 12/446,594, *Sharkninja Operating LLC* v. *RJ Brands, LLC* d/b/a CHEFMAN District of New Jersey No. 25-cv-05650, 38 pages.

Exhibit D4—Claim Chart U.S. Appl. No. 12/446,594, *Sharkninja Operating LLC* v. *RJ Brands, LLC* d/b/a CHEFMAN District of New Jersey No. 25-cv-05650, 76 pages.

Exhibit D5—Claim Chart U.S. Appl. No. 12/446,594, *Sharkninja Operating LLC* v. *RJ Brands, LLC* d/b/a CHEFMAN District of New Jersey No. 25-cv-05650, 25 pages.

Exhibit D6—Claim Chart U.S. Appl. No. 12/446,594, *Sharkninja Operating LLC* v. *RJ Brands, LLC* d/b/a CHEFMAN District of New Jersey No. 25-cv-05650, 50 pages.

Exhibit D7—Claim Chart U.S. Appl. No. 12/446,594, *Sharkninja Operating LLC* v. *RJ Brands, LLC* d/b/a CHEFMAN District of New Jersey No. 25-cv-05650, 127 pages.

Exhibit D8—Claim Chart U.S. Appl. No. 12/446,594, *Sharkninja Operating LLC* v. *RJ Brands, LLC* d/b/a CHEFMAN District of New Jersey No. 25-cv-05650, 83 pages.

Exhibit E1—U.S. Pat. No. 12,279,629—RJ Brands' Response and Basis of Non-Infringement Contention, *Sharkninja Operating LLC* v. *RJ Brands, LLC* d/b/a CHEFMAN District of New Jersey No. 25-cv-05650, 4 pages.

Exhibit E2—U.S. Pat. No. 12,285,028—RJ Brands' Response and Basis of Non-Infringement Contention, *Sharkninja Operating LLC* v. *RJ Brands, LLC* d/b/a CHEFMAN District of New Jersey No. 25-cv-05650, 5 pages.

Exhibit E3—U.S. Design Pat. No. 1,076,580—RJ Brands' Response and Basis of Non-Infringement Contention, *Sharkninja Operating LLC* v. *RJ Brands, LLC* d/b/a CHEFMAN District of New Jersey No. 25-cv-05650, 4 pages.

Exhibit E4—U.S. Pat. No. 12,446,594—RJ Brands' Response and Basis of Non-Infringement Contention, *Sharkninja Operating LLC* v. *RJ Brands, LLC* d/b/a CHEFMAN District of New Jersey No. 25-cv-05650, 3 pages.

Part No. SL320003441, https://web.archive.org/web/20210419164854/https://www.snowshock.com/products/sl320003441-regular-auger-spiral-spin-16/, Feb. 16, 2026, 6 pages.

Yu Defendant's Answer, Affirmative Defenses, and Counterclaims to Plaintiff's Consolidated Complaint, *SharkNinja Operating LLC et al.* v. *The Individuals, Corporations, Limited Liability Companies, Partnerships, And Unincorporated Associations Identified on Schedule A*, (S.D. FL. 2026) Case No. 1:26-cv-23083-RAR-LFL, 85 pages.

Amazon Ninja Slushi Twist, amazon.com, First available date Jun. 27, 2026 Retrieved from the internet Jul. 1, 2026<https://www.amazon.com/dp/B0H42H6WS4?I (Year: 2026), 5 pages.

CNET Ninja Slushi Twist, cnet.com, First available date May 20, 2026 Retrieved from the internet Jul. 2, 2026<https://www.cnet.com/home/kitchen-and-household/ninja-slushie-twist-summer-drinks/ (Year: 2026), 9 pages.

Exhibit A, Invalidity Analysis of Asserted Claims 24 and 30 of U.S. Pat. No. 12,593,855 B2, to Yu Defendants' Response in Opposition To Plaintiffs' Motion for Preliminary Injunction, *SharkNinja Operating LLC et al.* v. *The Individuals, Corporations, Limited Liability Companies, Partnerships, And Unincorporated Associations Identified on Schedule A*, (S.D. FL. 2026) Case No. 1:26-cv-23083-RAR-LFL, 11 pages.

Wired Ninja Slushi Twist, wired.com, First available date Jun. 30, 2026 Retrieved from the internet Jul. 1, 2026<https://www.wired.com/gallery/best-slushie-machines/ (Year: 2026), 23 pages.

Yu Defendants' Invalidity Analysis of Asserted Claims 24 and 30 of U.S. Pat. No. 12,593,855 B2 in Response to Plaintiffs' Renewed Preliminary Injunction Motion ECF No. 58 (The Refiled Exhibit 1 to ECF No. 67), 17 pages.

Yu Defendants' Response in Opposition to Plaintiffs' Motion for Preliminary Injunction *SharkNinja Operating LLC et al.* v. *The Individuals, Corporations, Limited Liability Companies, Partner-*

(56) References Cited

OTHER PUBLICATIONS

*ships, And Unincorporated Associations Identified on Schedule A*, (S.D. FL. 2026) Case No. 1:26-cv-23083-RAR-LFL, 21 pages.

* cited by examiner

1400

DRINK MAKER HAVING PHASE CHANGE DETECTION AND NOTIFICATION

CROSS REFERENCE TO RELATED APPLICATIONS

This application claims priority to U.S. Provisional Patent Application No. 63/669,144, filed Jul. 9, 2024, and is a continuation-in-part of U.S. patent application Ser. No. 18/423,894, filed Jan. 26, 2024, which is a continuation-in-part of U.S. patent application Ser. No. 18/415,817, filed Jan. 18, 2024, the disclosures of which are hereby incorporated by reference in their entireties.

BACKGROUND

1. Technical Field

The disclosure relates generally to drink makers and, in non-limiting embodiments or aspects, to a drink maker including automated control based on sensed conditions during drink product processing, including temperature and motor conditions.

2. Technical Considerations

Frozen drink makers, which also may be referred to as semi-frozen beverage makers or crushed-ice drink makers, may include a tank or mixing vessel in which a drink product is received and processed, including being cooled, often transforming the drink product from a pure liquid (or a combination of a liquid and portions of ice) to a frozen or semi-frozen product, such as, for example, a granita, slush drink, smoothie, ice cream, or other frozen or semi-frozen product, which is then dispensed. The cooled product may be dispensed through a tap, spigot, or dispenser. Thus, the term "frozen drink maker," as used herein, is not limited to a device that only makes drinks or frozen drinks, but includes devices that cool received drink products to produce cooled outputs in any of a variety of cooled, frozen, and semi-frozen forms. A drink product may consist of a liquid mixture, including water, juice, or milk, and may include additives, such as sugar, spirit, syrup, or flavoring powders, that give the drink product the desired taste and/or color. Frozen drink makers may include a mixing system within the mixing vessel, and further may include a refrigeration system to cool the drink product in the mixing vessel.

SUMMARY

Accordingly, provided is an improved drink maker configured with automated control based on sensed conditions during drink product processing.

According to non-limiting embodiments or aspects, provided is a drink maker. The drink maker includes a mixing vessel configured to receive a drink product, wherein the drink product is mixed within the mixing vessel. The drink maker also includes a cooling circuit configured to cool the drink product within the mixing vessel. The drink maker further includes a temperature sensor configured to periodically detect a temperature associated with the drink product and output periodic temperature signals indicative of the periodically detected temperature. The drink maker further includes a controller configured to determine whether a phase change of the drink product has occurred based on the periodic temperature signals, and control the cooling circuit based on determining whether the phase change has occurred.

In some non-limiting embodiments or aspects, the controller may be further configured to receive the periodic temperature signals during mixing of the drink product. The controller may also be further configured to determine, for each of the periodic temperature signals, a rate of change of temperature over a period of time based on the received periodic temperature signals. The controller may also be further configured to determine, for each determined rate of change, whether the determined rate of change is less than or equal to a threshold rate of change. The controller may also be further configured to determine that the phase change of the drink product has occurred based on determining that, for a first periodic temperature signal of the periodic temperature signals, the determined rate of change for a first respective period time corresponding to the first periodic temperature signal is less than or equal to the threshold rate of change.

In some non-limiting embodiments or aspects, the threshold rate of change may be in a range of about 0.08 degrees Celsius/30 seconds to 0.18 degrees Celsius/30 seconds.

In some non-limiting embodiments or aspects, the temperature sensor may be configured to periodically detect the temperature at an interval in a range of about 0.1 seconds to about 5 seconds.

In some non-limiting embodiments or aspects, each respective period of time may have a duration in a range of about 5 seconds to 60 seconds.

In some non-limiting embodiments or aspects, the temperature sensor may be configured to periodically detect the temperature at a plurality of intervals, each periodic temperature signal corresponding to a respective interval of the plurality of intervals and being associated with the temperature detected at the respective interval. The first respective period of time may include one or more of the plurality of intervals occurring before an interval corresponding to the first periodic temperature signal.

In some non-limiting embodiments or aspects, the controller may be further configured to determine a phase change temperature value corresponding to the phase change, and to control the cooling circuit based on the phase change temperature value.

In some non-limiting embodiments or aspects, the controller may be further configured to receive the periodic temperature signals during mixing of the drink product. The controller may also be further configured to determine, for each of the periodic temperature signals, a rate of change of temperature over a period of time based on the received periodic temperature signals. The controller may also be further configured to determine, for each determined rate of change, whether the determined rate of change is less than or equal to a threshold rate of change. The controller may also be further configured to determine that the phase change of the drink product has occurred based on determining that, for a first periodic temperature signal of the periodic temperature signals, the determined rate of change for a first respective period time corresponding to the first periodic temperature signal is less than or equal to the threshold rate of change. The temperature sensor may be configured to periodically detect the temperature at a plurality of intervals, each periodic temperature signal being associated with the temperature detected at a respective one of the intervals. The phase change temperature value may be determined from one or more of the temperature values detected for one or more intervals within the first respective period of time for which it is determined that the phase change has occurred.

In some non-limiting embodiments or aspects, the phase change temperature value may be set to a temperature value detected for at least one of the one or more intervals within the first respective period of time.

In some non-limiting embodiments or aspects, the controller may be further configured to calculate a target temperature value based on the determined phase change temperature value. The controller may also be further configured to control the cooling circuit to attain the target temperature value for the drink product in the mixing vessel.

In some non-limiting embodiments or aspects, the controller may be further configured to compare the phase change temperature value to a threshold temperature value. The controller may also be further configured to, in response to the phase change temperature value being greater than the threshold temperature value, control performance of at least one of: an alert to a user of the drink maker about an associated condition, a corrective action to address the associated condition, or any combination thereof.

In some non-limiting embodiments or aspects, the associated condition may include the drink product not being capable of being properly slushed by the drink maker due to an insufficient amount of one or more ingredients.

In some non-limiting embodiments or aspects, the one or more ingredients may include at least one of: sugar, alcohol, or any combination thereof.

In some non-limiting embodiments or aspects, the controller may be further configured to determine when a target temperature value for the drink product in the mixing vessel has been attained. The controller may also be further configured to determine whether the phase change of the drink product has occurred prior to the target temperature value being attained. The controller may also be further configured to, in response to determining that the phase change of the drink product has not occurred prior to the target temperature being attained, keep a compressor of the cooling circuit on until a phase change of the drink product is determined.

In some non-limiting embodiments or aspects, the controller may be further configured to, in response to a phase change of the drink product being determined, cycle the cooling circuit on and off to maintain the temperature at about the target temperature value.

In some non-limiting embodiments or aspects, the drink maker may further include a dasher, driven by a drive motor, configured to mix the drink product within the mixing vessel. The controller may be further configured to, in response to determining that the phase change of the drink product has not occurred prior to the target temperature being attained, pulse the drive motor of the dasher to trigger nucleation of the drink product.

In some non-limiting embodiments or aspects, the controller may be further configured to, in response to determining that the phase change of the drink product has occurred prior to the target temperature being attained, cycle the cooling circuit on and off to maintain the temperature at about the target temperature value.

In some non-limiting embodiments or aspects, the drink maker may further include a memory configured to store a drink data object representing a drink type corresponding to the drink product, the drink data object specifying a predefined temperature value for the drink product. The drink maker may also include a user interface. The controller may be further configured to determine the target temperature value based on at least one of: the predefined temperature value, a temperature adjustment value resulting from a user input from the user interface, or any combination thereof.

In some non-limiting embodiments or aspects, the controller may be further configured to determine whether a temperature of the drink product has descended below a low temperature threshold. The controller may be further configured to, in response to determining that the temperature of the drink product has descended below the low temperature threshold, perform at least one of: alerting a user of the drink maker, turning off the cooling circuit and a drive motor of the drink maker, cycling the cooling circuit off and on to prevent the temperature of the drink product from being reduced further, or any combination thereof.

In some non-limiting embodiments or aspects, the controller may be further configured to determine whether the determined phase change temperature value is below a low temperature threshold defined for phase change temperature values. The controller may be further configured to, in response to determining that the temperature of the drink product has descended below a low temperature threshold, perform at least one of: alerting a user of the drink maker, turning off the cooling circuit and a drive motor of the drink maker, cycling the cooling circuit off and on to prevent the temperature of the drink product from being reduced further, or any combination thereof.

According to non-limiting embodiments or aspects, provided is a method of processing a drink product in a drink maker. The method includes mixing the drink product within a mixing vessel of the drink maker. The method also includes cooling the drink product within the mixing vessel. The method further includes periodically detecting a temperature associated with the drink product. The method further includes outputting periodic temperature signals indicative of the periodically detected temperature. The method further includes determining, based on the periodic temperature signals, whether a phase change of the drink product has occurred. The method further includes controlling a cooling circuit of the drink maker based on determining whether the phase change has occurred.

In some non-limiting embodiments or aspects, the method may include receiving, with a controller of the drink maker, the periodic temperature signals during mixing of the drink product. The method may also include determining, with the controller and for reach of the periodic temperature signals, a rate of change of temperature over a period of time based on the received periodic temperature signals. The method may further include determining, with the controller and for each determined rate of change, whether the determined rate of change is less than or equal to a threshold rate of change. The method may further include determining, with the controller, that the phase change of the drink product has occurred based on determining that, for a first periodic temperature signal of the periodic temperature signals, the determined rate of change for a first respective period time corresponding to the first periodic temperature signal is less than or equal to the threshold rate of change.

In some non-limiting embodiments or aspects, the threshold rate of change may be in a range of about 0.08 degrees Celsius/30 seconds to 0.18 degrees Celsius/30 seconds.

In some non-limiting embodiments or aspects, the temperature sensor may be configured to periodically detect the temperature at an interval in a range of about 0.1 seconds to about 5 seconds.

In some non-limiting embodiments or aspects, each respective period of time may have a duration in a range of about 5 seconds to 60 seconds.

In some non-limiting embodiments or aspects, periodically detecting the temperature associated with the drink product may include periodically detecting the temperature at a plurality of intervals, each periodic temperature signal corresponding to a respective interval of the plurality of intervals and being associated with the temperature detected at the respective interval. The first respective period of time may include one or more of the plurality of intervals occurring before an interval corresponding to the first periodic temperature signal.

In some non-limiting embodiments or aspects, the method may include determining, with a controller of the drink maker, a phase change temperature value corresponding to the phase change. The method may also include controlling, with the controller, the cooling circuit based on the phase change temperature value.

In some non-limiting embodiments or aspects, the method may include receiving, with the controller, the periodic temperature signals during mixing of the drink product. The method may also include determining, with the controller and for each of the periodic temperature signals, a rate of change of temperature over a period of time based on the received periodic temperature signals. The method may further include determining, with the controller and for each determined rate of change, whether the determined rate of change is less than or equal to a threshold rate of change. The method may further include determining, with the controller, that the phase change of the drink product has occurred based on determining that, for a first periodic temperature signal of the periodic temperature signals, the determined rate of change for a first respective period time corresponding to the first periodic temperature signal is less than or equal to the threshold rate of change. The method may further include periodically detecting, with the temperature sensor, the temperature at a plurality of intervals, each periodic temperature signal being associated with the temperature detected at a respective one of the intervals. The method may further include determining, with the controller, the phase change temperature value from one or more of the temperature values detected for one or more intervals within the first respective period of time for which it is determined that the phase change has occurred.

In some non-limiting embodiments or aspects, the method may include setting, with the controller, the phase change temperature value to a temperature value detected for at least one of the one or more intervals within the first respective period of time.

In some non-limiting embodiments or aspects, the method may include calculating, with the controller, a target temperature value based on the determined phase change temperature value. The method may also include controlling, with the controller, the cooling circuit to attain the target temperature value for the drink product in the mixing vessel.

In some non-limiting embodiments or aspects, the method may include comparing, with the controller, the phase change temperature value to a threshold temperature value. The method may also include, in response to the phase change temperature value being greater than the threshold temperature value, controlling, with the controller, performance of at least one of: an alert to a user of the drink maker about an associated condition, a corrective action to address the associated condition, or any combination thereof.

In some non-limiting embodiments or aspects, the associated condition may include the drink product not being capable of being properly slushed by the drink maker due to an insufficient amount of one or more ingredients.

In some non-limiting embodiments or aspects, the one or more ingredients may include at least one of: sugar, alcohol, or any combination thereof.

In some non-limiting embodiments or aspects, the method may include determining, with the controller, when a target temperature value for the drink product in the mixing vessel has been attained. The method may also include determining, with the controller, whether the phase change of the drink product has occurred prior to the target temperature value being attained. The method may further include, in response to determining that the phase change of the drink product has not occurred prior to the target temperature being attained, keeping, with the controller, a compressor of the cooling circuit on until a phase change of the drink product is determined.

In some non-limiting embodiments or aspects, the method may include, in response to a phase change of the drink product being determined, cycling, with the controller, the cooling circuit on and off to maintain the temperature at about the target temperature value.

In some non-limiting embodiments or aspects, the method may include, in response to determining that the phase change of the drink product has not occurred prior to the target temperature being attained, pulsing, with the controller, a drive motor of a dasher of the drink maker to trigger nucleation of the drink product.

In some non-limiting embodiments or aspects, the method may include, in response to determining that the phase change of the drink product has occurred prior to the target temperature being attained, cycling, with the controller, the cooling circuit on and off to maintain the temperature at about the target temperature value.

In some non-limiting embodiments or aspects, the method may include storing, with a memory of the drink maker, a drink data object representing a drink type corresponding to the drink product, the drink data object specifying a predefined temperature value for the drink product. The method may further include, determining, with the controller, the target temperature value based on at least one of: the predefined temperature value, a temperature adjustment value resulting from a user input from a user interface of the drink maker, or any combination thereof.

In some non-limiting embodiments or aspects, the method may include determining, with the controller, whether a temperature of the drink product has descended below a low temperature threshold. The method may also include, in response to determining that the temperature of the drink product has descended below the low temperature threshold, performing, with the controller, at least one of: alerting a user of the drink maker, turning off the cooling circuit and a drive motor of the drink maker, cycling the cooling circuit off and on to prevent the temperature of the drink product from being reduced further, or any combination thereof.

In some non-limiting embodiments or aspects, the method may include determining, with the controller, whether the determined phase change temperature value is below a low temperature threshold defined for phase change temperature values. The method may also include, in response to determining that the temperature of the drink product has descended below a low temperature threshold, performing, with the controller, at least one of: alerting a user of the drink maker, turning off the cooling circuit and a drive motor of the drink maker, cycling the cooling circuit off and on to prevent the temperature of the drink product from being reduced further, or any combination thereof.

According to non-limiting embodiments or aspects, provided is a drink maker. The drink maker includes a mixing vessel configured to receive a drink product, wherein the drink product is mixed within the mixing vessel. The drink maker also includes a dasher, driven by a drive motor, configured to mix the drink product within the mixing vessel. The drink maker further includes a cooling circuit configured to cool the drink product within the mixing vessel. The cooling circuit includes a compressor. The drink maker further includes a motor condition sensor configured to periodically detect a motor condition associated with the drive motor and output periodic motor condition signals indicative of the periodically detected motor condition. The drink maker further includes a controller. The controller is configured to determine, based on one or more first motor condition signals of the periodic motor condition signals, whether a value of the motor condition satisfies a first motor condition threshold. The controller is also configured to, in response to determining that the value of the motor condition satisfies the first motor condition threshold, turn off the compressor for a first period of time.

In some non-limiting embodiments or aspects, the controller may be further configured to determine, based on one or more second periodic motor condition signals of the periodic motor condition signals, whether the value of the motor condition satisfies a second motor condition threshold greater than the first motor condition threshold. The controller may also be further configured to, in response to determining that the value of the motor condition satisfies the second motor condition threshold, turn off the drive motor.

In some non-limiting embodiments or aspects, the controller may be further configured to, after turning off the drive motor, turn on the drive motor after a period of time.

In some non-limiting embodiments or aspects, the controller may be further configured to repeatedly determine whether the value of the motor condition satisfies the second motor condition threshold. In some non-limiting embodiments or aspects, the controller may be further configured to, in response to determining that the value of the motor condition satisfies the second motor condition threshold, cycle the drive motor off and on until the controller determines that the value of the motor condition does not satisfy the second motor condition threshold.

In some non-limiting embodiments or aspects, the controller may be further configured to alert a user of the drink maker in response to determining that the value of the motor condition satisfies the second motor condition threshold.

In some non-limiting embodiments or aspects, the value of the motor condition satisfying the second motor condition threshold may be indicative of an imminent stalling of the drive motor.

In some non-limiting embodiments or aspects, the cooling circuit may further include an evaporator contained within a drum, an exterior surface of the drum being within the mixing vessel. The value of the motor condition satisfying the first motor condition threshold may be indicative of ice build-up on the exterior surface of the drum.

In some non-limiting embodiments or aspects, the controller may be further configured to periodically repeat determining whether the value of the motor condition satisfies a first motor condition threshold.

In some non-limiting embodiments or aspects, the motor condition may include at least one of: a motor electrical current, motor power, motor torque, or any combination thereof.

In some non-limiting embodiments or aspects, the motor condition may include the motor electrical current of the drive motor, and the first motor condition threshold may be associated with a predefined motor electrical current value.

According to non-limiting embodiments or aspects, provided is a method of processing a drink product in a drink maker. The method includes mixing the drink product within the mixing vessel. The method also includes cooling the drink product within the mixing vessel. The method further includes periodically detecting a motor condition associated with a drive motor of the drink maker. The method further includes outputting periodic motor condition signals indicative of the periodically detected motor condition. The method further includes determining, based on one or more first motor condition signals of the periodic motor condition signals, whether a value of the motor condition satisfies a first motor condition threshold. The method further includes, in response to determining that the value of the motor condition satisfies the first motor condition threshold, turning off a compressor of a cooling circuit of the drink maker for a first period of time.

In some non-limiting embodiments or aspects, the method may include determining, with a controller of the drink maker and based on one or more second periodic motor condition signals of the periodic motor condition signals, whether the value of the motor condition satisfies a second motor condition threshold greater than the first motor condition threshold. The method may also include, in response to determining that the value of the motor condition satisfies the second motor condition threshold, turning off, with the controller, the drive motor.

In some non-limiting embodiments or aspects, the method may include, after turning off the drive motor, turning on, with the controller, the drive motor after a period of time.

In some non-limiting embodiments or aspects, the method may include repeatedly determining, with the controller, whether the value of the motor condition satisfies the second motor condition threshold. The method may also include, in response to determining that the value of the motor condition satisfies the second motor condition threshold, cycling, with the controller, the drive motor off and on until the controller determines that the value of the motor condition does not satisfy the second motor condition threshold.

In some non-limiting embodiments or aspects, the method may include alerting, with the controller, a user of the drink maker in response to determining that the value of the motor condition satisfies the second motor condition threshold.

In some non-limiting embodiments or aspects, the value of the motor condition satisfying the second motor condition threshold may be indicative of an imminent stalling of the drive motor.

In some non-limiting embodiments or aspects, the cooling circuit may further include an evaporator within a drum, an exterior surface of the drum being within the mixing vessel. The value of the motor condition satisfying the first motor condition threshold may be indicative of ice build-up on the exterior surface of the drum.

In some non-limiting embodiments or aspects, the method may include periodically repeating determining, with a controller of the drink maker, whether the value of the motor condition satisfies a first motor condition threshold.

In some non-limiting embodiments or aspects, the motor condition may include at least one of: a motor electrical current, motor power, motor torque, or any combination thereof.

In some non-limiting embodiments or aspects, the motor condition may include the motor electrical current of the drive motor, and wherein the first motor condition threshold is associated with a predefined motor electrical current value.

According to non-limiting embodiments or aspects, provided is a drink maker. The drink maker includes a mixing vessel arranged to receive a drink product, wherein the drink product is mixed within the mixing vessel. The drink maker also includes a cooling circuit configured to cool the drink product within the mixing vessel. The drink maker further includes a temperature sensor configured to repeatedly detect a temperature associated with the drink product and output temperature signals indicative of the detected temperatures. The drink maker further includes a controller. The controller is configured to determine that a condition associated with a phase change of the drink product has been satisfied based on the temperature signals. The controller is also configured to, in response to determining the condition, alert a user of the drink maker.

In some non-limiting embodiments or aspects, the condition associated with the phase change of the drink product may include a threshold temperature value associated with the phase change of the drink product.

In some non-limiting embodiments or aspects, the threshold temperature value may include a minimum threshold temperature value. The controller may be configured to, when determining that the condition has been satisfied, determine that a temperature value of the phase change of the drink product is lower than or equal to the minimum threshold temperature value.

In some non-limiting embodiments or aspects, the threshold temperature value may include a maximum threshold temperature value. The controller may be configured to, when determining that the condition has been satisfied, determine that a temperature value of the phase change of the drink product is higher than or equal to the maximum threshold temperature value.

In some non-limiting embodiments or aspects, the temperature sensor may be configured to, when repeatedly detecting the temperature associated with the drink product, repeatedly detect the temperature associated with the drink product at a periodic interval in a range of about 0.1 seconds to about 5 seconds, wherein the temperature signals output from the temperature sensor are indicative of the detected temperature at a respective periodic interval.

In some non-limiting embodiments or aspects, the drink maker may also include at least one output device. The at least one output device may include at least one of a display, a speaker, or a light indicator. The controller may be configured to, when alerting the user of the drink maker, cause the at least one output device to alert the user of the drink maker.

In some non-limiting embodiments or aspects, the at least one output device may include at least one speaker and at least one light indicator. The controller may be configured to, when alerting the user of the drink maker, cause the at least one speaker to produce an aural alert, and cause the at least one light indicator to produce a visual alert.

In some non-limiting embodiments or aspects, the at least one output device may include at least one speaker. The at least one output device may be configured to, when caused by the controller to alert the user of the drink maker, emit a series of sounds from the at least one speaker.

In some non-limiting embodiments or aspects, the series of sounds may include a plurality of sounds having, when produced in series, at least one of descending pitch or descending volume.

In some non-limiting embodiments or aspects, the series of sounds may include a plurality of sounds having, when produced in series, at least one of ascending pitch or ascending volume.

In some non-limiting embodiments or aspects, the at least one output device may include a plurality of light indicators. The at least one output device may be configured to, when caused by the controller to alert the user of the drink maker, illuminate the plurality of light indicators in sequence.

In some non-limiting embodiments or aspects, the condition associated with the phase change of the drink product may include a threshold rate of change. The controller may be further configured to determine a rate of change of temperature based on the temperature signals.

In some non-limiting embodiments or aspects, the threshold rate of change may have a value in a range of about 0.002 degrees Celsius/second to about 0.006 degrees Celsius/second.

In some non-limiting embodiments or aspects, the controller may be configured to, when determining that the condition has been satisfied, determine that the rate of change of temperature is less than or equal to the threshold rate of change.

In some non-limiting embodiments or aspects, the controller may be configured to, in response to determining that the rate of change of temperature is less than or equal to the threshold rate of change, determine that the phase change has occurred.

In some non-limiting embodiments or aspects, the drink maker may also include at least one output device. The at least one output device may include at least one of a display, a speaker, or a light indicator. The controller may be configured to, when alerting the user of the drink maker, cause the at least one output device to alert the user of the drink maker that the phase change has occurred.

In some non-limiting embodiments or aspects, the controller may be configured to, when determining that the condition has been satisfied, determine that the rate of change of temperature is greater than or equal to the threshold rate of change.

In some non-limiting embodiments or aspects, the controller may be further configured to determine an elapsed time of a mixing of the drink product. The condition associated with the phase change of the drink product may further include a threshold duration. The controller may be further configured to, when determining that the threshold condition has been satisfied, determine that the elapsed time is greater than or equal to the threshold duration.

In some non-limiting embodiments or aspects, the controller may be configured to determine an elapsed time of a mixing of the drink product. The condition associated with the phase change of the drink product may include a threshold duration. The controller may be configured to, when determining that the threshold condition has been satisfied, determine that the elapsed time is greater than or equal to the threshold duration.

According to some non-limiting embodiments or aspects, provided is a method of processing a drink product in a drink maker. The method includes mixing the drink product within a mixing vessel of the drink maker. The method also includes cooling the drink product within the mixing vessel. The method further includes repeatedly detecting a temperature associated with the drink product. The method further includes outputting temperature signals indicative of the detected temperatures. The method further includes determining that a condition associated with a phase change of the drink product has been satisfied based on the repeatedly detected temperature. The method further includes, in response to determining the condition, alerting a user of the drink maker.

According to some non-limiting embodiments or aspects, provided is a drink maker. The drink maker includes a mixing vessel configured to receive a drink product. The drink product is mixed within the mixing vessel. The drink maker also includes a cooling circuit configured to cool the drink product within the mixing vessel. The drink maker further includes a housing including at least one ventilation panel. The at least one ventilation panel includes at least one array of holes configured to permit airflow to ventilate the housing. The at least one ventilation panel also includes at least one baffling proximate to an interior surface of the at least one ventilation panel. The at least one baffling is configured to at least partly occlude a set of holes in the at least one array of holes.

In some non-limiting embodiments or aspects, the at least one array of holes may include a two-dimensional array of holes across a surface of the at least one ventilation panel.

In some non-limiting embodiments or aspects, holes positioned on a perimeter of the two-dimensional array of holes may be configured with a smaller diameter than holes positioned inside the perimeter of the two-dimensional array of holes.

In some non-limiting embodiments or aspects, the set of holes that are at least partly occluded by the at least one baffling may be selected from the holes positioned inside the perimeter of the two-dimensional array of holes.

In some non-limiting embodiments or aspects, a maximum diameter of each hole of the at least one array of holes may be less than or equal to 0.25 inches.

In some non-limiting embodiments or aspects, each baffling of the at least one baffling may include a plurality of occluding portions and a plurality of connecting portions, each occluding portion of the plurality of occluding portions being connected to at least one other occluding portion by at least one connecting portion of the plurality of connecting portions.

In some non-limiting embodiments or aspects, the plurality of occluding portions and the plurality of connecting portions of each baffling of the at least one baffling may be configured as a linear strip.

In some non-limiting embodiments or aspects, each baffling of the at least one baffling may be positioned with a vertical orientation on an interior surface of the at least one ventilation panel. Each occluding portion of the plurality of occluding portions of each baffling of the at least one baffling may positionally correspond to a hole of the at least one array of holes.

In some non-limiting embodiments or aspects, a diameter of each occluding portion of the plurality of occluding portions of each baffling of the at least one baffling may be smaller than a positionally corresponding hole of the at least one array of holes.

In some non-limiting embodiments or aspects, a diameter of each occluding portion of the plurality of occluding portions of each baffling of the at least one baffling may be at least 50% of a diameter of a positionally corresponding hole of the at least one array of holes.

In some non-limiting embodiments or aspects, each hole of the at least one array of holes may have a substantially circular cross-section.

In some non-limiting embodiments or aspects, at least 50% of holes of the at least one array of holes may be at least partly occluded by the at least one baffling.

In some non-limiting embodiments or aspects, at least 75% of holes of the at least one array of holes may be at least partly occluded by the at least one baffling.

In some non-limiting embodiments or aspects, the at least one ventilation panel may include a first ventilation panel and a second ventilation panel. The first ventilation panel may include a first array of holes of the at least one array of holes and be positioned on a first side of the housing. The second ventilation panel may include a second array of holes of the at least one array of holes and be positioned on a second side of the housing opposite the first side.

In some non-limiting embodiments or aspects, the at least one baffling may include a first set of baffling strips and a second set of baffling strips. The first set of baffling strips may be proximate to an interior surface of the first ventilation panel and may be configured to at least partly occlude a first set of holes of the first array of holes. The second set of baffling strips may be proximate to an interior surface of the second ventilation panel and may be configured to at least partly occlude a second set of holes of the second array of holes.

In some non-limiting embodiments or aspects, a compressor may be configured to pump refrigerant through the cooling circuit. The compressor may be positioned in the housing at least partly between the first ventilation panel and the second ventilation panel.

In some non-limiting embodiments or aspects, the at least one baffling may be formed of at least one of plastic or elastomeric material configured to at least one of reflect or absorb sound energy from inside the housing.

In some non-limiting embodiments or aspects, the at least one baffling may be formed of a water-resistant material configured to reduce liquid penetration through the at least one ventilation panel.

In some non-limiting embodiments or aspects, a total cross-sectional area of the at least one array of holes may be at least 20% of a total cross-sectional area of the at least one ventilation panel.

In some non-limiting embodiments or aspects, the drink maker may also include a cooling fan positioned in the housing. The cooling fan may be configured to draw airflow through a rear panel of the housing and push airflow out of the housing through the at least one array of holes in the at least one ventilation panel.

Further non-limiting embodiments or aspects are set forth in the following numbered clauses:

Clause 1: A drink maker comprising: a mixing vessel configured to receive a drink product, wherein the drink product is mixed within the mixing vessel; a cooling circuit configured to cool the drink product within the mixing vessel; a temperature sensor configured to periodically detect a temperature associated with the drink product and output periodic temperature signals indicative of the periodically detected temperature; and a controller configured to: determine whether a phase change of the drink product has occurred based on the periodic temperature signals; and control the cooling circuit based on determining whether the phase change has occurred.

Clause 2: The drink maker of clause 1, wherein the controller is further configured to: receive the periodic temperature signals during mixing of the drink product; determine, for each of the periodic temperature signals, a rate of change of temperature over a period of time based on the received periodic temperature signals; determine, for each determined rate of change, whether the determined rate of change is less than or equal to a threshold rate of change; and determine that the phase change of the drink product has occurred based on determining that, for a first periodic temperature signal of the periodic temperature signals, the determined rate of change for a first respective period time corresponding to the first periodic temperature signal is less than or equal to the threshold rate of change.

Clause 3: The drink maker of clause 1 or clause 2, wherein the threshold rate of change is in a range of about 0.08 degrees Celsius/30 seconds to 0.18 degrees Celsius/30 seconds.

Clause 4: The drink maker of any of clauses 1-3, wherein the temperature sensor is configured to periodically detect the temperature at an interval in a range of about 0.1 seconds to about 5 seconds.

Clause 5: The drink maker of any of clauses 1-4, wherein each respective period of time has a duration in a range of about 5 seconds to 60 seconds.

Clause 6: The drink maker of any of clauses 1-5, wherein the temperature sensor is configured to periodically detect the temperature at a plurality of intervals, each periodic temperature signal corresponding to a respective interval of the plurality of intervals and being associated with the temperature detected at the respective interval, and wherein the first respective period of time includes one or more of the plurality of intervals occurring before an interval corresponding to the first periodic temperature signal.

Clause 7: The drink maker of any of clauses 1-6, wherein the controller is further configured to determine a phase change temperature value corresponding to the phase change, and to control the cooling circuit based on the phase change temperature value.

Clause 8: The drink maker of any of clauses 1-7, wherein the controller is further configured to: receive the periodic temperature signals during mixing of the drink product; determine, for each of the periodic temperature signals, a rate of change of temperature over a period of time based on the received periodic temperature signals; determine, for each determined rate of change, whether the determined rate of change is less than or equal to a threshold rate of change; and determine that the phase change of the drink product has occurred based on determining that, for a first periodic temperature signal of the periodic temperature signals, the determined rate of change for a first respective period time corresponding to the first periodic temperature signal is less than or equal to the threshold rate of change, wherein the temperature sensor is configured to periodically detect the temperature at a plurality of intervals, each periodic temperature signal being associated with the temperature detected at a respective one of the intervals, and wherein the phase change temperature value is determined from one or more of the temperature values detected for one or more intervals within the first respective period of time for which it is determined that the phase change has occurred.

Clause 9: The drink maker of any of clauses 1-8, wherein the phase change temperature value is set to a temperature value detected for at least one of the one or more intervals within the first respective period of time.

Clause 10: The drink maker of any of clauses 1-9, wherein the controller is further configured to: calculate a target temperature value based on the determined phase change temperature value; and control the cooling circuit to attain the target temperature value for the drink product in the mixing vessel.

Clause 11: The drink maker of any of clauses 1-10, wherein the controller is further configured to: compare the phase change temperature value to a threshold temperature value; and, in response to the phase change temperature value being greater than the threshold temperature value, control performance of at least one of: an alert to a user of the drink maker about an associated condition, a corrective action to address the associated condition, or any combination thereof.

Clause 12: The drink maker of any of clauses 1-11, wherein the associated condition comprises the drink product not being capable of being properly slushed by the drink maker due to an insufficient amount of one or more ingredients.

Clause 13: The drink maker of any of clauses 1-12, wherein the one or more ingredients include at least one of: sugar, alcohol, or any combination thereof.

Clause 14: The drink maker of any of clauses 1-13, wherein the controller is further configured to: determine when a target temperature value for the drink product in the mixing vessel has been attained; determine whether the phase change of the drink product has occurred prior to the target temperature value being attained; and, in response to determining that the phase change of the drink product has not occurred prior to the target temperature being attained, keep a compressor of the cooling circuit on until a phase change of the drink product is determined.

Clause 15: The drink maker of any of clauses 1-14, wherein the controller is further configured to, in response to a phase change of the drink product being determined, cycle the cooling circuit on and off to maintain the temperature at about the target temperature value.

Clause 16: The drink maker of any of clauses 1-15, further comprising a dasher, driven by a drive motor, configured to mix the drink product within the mixing vessel, wherein the controller is further configured to, in response to determining that the phase change of the drink product has not occurred prior to the target temperature being attained, pulse the drive motor of the dasher to trigger nucleation of the drink product.

Clause 17: The drink maker of any of clauses 1-16, wherein the controller is further configured to, in response to determining that the phase change of the drink product has occurred prior to the target temperature being attained, cycle the cooling circuit on and off to maintain the temperature at about the target temperature value.

Clause 18: The drink maker of any of clauses 1-17, further comprising: a memory configured to store a drink data object representing a drink type corresponding to the drink product, the drink data object specifying a predefined temperature value for the drink product; and a user interface, wherein the controller is further configured to determine the target temperature value based on at least one of: the predefined temperature value, a temperature adjustment value resulting from a user input from the user interface, or any combination thereof.

Clause 19: The drink maker of any of clauses 1-18, wherein the controller is further configured to: determine whether a temperature of the drink product has descended below a low temperature threshold; and, in response to determining that the temperature of the drink product has descended below the low temperature threshold, perform at least one of: alerting a user of the drink maker, turning off the cooling circuit and a drive motor of the drink maker, cycling the cooling circuit off and on to prevent the temperature of the drink product from being reduced further, or any combination thereof.

Clause 20: The drink maker of any of clauses 1-19, wherein the controller is further configured to: determine whether the determined phase change temperature value is below a low temperature threshold defined for phase change temperature values; and, in response to determining that the temperature of the drink product has descended below a low temperature threshold, perform at least one of: alerting a user of the drink maker, turning off the cooling circuit and a drive motor of the drink maker, cycling the cooling circuit off and on to prevent the temperature of the drink product from being reduced further, or any combination thereof.

Clause 21: A method of processing a drink product in a drink maker, comprising: mixing the drink product within a mixing vessel of the drink maker; cooling the drink product within the mixing vessel; periodically detecting a temperature associated with the drink product; outputting periodic temperature signals indicative of the periodically detected temperature; determining, based on the periodic temperature signals, whether a phase change of the drink product has occurred; and, controlling a cooling circuit of the drink maker based on determining whether the phase change has occurred.

Clause 22: The method of clause 21, further comprising: receiving, with a controller of the drink maker, the periodic temperature signals during mixing of the drink product; determining, with the controller and for reach of the periodic temperature signals, a rate of change of temperature over a period of time based on the received periodic temperature signals; determining, with the controller and for each determined rate of change, whether the determined rate of change is less than or equal to a threshold rate of change; and determining, with the controller, that the phase change of the drink product has occurred based on determining that, for a first periodic temperature signal of the periodic temperature signals, the determined rate of change for a first respective period time corresponding to the first periodic temperature signal is less than or equal to the threshold rate of change.

Clause 23: The method of clause 21 or clause 22, wherein the threshold rate of change is in a range of about 0.08 degrees Celsius/30 seconds to 0.18 degrees Celsius/30 seconds.

Clause 24: The method of any of clauses 21-23, wherein the temperature sensor is configured to periodically detect the temperature at an interval in a range of about 0.1 seconds to about 5 seconds.

Clause 25: The method of any of clauses 21-24, wherein each respective period of time has a duration in a range of about 5 seconds to 60 seconds.

Clause 26: The method of any of clauses 21-25, wherein periodically detecting the temperature associated with the drink product comprises periodically detecting the temperature at a plurality of intervals, each periodic temperature signal corresponding to a respective interval of the plurality of intervals and being associated with the temperature detected at the respective interval, and wherein the first respective period of time includes one or more of the plurality of intervals occurring before an interval corresponding to the first periodic temperature signal.

Clause 27: The method of any of clauses 21-26, further comprising: determining, with a controller of the drink maker, a phase change temperature value corresponding to the phase change; and controlling, with the controller, the cooling circuit based on the phase change temperature value.

Clause 28: The method of any of clauses 21-27, further comprising: receiving, with the controller, the periodic temperature signals during mixing of the drink product; determining, with the controller and for each of the periodic temperature signals, a rate of change of temperature over a period of time based on the received periodic temperature signals; determining, with the controller and for each determined rate of change, whether the determined rate of change is less than or equal to a threshold rate of change; determining, with the controller, that the phase change of the drink product has occurred based on determining that, for a first periodic temperature signal of the periodic temperature signals, the determined rate of change for a first respective period time corresponding to the first periodic temperature signal is less than or equal to the threshold rate of change; periodically detecting, with the temperature sensor, the temperature at a plurality of intervals, each periodic temperature signal being associated with the temperature detected at a respective one of the intervals; and determining, with the controller, the phase change temperature value from one or more of the temperature values detected for one or more intervals within the first respective period of time for which it is determined that the phase change has occurred.

Clause 29: The method of any of clauses 21-28, further comprising setting, with the controller, the phase change temperature value to a temperature value detected for at least one of the one or more intervals within the first respective period of time.

Clause 30: The method of any of clauses 21-29, further comprising: calculating, with the controller, a target temperature value based on the determined phase change temperature value; and controlling, with the controller, the cooling circuit to attain the target temperature value for the drink product in the mixing vessel.

Clause 31: The method of any of clauses 21-30, further comprising: comparing, with the controller, the phase change temperature value to a threshold temperature value; and, in response to the phase change temperature value being greater than the threshold temperature value, controlling, with the controller, performance of at least one of: an alert to a user of the drink maker about an associated condition, a corrective action to address the associated condition, or any combination thereof.

Clause 32: The method of any of clauses 21-31, wherein the associated condition comprises the drink product not being capable of being properly slushed by the drink maker due to an insufficient amount of one or more ingredients.

Clause 33: The method of any of clauses 21-32, wherein the one or more ingredients include at least one of: sugar, alcohol, or any combination thereof.

Clause 34: The method of any of clauses 21-33, further comprising: determining, with the controller, when a target temperature value for the drink product in the mixing vessel has been attained; determining, with the controller, whether the phase change of the drink product has occurred prior to the target temperature value being attained; and, in response to determining that the phase change of the drink product has not occurred prior to the target temperature being attained, keeping, with the controller, a compressor of the cooling circuit on until a phase change of the drink product is determined.

Clause 35: The method of any of clauses 21-34, further comprising, in response to a phase change of the drink product being determined, cycling, with the controller, the cooling circuit on and off to maintain the temperature at about the target temperature value.

Clause 36: The method of any of clauses 21-35, further comprising, in response to determining that the phase change of the drink product has not occurred prior to the target temperature being attained, pulsing, with the controller, a drive motor of a dasher of the drink maker to trigger nucleation of the drink product.

Clause 37: The method of any of clauses 21-36, further comprising, in response to determining that the phase change of the drink product has occurred prior to the target temperature being attained, cycling, with the controller, the cooling circuit on and off to maintain the temperature at about the target temperature value.

Clause 38: The method of any of clauses 21-37, further comprising: storing, with a memory of the drink maker, a drink data object representing a drink type corresponding to the drink product, the drink data object specifying a predefined temperature value for the drink product; and determining, with the controller, the target temperature value based on at least one of: the predefined temperature value, a temperature adjustment value resulting from a user input from a user interface of the drink maker, or any combination thereof.

Clause 39: The method of any of clauses 21-38, further comprising: determining, with the controller, whether a temperature of the drink product has descended below a low temperature threshold; and, in response to determining that the temperature of the drink product has descended below the low temperature threshold, performing, with the controller, at least one of: alerting a user of the drink maker, turning off the cooling circuit and a drive motor of the drink maker, cycling the cooling circuit off and on to prevent the temperature of the drink product from being reduced further, or any combination thereof.

Clause 40: The method of any of clauses 21-39, further comprising: determining, with the controller, whether the determined phase change temperature value is below a low temperature threshold defined for phase change temperature values; and, in response to determining that the temperature of the drink product has descended below a low temperature threshold, performing, with the controller, at least one of: alerting a user of the drink maker, turning off the cooling circuit and a drive motor of the drink maker, cycling the cooling circuit off and on to prevent the temperature of the drink product from being reduced further, or any combination thereof.

Clause 41: A drink maker comprising: a mixing vessel configured to receive a drink product, wherein the drink product is mixed within the mixing vessel; a dasher, driven by a drive motor, configured to mix the drink product within the mixing vessel; a cooling circuit configured to cool the drink product within the mixing vessel, the cooling circuit comprising a compressor; a motor condition sensor configured to periodically detect a motor condition associated with the drive motor and output periodic motor condition signals indicative of the periodically detected motor condition; a controller configured to: determine, based on one or more first motor condition signals of the periodic motor condition signals, whether a value of the motor condition satisfies a first motor condition threshold; and, in response to determining that the value of the motor condition satisfies the first motor condition threshold, turn off the compressor for a first period of time.

Clause 42: The drink maker of clause 41, wherein the controller is further configured to: determine, based on one or more second periodic motor condition signals of the periodic motor condition signals, whether the value of the motor condition satisfies a second motor condition threshold greater than the first motor condition threshold; and, in response to determining that the value of the motor condition satisfies the second motor condition threshold, turn off the drive motor.

Clause 43: The drink maker of clause 41 or clause 42, wherein the controller is further configured to, after turning off the drive motor, turn on the drive motor after a period of time.

Clause 44: The drink maker of any of clauses 41-43, wherein the controller is further configured to: repeatedly determine whether the value of the motor condition satisfies the second motor condition threshold; and, in response to determining that the value of the motor condition satisfies the second motor condition threshold, cycle the drive motor off and on until the controller determines that the value of the motor condition does not satisfy the second motor condition threshold.

Clause 45: The drink maker of any of clauses 41-44, wherein the controller is further configured to alert a user of the drink maker in response to determining that the value of the motor condition satisfies the second motor condition threshold.

Clause 46: The drink maker of any of clauses 41-45, wherein the value of the motor condition satisfying the second motor condition threshold is indicative of an imminent stalling of the drive motor.

Clause 47: The drink maker of any of clauses 41-46, wherein the cooling circuit further comprises an evaporator contained within a drum, an exterior surface of the drum being within the mixing vessel, and wherein the value of the motor condition satisfying the first motor condition threshold is indicative of ice build-up on the exterior surface of the drum.

Clause 48: The drink maker of any of clauses 41-47, wherein the controller is further configured to periodically repeat determining whether the value of the motor condition satisfies a first motor condition threshold.

Clause 49: The drink maker of any of clauses 41-48, wherein the motor condition comprises at least one of: a motor electrical current, motor power, motor torque, or any combination thereof.

Clause 50: The drink maker of any of clauses 41-49, wherein the motor condition comprises the motor electrical current of the drive motor, and wherein the first motor condition threshold is associated with a predefined motor electrical current value.

Clause 51: A method of processing a drink product in a drink maker, comprising: mixing the drink product within the mixing vessel; cooling the drink product within the mixing vessel; periodically detecting a motor condition associated with a drive motor of the drink maker; outputting periodic motor condition signals indicative of the periodically detected motor condition; determining, based on one or more first motor condition signals of the periodic motor condition signals, whether a value of the motor condition satisfies a first motor condition threshold; and, in response to determining that the value of the motor condition satisfies the first motor condition threshold, turning off a compressor of a cooling circuit of the drink maker for a first period of time.

Clause 52: The method of clause 51, further comprising: determining, with a controller of the drink maker and based on one or more second periodic motor condition signals of the periodic motor condition signals, whether the value of the motor condition satisfies a second motor condition threshold greater than the first motor condition threshold; and, in response to determining that the value of the motor condition satisfies the second motor condition threshold, turning off, with the controller, the drive motor.

Clause 53: The method of clause 51 or clause 52, further comprising, after turning off the drive motor, turning on, with the controller, the drive motor after a period of time.

Clause 54: The method of any of clauses 51-53, further comprising: repeatedly determining, with the controller, whether the value of the motor condition satisfies the second motor condition threshold; and, in response to determining that the value of the motor condition satisfies the second motor condition threshold, cycling, with the controller, the drive motor off and on until the controller determines that the value of the motor condition does not satisfy the second motor condition threshold.

Clause 55: The method of any of clauses 51-54, further comprising alerting, with the controller, a user of the drink maker in response to determining that the value of the motor condition satisfies the second motor condition threshold.

Clause 56: The method of any of clauses 51-55, wherein the value of the motor condition satisfying the second motor condition threshold is indicative of an imminent stalling of the drive motor.

Clause 57: The method of any of clauses 51-56, wherein the cooling circuit further comprises an evaporator within a drum, an exterior surface of the drum being within the mixing vessel, and wherein the value of the motor condition satisfying the first motor condition threshold is indicative of ice build-up on the exterior surface of the drum.

Clause 58: The method of any of clauses 51-57, further comprising periodically repeating determining, with a controller of the drink maker, whether the value of the motor condition satisfies a first motor condition threshold.

Clause 59: The method of any of clauses 51-58, wherein the motor condition comprises at least one of: a motor electrical current, motor power, motor torque, or any combination thereof.

Clause 60: The method of any of clauses 51-59, wherein the motor condition comprises the motor electrical current of the drive motor, and wherein the first motor condition threshold is associated with a predefined motor electrical current value.

Clause 61: A drink maker comprising: a mixing vessel arranged to receive a drink product, wherein the drink product is mixed within the mixing vessel; a cooling circuit configured to cool the drink product within the mixing vessel; a temperature sensor configured to repeatedly detect a temperature associated with the drink product and output temperature signals indicative of the detected temperatures; and a controller configured to: determine that a condition associated with a phase change of the drink product has been satisfied based on the temperature signals; and, in response to determining the condition, alert a user of the drink maker.

Clause 62: The drink maker of clause 61, wherein the condition associated with the phase change of the drink product comprises a threshold temperature value associated with the phase change of the drink product.

Clause 63: The drink maker of clause 61 or clause 62, wherein the threshold temperature value comprises a minimum threshold temperature value, and wherein the controller is configured to, when determining that the condition has been satisfied: determine that a temperature value of the phase change of the drink product is lower than or equal to the minimum threshold temperature value.

Clause 64: The drink maker of any of clauses 61-63, wherein the threshold temperature value comprises a maximum threshold temperature value, and wherein the controller is configured to, when determining that the condition has been satisfied: determine that a temperature value of the phase change of the drink product is higher than or equal to the maximum threshold temperature value.

Clause 65: The drink maker of any of clauses 61-64, wherein the temperature sensor is configured to, when repeatedly detecting the temperature associated with the drink product: repeatedly detect the temperature associated with the drink product at a periodic interval in a range of about 0.1 seconds to about 5 seconds, wherein the temperature signals output from the temperature sensor are indicative of the detected temperature at a respective periodic interval.

Clause 66: The drink maker of any of clauses 61-65, further comprising at least one output device, the at least one output device comprising at least one of a display, a speaker, or a light indicator, wherein the controller is configured to, when alerting the user of the drink maker: cause the at least one output device to alert the user of the drink maker.

Clause 67: The drink maker of any of clauses 61-66, wherein the at least one output device comprises at least one speaker and at least one light indicator, and wherein the controller is configured to, when alerting the user of the drink maker: cause the at least one speaker to produce an aural alert; and cause the at least one light indicator to produce a visual alert.

Clause 68: The drink maker of any of clauses 61-67, wherein the at least one output device comprises at least one speaker, and wherein the at least one output device is configured to, when caused by the controller to alert the user of the drink maker, emit a series of sounds from the at least one speaker.

Clause 69: The drink maker of any of clauses 61-68, wherein the series of sounds comprises a plurality of sounds having, when produced in series, at least one of descending pitch or descending volume.

Clause 70: The drink maker of any of clauses 61-69, wherein the series of sounds comprises a plurality of sounds having, when produced in series, at least one of ascending pitch or ascending volume.

Clause 71: The drink maker of any of clauses 61-70, wherein the at least one output device comprises a plurality of light indicators, and wherein the at least one output device is configured to, when caused by the controller to alert the user of the drink maker, illuminate the plurality of light indicators in sequence.

Clause 72: The drink maker of any of clauses 61-71, wherein the condition associated with the phase change of the drink product comprises a threshold rate of change, and wherein the controller is further configured to determine a rate of change of temperature based on the temperature signals.

Clause 73: The drink maker of any of clauses 61-72, wherein the threshold rate of change has a value in a range of about 0.002 degrees Celsius/second to about 0.006 degrees Celsius/second.

Clause 74: The drink maker of any of clauses 61-73, wherein the controller is configured to, when determining that the condition has been satisfied, determine that the rate of change of temperature is less than or equal to the threshold rate of change.

Clause 75: The drink maker of any of clauses 61-74, wherein the controller is configured to, in response to determining that the rate of change of temperature is less than or equal to the threshold rate of change, determine that the phase change has occurred.

Clause 76: The drink maker of any of clauses 61-75, further comprising at least one output device, the at least one output device comprising at least one of a display, a speaker, or a light indicator, wherein the controller is configured to, when alerting the user of the drink maker: cause the at least one output device to alert the user of the drink maker that the phase change has occurred.

Clause 77: The drink maker of any of clauses 61-76, wherein the controller is configured to, when determining that the condition has been satisfied, determine that the rate of change of temperature is greater than or equal to the threshold rate of change.

Clause 78: The drink maker of any of clauses 61-77, wherein the controller is further configured to determine an elapsed time of a mixing of the drink product, wherein the condition associated with the phase change of the drink product further comprises a threshold duration, and wherein the controller is further configured to, when determining that the threshold condition has been satisfied, determine that the elapsed time is greater than or equal to the threshold duration.

Clause 79: The drink maker of any of clauses 61-78, wherein the controller is configured to determine an elapsed time of a mixing of the drink product, wherein the condition associated with the phase change of the drink product comprises a threshold duration, and wherein the controller is configured to, when determining that the threshold condition has been satisfied, determine that the elapsed time is greater than or equal to the threshold duration.

Clause 80: A method of processing a drink product in a drink maker, the method comprising: mixing the drink product within a mixing vessel of the drink maker; cooling the drink product within the mixing vessel; repeatedly detecting a temperature associated with the drink product; outputting temperature signals indicative of the detected temperatures; determining that a condition associated with a phase change of the drink product has been satisfied based on the repeatedly detected temperature; and, in response to determining the condition, alerting a user of the drink maker.

Clause 81: A drink maker comprising: a mixing vessel configured to receive a drink product, wherein the drink product is mixed within the mixing vessel; a cooling circuit configured to cool the drink product within the mixing vessel; and a housing comprising at least one ventilation panel, the at least one ventilation panel comprising: at least one array of holes configured to permit airflow to ventilate the housing; and at least one baffling proximate to an interior surface of the at least one ventilation panel, the at least one baffling configured to at least partly occlude a set of holes in the at least one array of holes.

Clause 82: The drink maker of clause 81, wherein the at least one array of holes comprises a two-dimensional array of holes across a surface of the at least one ventilation panel.

Clause 83: The drink maker of clause 81 or clause 82, wherein holes positioned on a perimeter of the two-dimensional array of holes are configured with a smaller diameter than holes positioned inside the perimeter of the two-dimensional array of holes.

Clause 84: The drink maker of any of clauses 81-83, wherein the set of holes that are at least partly occluded by the at least one baffling are selected from the holes positioned inside the perimeter of the two-dimensional array of holes.

Clause 85: The drink maker of any of clauses 81-84, wherein a maximum diameter of each hole of the at least one array of holes is less than or equal to 0.25 inches.

Clause 86: The drink maker of any of clauses 81-85, wherein each baffling of the at least one baffling comprises a plurality of occluding portions and a plurality of connecting portions, each occluding portion of the plurality of occluding portions being connected to at least one other occluding portion by at least one connecting portion of the plurality of connecting portions.

Clause 87: The drink maker of any of clauses 81-86, wherein the plurality of occluding portions and the plurality of connecting portions of each baffling of the at least one baffling are configured as a linear strip.

Clause 88: The drink maker of any of clauses 81-87, wherein each baffling of the at least one baffling is positioned with a vertical orientation on an interior surface of the at least one ventilation panel, and wherein each occluding portion of the plurality of occluding portions of each baffling of the at least one baffling positionally corresponds to a hole of the at least one array of holes.

Clause 89: The drink maker of any of clauses 81-88, wherein a diameter of each occluding portion of the plurality of occluding portions of each baffling of the at least one baffling is smaller than a positionally corresponding hole of the at least one array of holes.

Clause 90: The drink maker of any of clauses 81-89, wherein a diameter of each occluding portion of the plurality of occluding portions of each baffling of the at least one baffling is at least 50% of a diameter of a positionally corresponding hole of the at least one array of holes.

Clause 91: The drink maker of any of clauses 81-90, wherein each hole of the at least one array of holes has a substantially circular cross-section.

Clause 92: The drink maker of any of clauses 81-91, wherein at least 50% of holes of the at least one array of holes are at least partly occluded by the at least one baffling.

Clause 93: The drink maker of any of clauses 81-92, wherein at least 75% of holes of the at least one array of holes are at least partly occluded by the at least one baffling.

Clause 94: The drink maker of any of clauses 81-93, wherein the at least one ventilation panel comprises a first ventilation panel and a second ventilation panel, the first ventilation panel comprising a first array of holes of the at least one array of holes and being positioned on a first side of the housing, and the second ventilation panel comprising a second array of holes of the at least one array of holes and being positioned on a second side of the housing opposite the first side.

Clause 95: The drink maker of any of clauses 81-94, wherein the at least one baffling comprises a first set of baffling strips and a second set of baffling strips, the first set of baffling strips proximate to an interior surface of the first ventilation panel and configured to at least partly occlude a first set of holes of the first array of holes, and the second set of baffling strips proximate to an interior surface of the second ventilation panel and configured to at least partly occlude a second set of holes of the second array of holes.

Clause 96: The drink maker of any of clauses 81-95, further comprising a compressor configured to pump refrigerant through the cooling circuit, wherein the compressor is positioned in the housing at least partly between the first ventilation panel and the second ventilation panel.

Clause 97: The drink maker of any of clauses 81-96, wherein the at least one baffling is formed of at least one of plastic or elastomeric material configured to at least one of reflect or absorb sound energy from inside the housing.

Clause 98: The drink maker of any of clauses 81-97, wherein the at least one baffling is formed of a water-resistant material configured to reduce liquid penetration through the at least one ventilation panel.

Clause 99: The drink maker of any of clauses 81-98, wherein a total cross-sectional area of the at least one array of holes is at least 20% of a total cross-sectional area of the at least one ventilation panel.

Clause 100: The drink maker of any of clauses 81-99, further comprising a cooling fan positioned in the housing, the cooling fan configured to draw airflow through a rear panel of the housing and push airflow out of the housing through the at least one array of holes in the at least one ventilation panel.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter.

BRIEF DESCRIPTION OF THE DRAWINGS

Additional advantages and details are explained in greater detail below with reference to the non-limiting, exemplary embodiments that are illustrated in the accompanying schematic figures, in which.

DETAILED DESCRIPTION

Figure 1:
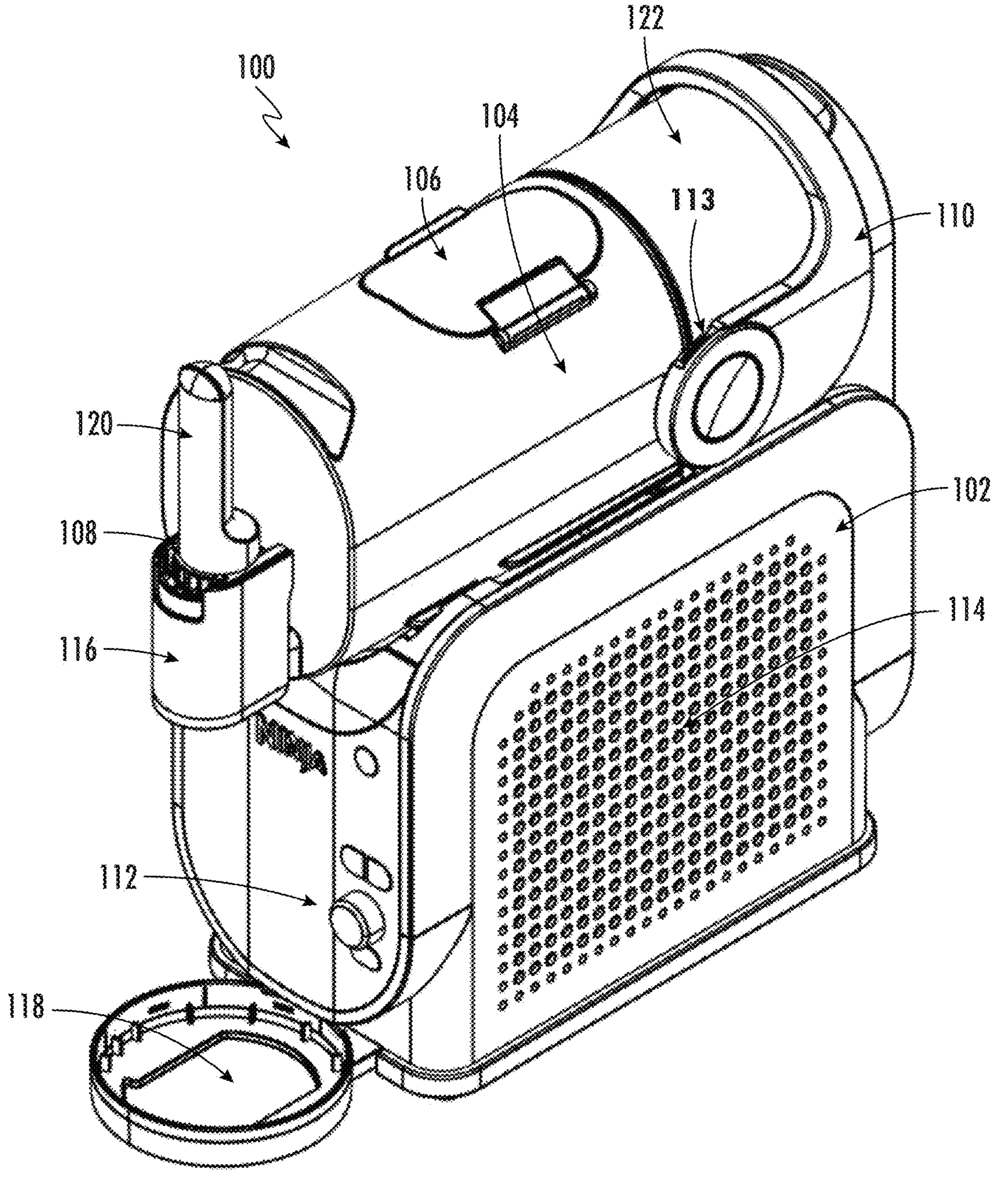
FIG. 1 is a perspective view of a frozen drink maker, according to some non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects of the disclosed subject matter. Hence, specific dimensions and other physical characteristics related to the embodiments or aspects disclosed herein are not to be considered as limiting.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. In addition, reference to an action being "based on" a condition may refer to the action being "in response to" the condition. For example, the phrases "based on" and "in response to" may, in some non-limiting embodiments or aspects, refer to a condition for automatically triggering an action (e.g., a specific operation of an electronic device, such as a computing device, a processor, a controller, and/or the like).

To illustrate implementations clearly and concisely, the drawings may not necessarily reflect appropriate scale and may have certain structures shown in somewhat schematic form. The disclosure may describe and/or illustrate structures in one implementation, and in the same way or in a similar way in one or more other implementations, and/or combined with or instead of the structures of the other implementations.

In the specification and claims, for the purposes of describing and defining the present disclosure, the terms "about" and "substantially" represent the inherent degree of uncertainty attributed to any quantitative comparison, value, measurement, or other representation. The terms "about" and "substantially" moreover represent the degree by which a quantitative representation may vary from a stated reference without resulting in a change in the basic function of the subject matter at issue. Open-ended terms, such as "comprise," "include," and/or plural forms of each, include the listed parts and can include additional parts not listed, while terms such as "and/or" include one or more of the listed parts and combinations of the listed parts.

The present disclosure, in various implementations, addresses deficiencies associated with automatically controlling drink product processing by sensing conditions, such as temperature and/or motor conditions (e.g., current, power, etc.), and controlling the operation of one or more components of the drink maker more efficiently in response to such sensed conditions. The present disclosure describes a number of systems, methods, and devices that enable a drink maker to automatically control a temperature of a drink product based on a target temperature value, which may be predetermined (e.g., stored in memory on the drink maker) or determined during processing the drink product, while further enabling the drink maker to automatically detect conditions of a drink product and/or the drink maker (e.g., the dasher drive motor) to mitigate possible adverse conditions (e.g., excessive ice buildup on the dasher), which could result in damage to the dasher, dasher drive motor, or other components of a drink maker. The present disclosure includes systems, methods, and devices that address a need for more adaptable and user-specific processing of drink products to ensure user-expected and more satisfying product outcomes, such as desired user-specific textures and temperatures of the drink product being processed.

It should be appreciated that the various non-limiting embodiments and aspects described herein are not limited to making frozen or semi-frozen drinks, but may be applied to produce a cold drink product that is cooler than a received drink product, but not frozen or semi-frozen. For example, in some non-limiting embodiments or aspects, the same or similar mechanisms and/or techniques described herein may be used as part of a cold drink machine to produce, maintain, and dispense cold drinks.

Referring now to FIG. 1, shown is a perspective view of a drink maker 100 (e.g., a frozen drink maker), according to some non-limiting embodiments or aspects. Drink maker 100 may include a housing 102 (e.g., a body of drink maker 100 enclosing at least some of the elements of drink maker 100) and a mixing vessel 104 (e.g., an at least partly enclosed volume for processing a drink product). Housing 102 may include a user interface 112 for receiving user inputs to control drink maker 100 (e.g., via one or more input devices), and/or for outputting information (e.g., via one or more output devices). User interface 112 may include one or more buttons, dials, switches, touchscreens, indicators, light-emitting diodes (LEDs), and the like. User interface 112 may display status information including, for example, a temperature of a drink product within mixing vessel 104, an indicator of a drink type (e.g., a recipe) and/or a program currently being implemented, a timer associated with the progress of the program currently being implemented, and/or the like. User interface 112 may provide indicators and/or warnings to a user regarding, for example, when a program is complete, when a user is expected to perform an action associated with processing a drink product, and/or the like. User interface 112 may include a selectable menu of drink types (e.g., recipes) and/or programs for different types of drink products such as, without limitation, granita, milkshake, frappé, frozen latte, slush drink, smoothie, margarita, daiquiri, piña colada, slushie, cool drink, semi-frozen drink, frozen drink, alcohol-based drink, non-alcohol-based drink, and the like, or any suitable combination of the foregoing.

Figure 2:
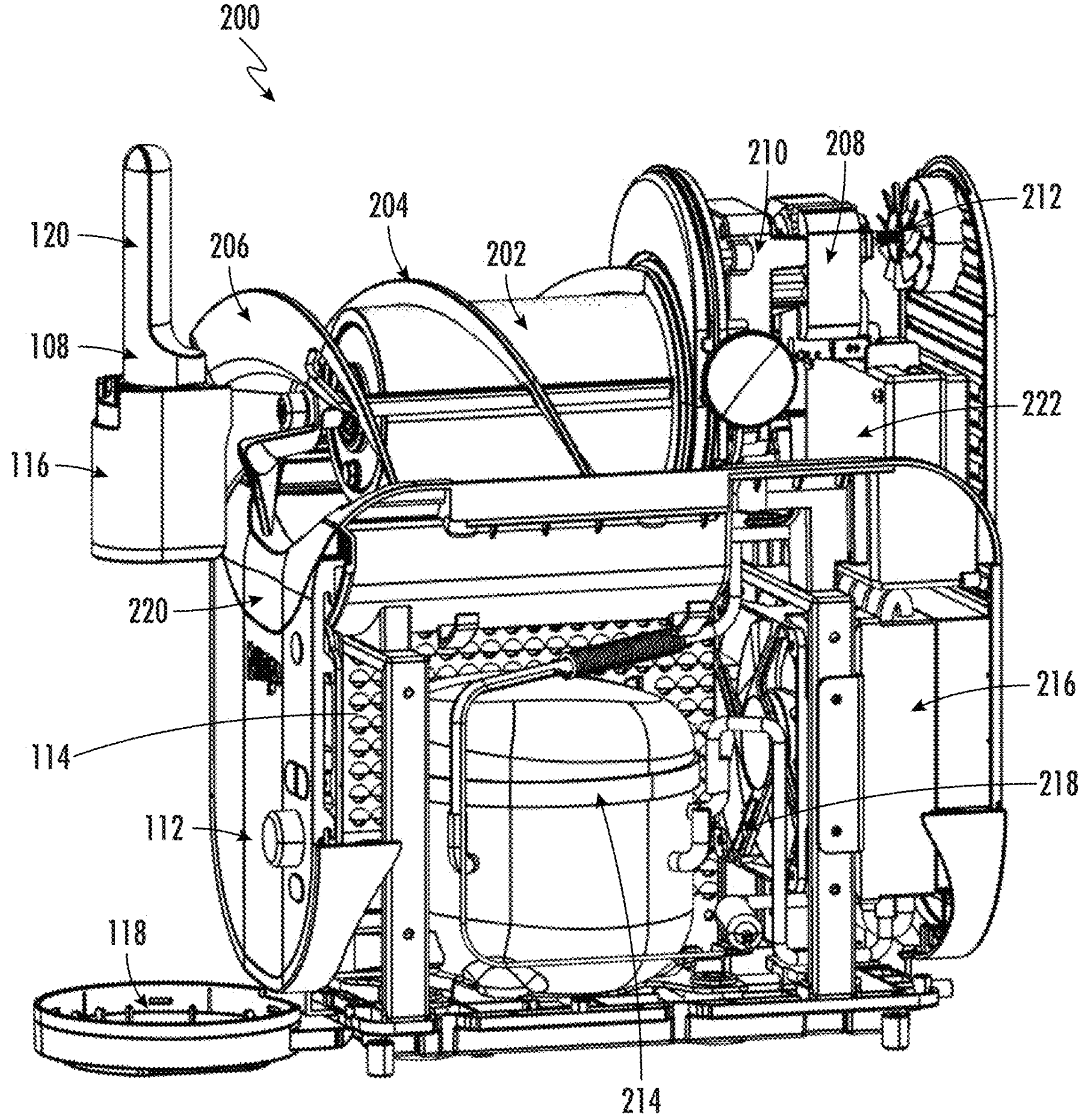
FIG. 2 is a view of various internal components within the housing and mixing vessel of the drink maker of FIG. 1, according to some non-limiting embodiments or aspects.

Housing 102 may include at least one ventilation panel 114 (e.g., an at least partly air-permeable wall) along a side of housing 102. Ventilation panel 114 may be removable from housing 102. Ventilation panel 114 may include a plurality of openings (e.g., holes) that facilitate air flow to aid in cooling components within housing 102. For example, a cooling fan (e.g., a compressor fan 218, as shown in FIG. 2) may draw cooler air into housing 102 through the rear of drink maker 100 (e.g., a real panel with vents) and expel warmer air from housing 102 through at least one ventilation panel 114. In some non-limiting embodiments or aspects, a ventilation panel 114 may be arranged on each opposing side of housing 102. For example, a first ventilation panel 114 is shown on a first side of drink maker 100 in FIG. 1, and a second ventilation panel 114 is shown on an opposing side of drink maker 100 in FIG. 2 (visible through the exposed interior). The configuration of ventilation panel 114 is further described in connection with FIGS. 22-25.

Housing 102 may include an upper housing section 122 that is configured to couple with a rear end of mixing vessel 104 when mixing vessel 104 is attached to housing 102. Mixing vessel 104 may include walls, or a portion thereof, that are transparent to enable a viewer to see a drink product within mixing vessel 104 during processing. Mixing vessel 104 may include a pour-in opening 106, whereby mixing vessel 104 may receive a drink product for processing within mixing vessel 104. FIG. 1 shows pour-in opening 106 in a closed configuration with a hinged cover covering pour-in opening 106. The cover may be detachably removable and/or moveable to open or close pour-in opening 106. Pour-in opening 106 may be dimensioned (e.g., configured with a narrow gap into the internal chamber of mixing vessel 104) and/or include a grate (e.g., intermittent blocking elements arranged over the gap into the internal chamber of mixing vessel 104) to inhibit a user from reaching a digit into mixing vessel 104 when pour-in opening 106 is open (e.g., when the cover is not installed). Mixing vessel 104 may include a dispenser assembly 108 having a user handle 120 (e.g., for operating dispenser assembly 108), a spout (not shown), and a spout shroud 116 (e.g., a cover at least partly enclosing over the spout). Dispenser assembly 108 may enable a user, by pulling down and/or outward on handle 120, to open a spout connected to a wall of mixing vessel 104, to dispense a processed (e.g., cooled) drink product from mixing vessel 104. The user may close the spout by pushing and/or releasing handle 120 back to an upright position (as shown in FIG. 1) and, thereby, stop the dispensing of the processed drink product.

Drink maker 100 may include a lever 110 that enables a locked coupling of mixing vessel 104 to housing 102 (e.g., to upper housing section 122). As shown in FIG. 1, lever 110 is in a locked and/or closed position, whereby mixing vessel 104 is engaged and/or coupled to housing 102 (e.g., upper housing section 122). In the closed and/or locked position, lever 110 may help to ensure (e.g., along with other components and features) that there is a water-tight seal between mixing vessel 104 and housing 102, to prevent leakage of drink product from mixing vessel 104. Lever 110 may be placed in the closed, coupled, and/or engaged position by sliding mixing vessel 104 up to and against upper housing section 122 and then rotating lever 110 in a clockwise (e.g., rearward) direction until its handle rests on or about the top surface of upper housing section 122. Mixing vessel 104 may be disengaged and/or decoupled from housing 102 (e.g., upper housing section 122) by pulling and/or rotating lever 110 in a counter-clockwise (e.g., frontward) direction toward the front of mixing vessel 104, which may cause lever 110 to release mixing vessel 104 from housing 102. Once released, mixing vessel 104 may slide in a forward direction (e.g., away from upper housing section 122) to be fully detached and/or removed from housing 102. Drink maker 100 may also include drip tray 118 positioned below dispenser assembly 108 and configured to collect any processed drink product that is not properly dispensed from mixing vessel 104 to a receiving vessel, for example, a drinking cup. Drip tray 118 may be removably attachable to a base of housing 102.

In some non-limiting embodiments or aspects, when lever 110 is moved relative to upper housing section 122, lever 110 may activate a cam 113, which may engage mating features on mixing vessel 104 to either couple or uncouple mixing vessel 104 relative to upper housing section 122. In some non-limiting embodiments or aspects, lever 110 may move less than 90° relative to upper housing section 122 when moving between the coupled position and the uncoupled position. In some non-limiting embodiments or aspects, lever 110 may include two cams 113 positioned on opposing sides of upper housing section 122. In some non-limiting embodiments or aspects, lever 110 may include one, two, three, four, or more cams 113. As lever 110 is moved, cam 113 may rotate with respect to upper housing section 122 (e.g., when positioned on a right side of drink maker 100, a counter-clockwise rotation with the raising of lever 110, as shown).

In some non-limiting embodiments or aspects, mixing vessel 104 may include protrusions on opposing outer sides, near the rear bottom of mixing vessel 104. The protrusions may be shaped and positioned to engage with cam 113 on lever 110. In particular, cam 113 may have channels and/or cam paths through which the protrusions slide, respectively. As cams 113 rotates toward the back of housing 102, the protrusions may slide along channels and/or cam paths and may be pulled toward upper housing section 122 and the rear of the housing 102, causing mixing vessel 104 to press against upper housing section 122 and form a water-tight seal with housing 102. When cams 113 are rotated toward the front of drink maker 100, the protrusions may be pushed away from upper housing section 122, causing mixing vessel 104 to be decoupled from contact with upper housing section 122.

In some non-limiting embodiments or aspects, cam 113 may be an over-center cam, as shown in FIG. 1, or cam 113 may have alternative geometry. Cam 113 may retain mixing vessel 104 on housing 102 when lever 110 is in the coupled position. Cam 113 may be positioned at least partly on an exterior of upper housing section 122, an interior of upper housing section 122, and/or the like. In some non-limiting embodiments or aspects, the protrusions of mixing vessel 104 may come into contact with channels and/or cam paths of cam 103 on an exterior of upper housing section 122. In some non-limiting embodiments or aspects, the protrusions of mixing vessel 104 may come into contact with channels and/or cam paths of cam 103 on an interior of upper housing section 122. In some non-limiting embodiments or aspects, cam 103 may be internal to upper housing section 122, and cam 103 may be separate from and mechanically coupled to lever 110. For example, when lever 110 (e.g., on the exterior of upper housing section 122) is moved, lever 110 may activate cam 103 (e.g., in the interior of upper housing section 122), which may engage mating features (e.g., protrusions) on mixing vessel 104 (e.g., on the interior of upper housing section 122) to couple mixing vessel 104 to upper housing section 122 (or disengage such mating features to uncouple mixing vessel 104 from upper housing section 122).

Referring now to FIG. 2, shown is a view 200 of various internal components within housing 102 and mixing vessel 104 of drink maker 100 of FIG. 1, according to some non-limiting embodiments or aspects. Drink maker 100 may include a cylindrical evaporator 202 (e.g., a heat exchanger that absorbs thermal energy from the drink product) that is surrounded by a dasher 204 (e.g., an auger). Evaporator 202 may include and/or be enclosed by a cylindrical drum (e.g., a smooth metal housing configured to act as a surface for drink product to contact and exchange heat energy with evaporator 202). Dasher 204 may include one or more mixing blades and/or protrusions that extend helically around evaporator 202. Dasher 204 may be driven to rotate by a central drive shaft within mixing vessel 104. The drive shaft may be surrounded by evaporator 202, and evaporator 202 may be configured in a fixed position while drive shaft rotates within evaporator 202. The drive shaft may be coupled via a gear assembly 210 to a drive motor 208. In some non-limiting embodiments or aspects, drive motor 208 may be an alternating current (AC) motor, but another type of motor may be used such as, without limitation, a direct current (DC) motor. Drive motor 208 may include a motor fan 212 configured to provide air cooling for motor 208. While FIG. 2 shows an implementation where drive motor 208 is not coaxially aligned with the drive shaft used to rotate dasher 204, in some non-limiting embodiments or aspects, motor 208 may be aligned coaxially with the drive shaft. During processing of a drink product, motor 208 may be continuously operated at one or more speeds to drive continuous rotation of dasher 204 and, thereby, provide continuous mixing of the drink product within mixing vessel 104.

As referenced above, drink maker 100 may include a removably attachable drip tray 118, which may be moved from the operational position shown in FIGS. 1 and 2. For example, drip tray 118 may be mounted and/or stored on a side panel of housing 102 (e.g., on ventilation panel 114 shown in FIG. 1; see also drip tray 118 illustrated in FIG. 3 as drip tray 118'). In some non-limiting embodiments or aspects, the rotation of dasher 204 may cause the helically arranged blades to push the cooling drink product to the front of mixing vessel 104. During processing, portions of the drink product may freeze against the surface of evaporator 202 as a result of being cooled by evaporator 202. In some non-limiting embodiments or aspects, the blades of the rotating dasher 204 may scrape frozen portions of the drink product from the surface of evaporator 202 while concurrently mixing and pushing the cooling drink product towards the front of mixing vessel 104.

Drink maker 100 may include a cooling circuit (e.g., a refrigeration system) to provide cooling of a drink product and/or to control the temperature of a drink product within mixing vessel 104. The cooling circuit may include a compressor 214, evaporator 202, a condenser 216, a condenser fan 218, a bypass valve, and conduit that carries refrigerant in a closed loop among the cooling circuit components to facilitate cooling and/or temperature control of a drink product in mixing vessel 104. Operations of the cooling circuit may be controlled by a controller (see, e.g., controller 402, as described further with respect to FIG. 4), which may be positioned proximal to user interface 112, drive motor 208, and/or elsewhere in housing 102. In some non-limiting embodiments or aspects, drink maker 100 may include a printed circuit board assembly (PCBA) 222 of one or more printed circuit boards (PCBs) within housing 102. As will be explained with respect to FIG. 4, PCBA 222 may include a control system 400 configured to automatically control certain operations of drink maker 100, and control system 400 may include controller 402.

Drink maker 100 may also include a condensation collection tray 220 configured to collect any liquid condensation caused by cooling from evaporator 202, as well as to catch accidentally spilled drink product caused by user error interacting with pour-in opening 106. FIG. 2 shows tray 220 in the inserted position. Tray 220 may be insertably removable from a slot within and/or on housing 102. Tray 220 may be inserted to enable the collection of liquid (e.g., condensation), removed for a user to empty the contents of tray 220, and then re-inserted into the slot for subsequent liquid collection. Tray 220 is configured to prevent liquid runoff into, onto, or down the outer surface of housing 102.

Figure 3:
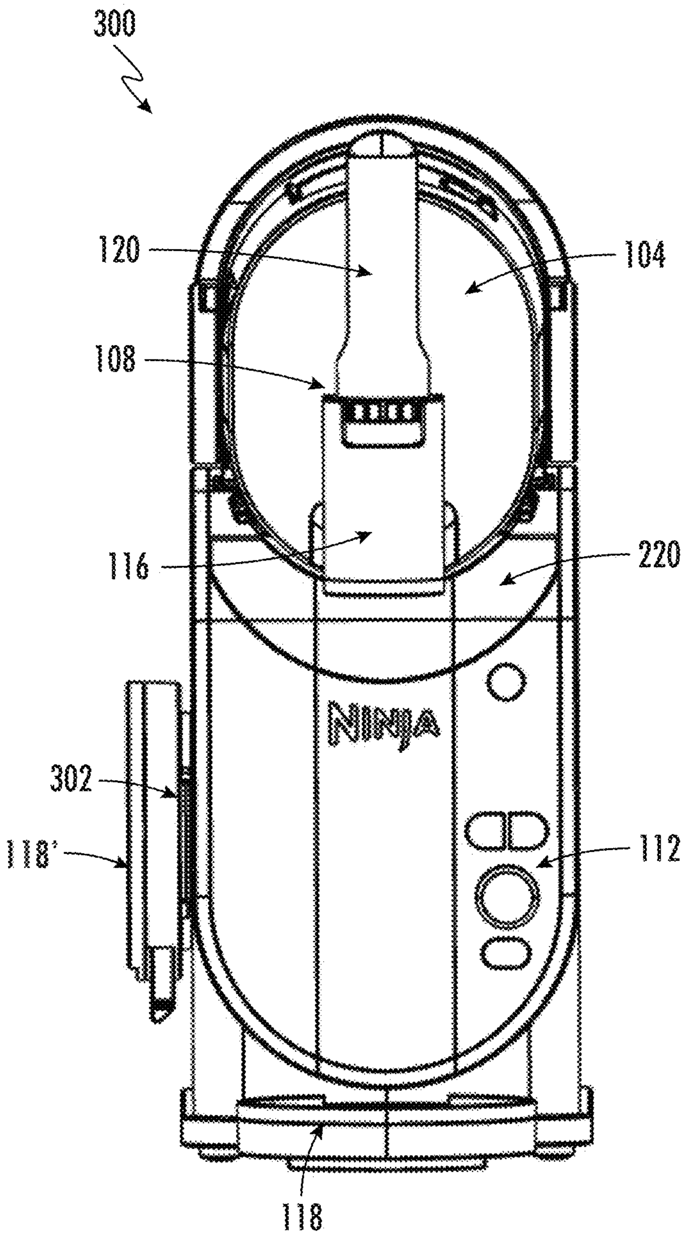
FIG. 3 is a front view of the drink maker of FIG. 1, according to some non-limiting embodiments or aspects.

Referring now to FIG. 3, shown is a front view 300 of drink maker 100 of FIGS. 1 and 2, according to some non-limiting embodiments or aspects. Drink maker 100 may include a user interface 112 on a front surface of housing 102. In some non-limiting embodiments or aspects, user interface 112 may be located on a side, top, or back of housing 102. Drink maker 100 may include a power interface (not shown) configured to receive AC power from a power outlet. In some non-limiting embodiments or aspects, drink maker 100 may include one or more batteries housed within housing 102 and configured to provide power to various components of drink maker 100. Drink maker 100 may include a mount 302 on a side of housing 102 where drip tray 118 can be mounted when not in use (shown as drip tray 118' in FIG. 3), such as during storage and/or transport of drink maker 100.

Figure 4:
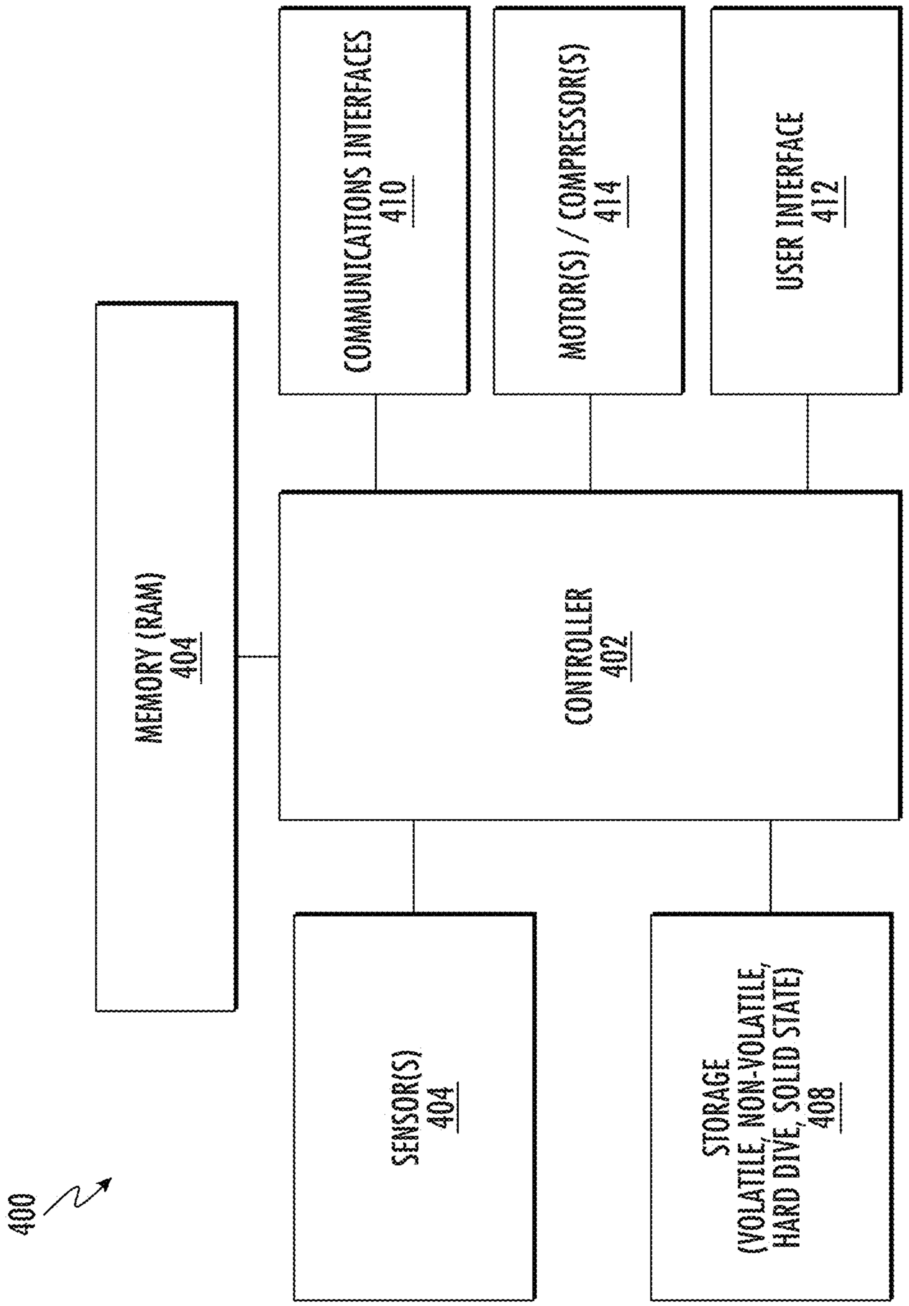
FIG. 4 is a schematic diagram of a control system of a drink maker, according to some non-limiting embodiments or aspects.

Referring now to FIG. 4, shown is a block diagram of an exemplary control system 400 of drink maker 100, according to some non-limiting embodiments or aspects. Control system 400 may include a microcontroller, a processor, a system-on-a-chip (SoC), a client device, and/or a physical computing device, and may include hardware and/or virtual processor(s). In some non-limiting embodiments or aspects, control system 400 and its elements, as shown in FIG. 4, each may relate to physical hardware, emulators, and/or virtual machines.

Control system 400 may include a user interface 412 (e.g., user interface 112), having, for example, a keyboard, keypad, one or more buttons, dials, touchpad, or sensor readout (e.g., biometric scanner), and one or more output devices, such as displays, speakers for audio, and/or light indicators (e.g., LED indicators). Control system 400 may also include one or more communications interfaces 410, such as a network communication unit that may include a wired communication component and/or a wireless communication component, which may be communicatively coupled to controller 402 (e.g., one or more hardware processors). The network communication unit may utilize any of a variety of proprietary or standardized network protocols (e.g., Ethernet, transfer control protocol/internet protocol (TCP/IP), etc.) to effect communications between controller 402 and another device, network, or system. Network communication units may also comprise one or more transceivers that utilize the Ethernet, power line communication (PLC), Wi-Fi®, cellular, and/or other communication methods. For example, control system 400 may send one or more communications associated with a status of drink maker 100 to a mobile device of a user, e.g., send an alert to the mobile device when a program is complete and/or a drink product is ready for dispensing, to indicate that the mixing vessel is low or out of a drink product, or to indicate another status or condition of drink maker 100.

Control system 400 may include a processing element, such as controller 402, that contains one or more hardware processors, where each hardware processor may have a single or multiple processor cores. In some non-limiting embodiments or aspects, controller 402 may include at least one shared cache that stores data (e.g., computing instructions) that are utilized by one or more other components of controller 402. For example, the shared cache may be a locally cached data stored in a memory for faster access by components of the processing elements that make up controller 402. Examples of processors may include, but are not limited to, a central processing unit (CPU), a microprocessor, and/or the like. Controller 402 may utilize a computer architecture base on, without limitation, the Intel® 8051 architecture, Motorola® 68HCX, Intel® 80×86, and/or the like. Controller 402 may include, without limitation, an 8-bit, 12-bit, 16-bit, 32-bit, or 64-bit architecture. Although not illustrated in FIG. 4, the processing elements that make up controller 402 may also include one or more other types of hardware processing components, such as graphics processing units (GPUs), application specific integrated circuits (ASICs), field-programmable gate arrays (FPGAs), digital signal processors (DSPs), and/or the like.

As shown in FIG. 4, memory 404 may be operatively and communicatively connected to controller 402. Memory 404 may be a non-transitory medium configured to store various types of data. For example, memory 404 may include and/or be associated with one or more storage devices 408 that include a non-volatile storage device and/or volatile memory. Volatile memory, such as random-access memory (RAM), may be any suitable non-permanent storage device. The non-volatile storage devices 408 may include one or more disk drives, optical drives, solid-state drives (SSDs), tape drives, flash memory, read-only memory (ROM), and/or any other type of memory designed to maintain data for a duration time after a power loss or shut down operation. In certain configurations, the non-volatile storage devices 408 may be used to store overflow data if allocated RAM is not large enough to hold all working data. The non-volatile storage devices 408 may also be used to store programs that are loaded into the RAM when such programs are selected for execution. Data store and/or storage devices 408 may be configured to store a plurality of drink product making and/or processing instruction programs associated with a plurality of drink product processing sequences. Such drink product making and/or processing instruction programs may include instructions for controller 402 to: start or stop one or more motors and/or compressors 414 (e.g., such as drive motor 208 and/or compressor 214), start or stop compressor 214 to regulate a temperature of a drink product being processed within mixing vessel 104, operate the one or more motors and/or compressors 414 (e.g., drive motor 208 and/or compressor 214) at certain periods during a particular drink product processing sequence, operate drive motor 208 at certain speeds during certain periods of time of a program, issue one or more cue instructions to user interface 412 (e.g., user interface 112) that are output to a user to illicit a response, action, and/or input from the user, and/or the like.

In some non-limiting embodiments or aspects, one or more drink data objects (e.g., groupings of structured data associated with a drink type that may include program instructions related to the drink type) may be stored in memory 404 in the form of a digital object (or record) representing a type of drink (e.g., slush, cocktail, frappé, juice, milkshake, etc.). Each drink data object may define and/or reference data such as temperature values and/or other setting values associated with the drink type, where the drink data object also may include computing instructions and/or computer programs defining functions, actions, and/or processing sequences to be performed on the digital object.

Software programs may be developed, encoded, and compiled in a variety of computing languages for a variety of software platforms and/or operating systems and subsequently loaded and executed by controller 402. In some non-limiting embodiments or aspects, the compiling process of the software program may transform program code written in a programming language to another computer language such that the controller 402 is able to execute the programming code. For example, the compiling process of the software program may generate an executable program that provides encoded instructions (e.g., machine code instructions) for controller 402 to accomplish specific, non-generic, particular computing functions.

After the compiling process, the encoded instructions may be loaded as computer executable instructions or process steps to controller 402 from storage 408, from memory 404, and/or embedded within controller 402 (e.g., via a cache or on-board ROM). Controller 402 may be configured to execute the stored instructions or process steps in order to perform instructions or process steps to transform the electronic control system 400 into a non-generic, particular, specially programmed machine or apparatus. Stored data, e.g., data stored by a data store and/or storage device 408, may be accessed by controller 402 during the execution of computer executable instructions or process steps to instruct one or more components within control system 400 and/or other components or devices external to control system 400. For example, the drink data objects associated with drink types may be arranged in a lookup table and/or database within storage device 408 and be accessed by controller 402 when processing a particular drink type selected by a user via user interface 412 (e.g., user interface 112).

User interface 412 (e.g., user interface 112) may include a display, positional input device (e.g., a mouse, touchpad, touchscreen, or the like), keyboard, keypad, one or more buttons, one or more dials, a microphone, speaker, or other forms of user input and output devices. The components of user interface 412 may be communicatively coupled to controller 402. When an output device of user interface 412 is or includes a display, the display may be implemented in various ways, including by a liquid crystal display (LCD), a cathode-ray tube (CRT) display, a light emitting diode (LED) display, such as an organic LED (OLED) display, and/or the like.

Sensor(s) 406 may include one or more sensors that detect and/or monitor conditions of a drink product within mixing vessel 104, conditions associated with a component of drink maker 100, and/or conditions of a refrigerant or coolant within the cooling circuit. Conditions may include, without limitation, rotation, speed of rotation, and/or movement of a device or component (e.g., drive motor 208, the drive shaft driven thereby, dasher 204, etc.), rate of such movement, frequency of such movement, direction of such movements, motor current, motor voltage, motor power, motor torque, temperature, pressure, fluid level in mixing vessel 104, position of a device or component (e.g., whether pour-in opening 106 is open or closed), and/or the presence of a device or component (e.g., whether shroud 116 is installed or not). Types of sensors may include, for example, electrical metering chips, Hall sensors, pressure sensors, temperature sensors, optical sensors, current sensors, torque sensors, voltage sensors, cameras, other types of sensors, or any suitable combination of the foregoing. Drink maker 100 may include one or more temperature sensors positioned in various locations within mixing vessel 104 such as, for example, on or about the lower front area within mixing vessel 104, on or about the upper front area within mixing vessel 104, on or about the upper rear area within vessel 104, within one or more coils of evaporator 202, and/or within housing 102.

Sensor(s) 406 may also include one or more safety and/or interlock switches that prevent or enable operation of certain components (e.g., drive motor 208, compressor 214, etc.), when certain conditions are met (e.g., when a lid or cover for opening 106 is attached or closed, when a sufficient level of drink product is in mixing vessel 104, when lever 110 is moved to a coupled position, when mixing vessel 104 is secured to housing 102, and/or the like). It will be appreciated that control system 400 may include other electronic components, such as power sources and/or analog-to-digital converters, not explicitly shown in FIG. 4.

In some non-limiting embodiments or aspects, control system 400 and/or controller 402 may include an SoC having multiple hardware components, including but not limited to: a microcontroller, a microprocessor or digital signal processor (DSP) core, and/or multiprocessor SoCs (MPSoC) having more than one processor cores; memory blocks including a selection of read-only memory (ROM), random access memory (RAM), erasable programmable read-only memory (EPROM), electronically erasable programmable read-only memory (EEPROM), compact disc read-only memory (CD-ROM), digital versatile disc read-only memory (DVD-ROM), and/or flash memory; timing sources, including oscillators and phase-docked loops; peripherals, including counter-timers, real-time timers, and power-on reset generators; external interfaces, including universal serial bus (USB), FireWire®, Ethernet, universal synchronous/asynchronous receiver/transmitter (USART), serial peripheral interface (SPI); analog interfaces including analog-to-digital converters (ADCs) and digital-to-analog converters (DACs); voltage regulators and power management circuits; or any combination thereof.

A SoC may include both the hardware, described above, and software controlling the microcontroller, microprocessor, and/or DSP cores, peripherals, and interfaces. SoCs may be developed from pre-qualified hardware blocks for the hardware elements (e.g., referred to as modules or components which represent an IP core or IP block), together with software drivers that control their operation. The above listing of hardware elements is not exhaustive. A SoC may include protocol stacks that drive interfaces like a universal serial bus (USB).

Once the overall architecture of the SoC has been defined, individual hardware elements may be described in the abstract language register-transfer level (RTL). RTL may be used to define the circuit behavior. Hardware elements may be connected together in the same RTL language to create the full SoC configuration. RTL is a design abstraction that models a synchronous digital circuit in terms of the flow of digital signals (e.g., data) between hardware registers, and the logical operations performed on those signals. RTL abstraction may be used in hardware description languages (HDLs), such as Verilog® and very high speed integrated circuit (VHSIC) hardware description language (VHDL), to create high-level representations of a circuit, from which lower-level representations and ultimately actual wiring can be derived. Verilog® is standardized as Institute of Electrical and Electronic Engineers (IEEE) 1364 and is a hardware description language (HDL) used to model electronic systems. In some non-limiting embodiments or aspects, various components of control system 400 may be implemented on a PCBA, such as PCBA 222.

With further reference to FIGS. 1-4, and in some non-limiting embodiments or aspects, a user may fill mixing vessel 104 via pour-in opening 106 with ingredients associated with a drink product, where one or more ingredients may be added at a time or added in pre-mixed form. The user may select the type of drink product to be processed via user interface 112. For example, the user may select a drink type for "margarita", or a more generic drink type such as "alcohol drink" or "cocktail." In some non-limiting embodiments or aspects, the user may select the drink product type and/or program before filling mixing vessel 104, and user interface 112 may provide one or more indicators or cues (e.g., visual feedback, aural feedback, etc.) that instruct the user to add ingredients to mixing vessel 104. Mixing vessel 104 may include one or more fill sensors that detect when a sufficient amount or level of ingredients and/or fluid is within mixing vessel 104. The one or more fill sensors may provide a signal to controller 402 that indicates when mixing vessel 104 is sufficiently filled or not filled. Controller 402 may prevent operations of drink maker 100 (e.g., prevent activation of drive motor 208 and/or other components) if the fill sensors indicate that mixing vessel 104 is not sufficiently filled. A lid sensor may be associated with opening 106, whereby the lid sensor may send an open and/or closed signal to controller 402 that indicates whether opening 106 is open or closed. Controller 402 may prevent operations of drink maker 100 if the lid sensor indicates that opening 106 is open and/or not closed. Depending on the sensed condition, user interface 112 may provide an indication regarding the condition (e.g., that vessel 104 is sufficiently filled or not sufficiently filled, that opening 106 is not closed, and/or the like) to enable a user to take appropriate action(s).

Once mixing vessel 104 is filled with ingredients, the user may provide an input (e.g., a button press) to start processing of the drink product based on the selected drink type. Processing may include activation of drive motor 208 to drive rotation of dasher 204 and/or blade 206 to effect mixing of the ingredients of the drink product. Processing may also include activation of the cooling circuit, including activation of compressor 214 and condenser fan 218. The compressor 214 may facilitate refrigerant flow through one or more coils of evaporator 202 and through condenser 216 to provide cooling and/or temperature control of the drink product within mixing vessel 104. Controller 402 may control operations of various components, such as drive motor 208 and compressor 214. To regulate temperature at a particular setting associated with a drink type or program, controller 402 may activate/start and/or deactivate/stop compressor 214 to start and/or stop refrigerant flow through the coil(s) of evaporator 202 and, thereby, start or stop cooling of the drink product within mixing vessel 104.

By cooling a drink product to a particular temperature, slush and/or ice particles may be formed within the drink product. The amount of particles and/or texture of a drink product may correspond to a temperature of the drink product. For example, as the temperature of the drink product becomes cooler, more particles may form, larger particles may form, etc., and the drink product may become slushier. User interface 112 may enable a user to fine tune and/or adjust a preset temperature associated with a drink type to enable a user to adjust the temperature and/or texture (e.g., thickness) of a drink product to a more desirable temperature and/or texture.

Controller 402 may perform processing of the drink product for a set period of time in one or more phases and/or until a target temperature and/or texture is determined. Controller 402 may receive one or more temperature signals from one or more temperature sensors 406 within mixing vessel 104 to determine the temperature of the drink product. In some non-limiting embodiments or aspects, controller 402 may determine the temperature of the drink product by determining an average temperature among temperatures detected by multiple temperature sensors 406. In some non-limiting embodiments or aspects, controller 402 may determine the temperature of the drink product based on the detected temperature from one sensor 406 within mixing vessel 104, and/or based on a temperature of the refrigerant detected by a refrigerant temperature sensor 406. Once a phase and/or sequence of a program is determined to be complete by controller 402, controller 402 may, via user interface 112, provide a visual and/or audio indication that the program is complete and the processed drink product is ready for dispensing. In response, a user may place a cup or other receiving vessel below dispenser assembly 108 and pull handle 120 in an outward/downward direction to open a spout located at about the lower front wall of mixing vessel 104, resulting in dispensing of the drink product into the cup or other receiving vessel. Once filled, the user can close the spout by releasing/pushing handle 120 back to its upright position, as shown in FIG. 2. In implementations where handle 120 is spring-biased to the closed position, the user can release their hold of handle 120 and, thereby allow a spring force to move handle 120 back and rotationally upward, away from the user to the upright and closed position.

With further reference to FIGS. 1-4, drink maker 100 may determine when a phase change of a drink product occurs during processing by drink maker 100 and take action accordingly. In some non-limiting embodiments or aspects, a phase change temperature value indicative of a point at which the phase change occurs may be determined, and a target temperature value to attain and maintain for the drink product during processing may be determined from the phase change temperature value. Other determinations may be made and actions taken based on the determination of the phase change and phase change temperature value. In some non-limiting embodiments or aspects, a predetermined target temperature associated with a drink type (e.g., selected by a user or determined by processing a drink product) may be accessed, for example, from a memory of the drink maker, over a wireless interface, and/or the like.

As described herein, during the cooling of the drink product, a phase change of the drink product may be expected to occur before the target temperature is reached. When controller 402 of drink maker 100 determines that the target temperature associated with a drink type (e.g., juice, cocktail, milkshake, soft drink, etc.) is attained, controller 402 may determine whether a phase change has already been detected during processing. Additionally, or alternatively, when controller 402 determines that a phase change has occurred, controller 402 may determine whether the target temperature associated with the drink type has already been attained during processing. In either case, if the phase change has not occurred before the predetermined target temperature is reached, this may be indicative of a supercooling event having occurred, or user error having occurred. In the latter scenario, the drink product being processed may have a phase change temperature value lower than the phase change temperature value associated with the drink type selected by the user (and thus a lower target temperature than the predetermined target temperature for the drink type).

In some non-limiting embodiments or aspects, in response to a phase change having not occurred before the predetermined target temperature is reached, controller 402 may be configured to leave the cooling circuit on, and in some cases pulse (e.g., periodically activate and deactivate) drive motor 208 to trigger nucleation until a phase change is determined to occur. If a phase change is detected before the predetermined target temperature is reached, the cooling circuit may be cycled (e.g., turned off and on one or more times) to maintain the temperature at or about the target temperature (or an adjusted target temperature if a user has specified any temperature and/or thickness adjustments).

In some non-limiting embodiments or aspects, if a phase change is not detected before the predetermined target temperature is reached, but rather after the continued cooling and/or pulsing of drive motor 208, the cooling circuit may be cycled in a controlled fashion and dasher 204 left on until the predetermined target temperature is reached (plus or minus any user adjustments), as described herein. If supercooling was the reason that the phase change was not detected before the predetermined target temperature value was reached, the controlled pulsing of drive motor 208 may result in the phase change being triggered and the drink product having an expected desired thickness. If, however, the phase change was not detected before the predetermined target temperature value because of the aforementioned user error, then the target temperature may be recalculated, for example, based on the determined phase change temperature value, and the cooling circuit continually cycled until the recalculated target temperature is achieved.

In some non-limiting embodiments or aspects, a minimum drink product temperature may be predefined (e.g., a minimum temperature threshold for which drink maker 100 is not capable of producing a lower temperature or for which doing so could damage drink maker 100). Controller 402 may be configured to detect when the temperature has reached the minimum threshold and control one or more actions to be taken. For example, the user may be alerted (e.g., visually, haptically, and/or aurally) through one or more output devices of drink maker 100 (e.g., displays, speakers, vibration motors, light indicators, etc.) that drink maker 100 cannot make an adequate slush for the drink product. Controller 402 may also be configured, when the minimum temperature is detected, to maintain the drink product at the minimum temperature as a cold drink and to alert the user of same.

In some non-limiting embodiments or aspects, a minimum phase change temperature value may be predefined. As described herein, the target temperature value of a drink product being chilled may be lower than the phase change temperature value. Controller 402 may be configured to determine when a determined phase change temperature value is below the minimum phase change temperature value, such that the target temperature will not be capable of being achieved by drink maker 100 because such target temperature would be below the minimum temperature threshold. Controller 402 may be configured to control one or more actions to be taken when it is determined that the determined phase change temperature value is below the minimum phase change temperature value. For example, controller 402 may cause one or more output devices of drink maker 100 to alert the user visually, haptically, and/or aurally, such as to indicate that drink maker 100 cannot make an adequate slush for the drink product. Controller 402 may also be configured, when it is determined that the determined phase change temperature value is below the minimum phase change temperature value, to maintain the drink product at the minimum temperature as a cold drink and to alert the user of same.

If a drink product does not have a high enough concentration of certain ingredients (e.g., sugar, alcohol, etc.), it may be difficult to reliably produce a slush from it, or doing so may damage drink maker 100, for reasons described herein. A maximum phase change temperature value threshold value may be defined, and controller 402 may be configured to determine if a determined phase change temperature value exceeds the maximum phase change temperature value. Controller 402 may control performance of one or actions if the threshold value is exceeded, for example, alerting a user and/or performing corrective actions.

Figure 5:
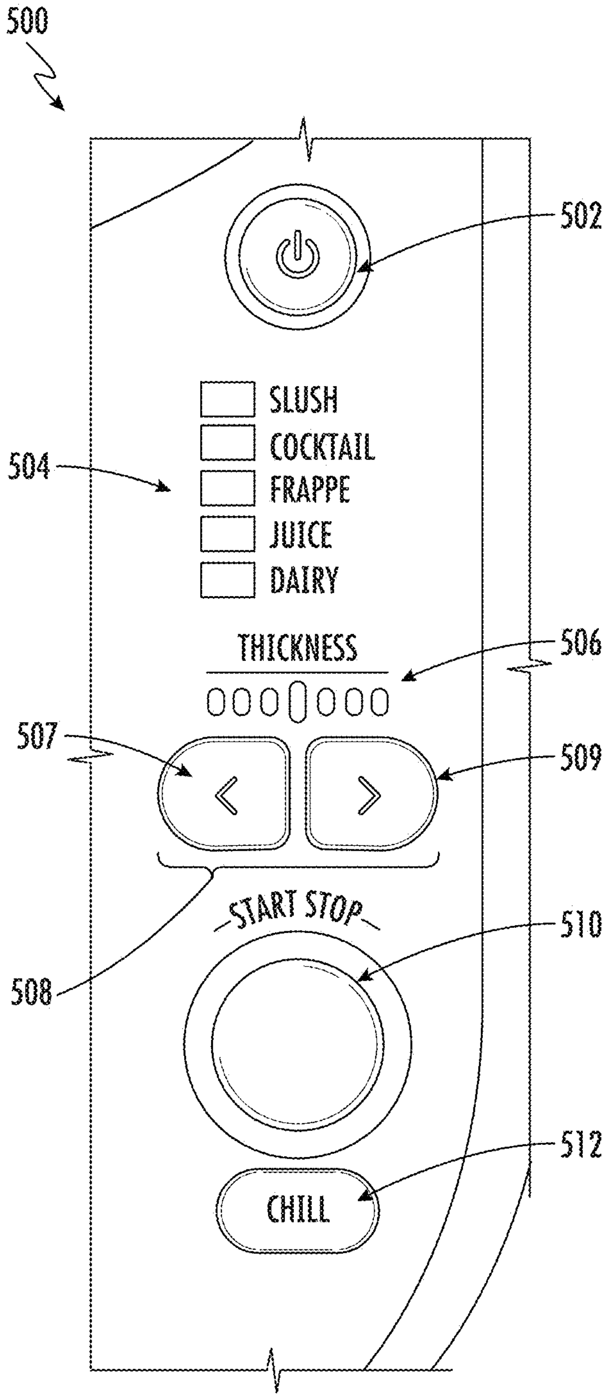
FIG. 5 is a close-up view of a user interface of a drink maker, according to some non-limiting embodiments or aspects.

Referring now to FIG. 5, shown is a close-up view 500 of a user interface (e.g., user interface 112), according to some non-limiting embodiments or aspects. As shown in view 500, user interface 112 may include a power button 502, drink type indicator panel 504, manual temperature adjustment and/or temperature offset indicator 506, a manual temperature adjustment interface 508, a drink type control dial 510, and a chill button 512. A user may turn drink maker 100 on or off using power button 502. A user may select a drink type to process a type of drink product by turning dial 510 until a selected drink type is indicated via panel 504. The user may select, for example, a slush, a cocktail, a frappé, a juice, or a dairy/milkshake drink type. Dial 510 may also include a push-button feature that enables a user to start or stop processing of a drink type by pressing dial 510. Manual temperature adjustment interface 508 may include left-arrow button 507 and right-arrow button 509 that enable a user to adjust a temperature within a temperature offset band (e.g., such as temperature offset band 602 of FIG. 6, for a dairy/milkshake drink type). A user may select chill button 512 to initiate a chill program, whereby drink maker 100 and/or controller 402 maintain the drink product within mixing vessel 104 at a cool temperature without forming a frozen or semi-frozen drink product. In some non-limiting embodiments or aspects, the same cool temperature may be maintained for any drink type when a user selects chill button 512. For example, controller 402 may receive a signal indicative of the selection of chill button 512 and reduce the temperature to, and maintain the temperature at or near, a predefined temperature (e.g., in a range) that should not result in any drink type freezing. In another embodiment, controller 402 may receive a signal indicative of the selection of chill button 512 and a selection of a drink type from drink type control dial 510, and reduce the temperature to, and maintain the temperature at or near, a predefined temperature (e.g., in a range) defined for that particular drink type (e.g., as specified by a drink data object in memory) that should not result in that drink type freezing.

Figure 6:
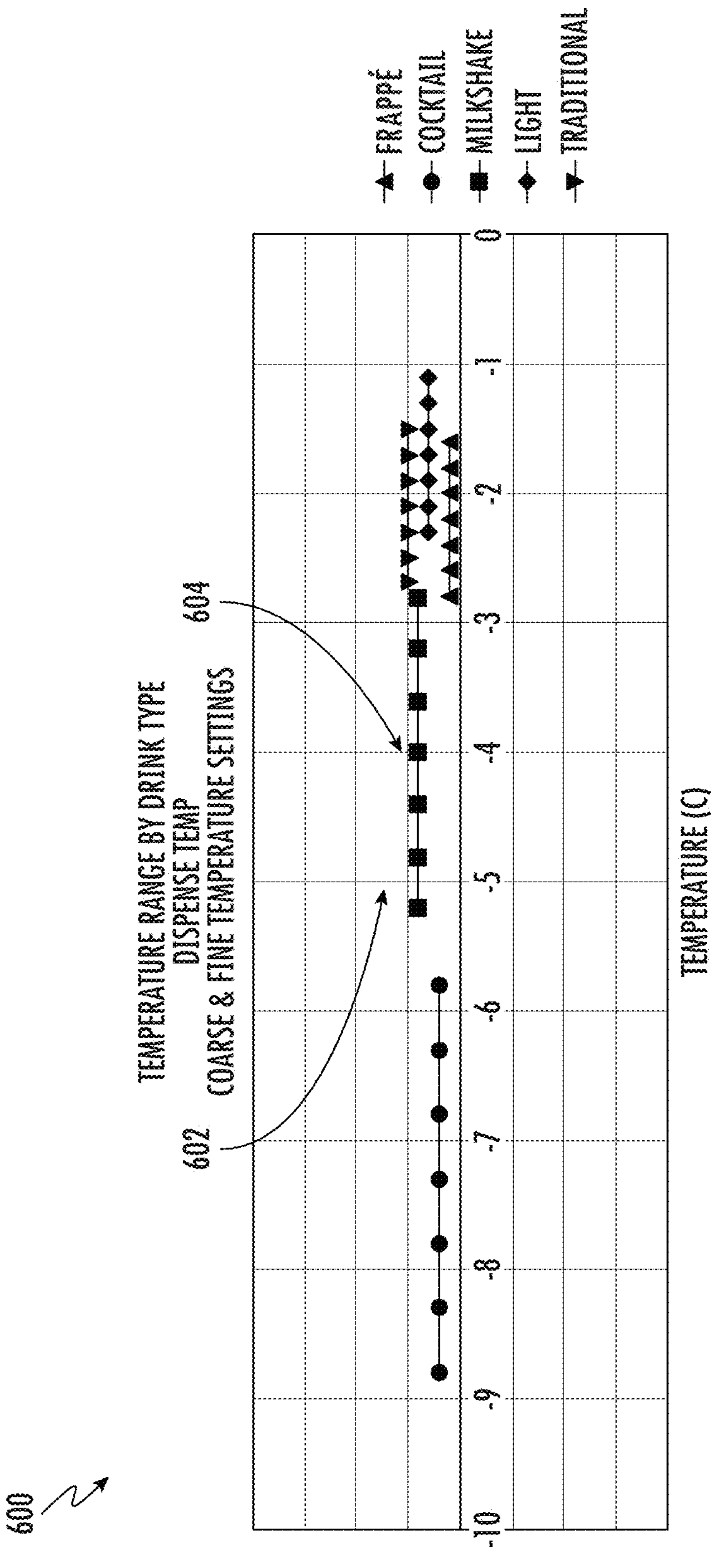
FIG. 6 is a graph of coarse and fine temperature settings for control of a drink maker, according to some non-limiting embodiments or aspects.

Referring now to FIG. 6, shown is a graph 600 of coarse and fine temperature settings for control of a drink maker 100, according to some non-limiting embodiments or aspects. The coarse and fine temperature settings may be associated with processing a drink product, where such temperature settings may be stored as temperature values in memory, as described elsewhere herein. For example, when a user selects a dairy and/or milkshake drink type and starts a frozen drink processing sequence and/or program using dial 510, controller 402 may control processes of the dairy/milkshake program to adjust the temperature of the drink product to a coarse temperature setting 604 at −4 degrees Celsius, as shown in graph 600. Thus, absent any temperature adjustment specified by the user, coarse temperature setting 604 may serve as the target temperature value, e.g., the temperature value that controller 402 will attempt to attain and maintain during processing of the drink product. A user before, during, or after coarse temperature setting 604 is reached, may fine tune or adjust the coarse target temperature of the drink type by setting a temperature offset using manual temperature adjustment interface 508. For example, the user may push the left-arrow button 507 to decrease the target temperature in increments of about 0.4 degrees Celsius, to a new target temperature of about −5.2 degrees Celsius. As the temperature decreases, the thickness and/or amount of frozen drink particles may increase. Hence, manual temperature adjustment indicator 506 may be associated with a "thickness" label. It will be appreciated that different labels may be used, such as "temperature offset", "temperature adjust", "manual adjust", and the like.

To further illustrate, the user may push right-arrow button 509 to increase the target temperature, for example, in increments of about 0.4 degrees Celsius, to a new target temperature of about −2.8 degrees Celsius. As the temperature increases, the thickness and/or amount of frozen drink particles may decrease. Manual temperature adjustment indicator 506 may include one or more light indicators that are illuminated in a configuration corresponding to the selected temperature offset. For example, manual temperature adjustment indicator 506 may have a center light indicator that indicates that a 0 degree Celsius offset is selected (e.g., no offset). Manual temperature adjustment indicator 506 may include light indicators corresponding to each increment of offset selected above or below the coarse setting (e.g., the 0 degree Celsius offset point). FIG. 6 also shows temperature offset and/or manual adjustment bands associated with various illustrative types of drink products, such as milkshake, frappé, cocktail, light, and traditional. Each of the temperature bands may include a center, coarse, and/or target drink type temperature, and user-selectable fine tune offset temperatures above and below the drink type target temperature. In some non-limiting embodiments or aspects, the temperature offset band associated with one drink type may be different than the temperature offset band of a different drink type, resulting in the temperature offset increments being different between the different drink types.

As described herein, in response to a temperature adjustment being specified by the user, controller 402 may adjust the target temperature value by an offset corresponding to specified adjustment. In such embodiments, the coarse temperature setting may be considered the base target temperature value, which, when combined with offset value, may produce the target temperature value.

Figure 7:
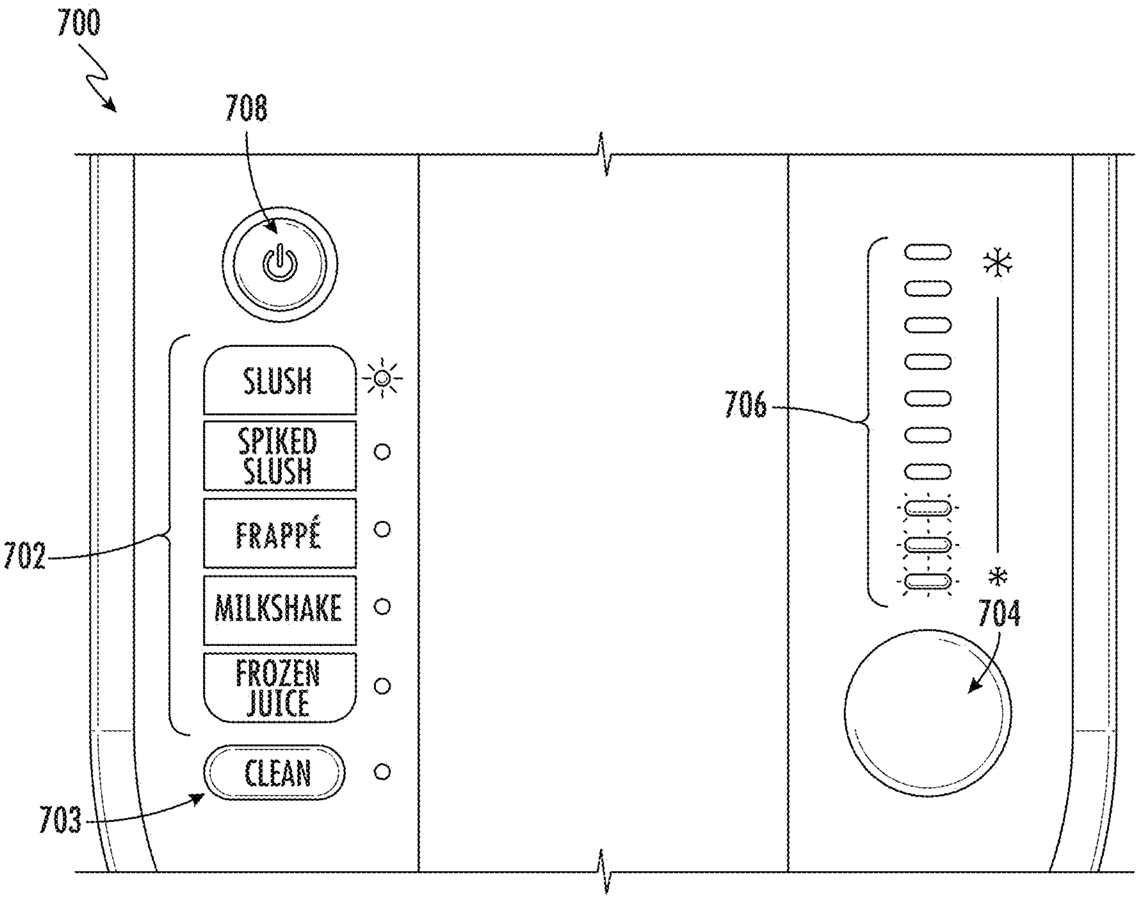
FIG. 7 is a close-up view of a user interface of a drink maker, according to some non-limiting embodiments or aspects.

Referring now to FIG. 7, shown is a close-up view 700 of a user interface (e.g., user interface 112) of a drink maker 100, according to some non-limiting embodiments or aspects. As shown in view 700, user interface 112 may include a power button 708, drink type selector/indicator panel 702, manual temperature adjustment (or offset) indicator 706, and a manual temperature adjustment dial 704. A user may turn drink maker 100 on or off using power button 708. A user may select a drink type to process a type of drink product by pressing a button associated with a selected drink type, e.g., slush. The selection of a particular drink type may be indicated by illumination of a light indicator associated with the selected drink type button. For example, FIG. 7 shows that the slush drink type has been selected by illumination of the LED indicator next to the slush button. The user may select, for example, a slush drink, spiked slush drink or cocktail, a frappé, a frozen juice, or a dairy/milkshake drink type. Manual temperature adjustment dial 704 may be rotated clockwise or counter-clockwise to set the target temperature value within a universal range of target temperature values. For example, manual temperature adjustment indicator 706 may include 10 temperature values or settings corresponding to target temperature values (see, e.g., FIG. 8).

The user interface in view 700 also may include a clean button 703. Controller 402 may be configured to, in response to clean button 703 being pressed by a user, activate the rotation of dasher 204 but not the cooling circuit. If dasher 204 and the cooling circuit are active when clean button 703 is pressed, controller 402 may deactivate the cooling circuit and leave dasher 204 active. A user can then add water to mixing vessel 104 through pour-in opening 106, and the action of dasher 204 may agitate the water and may push the water forward to assist in dislodging and/or melting ingredients from the surfaces of evaporator 202, dasher 204, mixing vessel 104, and/or the like. The user then can dispense the contents of mixing vessel 104 and repeat filling with water and dispensing as desired (e.g., including some form of cleaner in earlier cycles to help clean, and only water in later cycles to rinse). Deactivating or leaving off the cooling circuit during cleaning may help thaw any frozen ingredients and prevent freezing of contents during cleaning.

Figure 8:
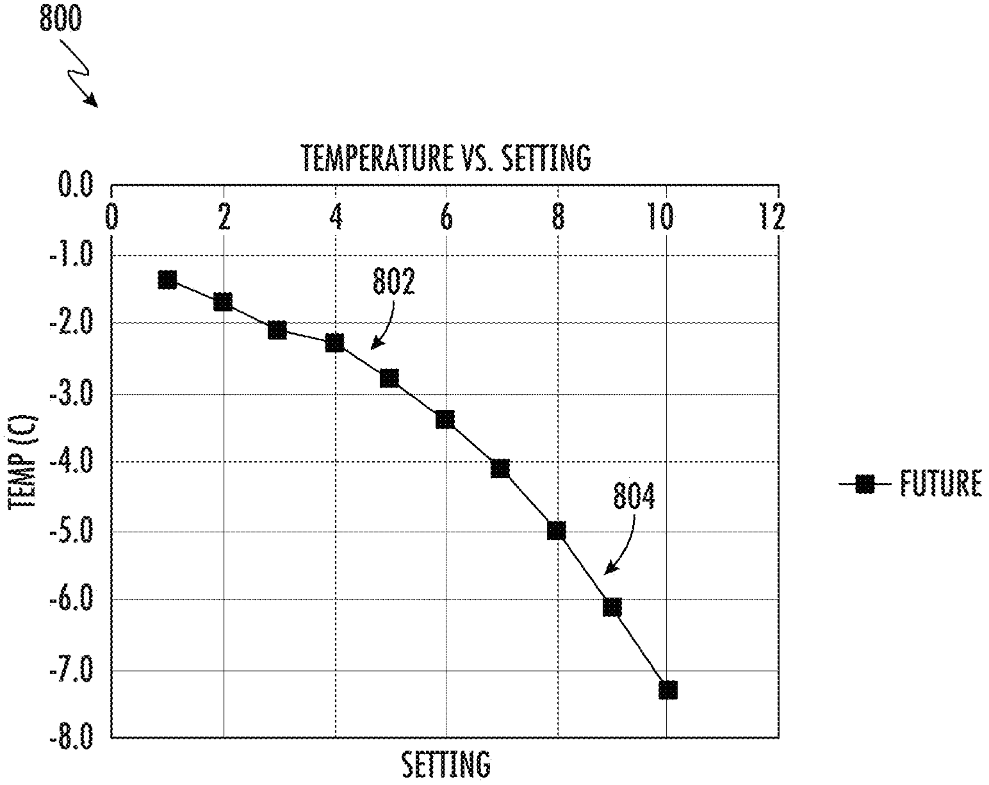
FIG. 8 is a graph of temperature values associated with automatic program temperature target temperatures and manual temperature adjustments, according to some non-limiting embodiments or aspects.

Referring now to FIG. 8, shown is a graph 800 of temperature values associated with automatic program target temperatures and manual temperature adjustments, according to some non-limiting embodiments or aspects. Graph 800 shows temperature settings #1 through #10, where setting #1 corresponds to −1.3 degrees Celsius and setting #10 corresponds to −7.2 degrees Celsius. The ten temperature settings of graph 800 may correspond to the ten light indicators of manual temperature adjustment indicator 706 (see FIG. 7). In operation, when a user selects a drink type, e.g., a milkshake, by pressing the corresponding button in drink type selector/indicator panel 702, the button's adjacent indicator may illuminate. By way of further example, if the automatic coarse temperature value (e.g., base target temperature value) associated with a milkshake is about −4.0 degrees Celsius, which corresponds to setting #7 in graph 800, then seven indicators (e.g., light bars) may be illuminated in manual adjustment indicator 706. The light bars may be dimmed or flash periodically until the target temperature value is reached and/or detected by controller 402. User interface 112 may emit an audible sound, e.g., a beep or beep sequence, when a target temperature value is reached. A dimmed or flashing illumination may be changed to a brighter and/or steady illumination when a target temperature value is reached. In some non-limiting embodiments or aspects, once a target temperature value is reached, controller 402 may cycle compressor 214 on and off to keep a temperature of the drink product within a target temperature range above and/or below the target temperature. For example, the range may be greater than or equal to about 0.2, 0.3, 0.5, or 1.0 degrees Celsius above and below the target temperature value. As long as the temperature remains within the target temperature range, controller 402 may not initiate an alert (e.g., audible output) or change in status of any indicators of indicator 706.

With further reference to FIGS. 7 and 8, if the user wants to further decrease the target temperature and/or increase the target thickness of the milkshake to setting #10 of FIG. 8, the user may turn dial 704 until all 10 light indicators are illuminated. If the user wants to increase the target temperature to setting #3 of FIG. 8 and/or reduce the target thickness of the milkshake, the user may turn dial 704 until three indicators bars of indicator 706 are illuminated, as illustrated in FIG. 7. While FIG. 7 shows an interface using a dial 704 to manually adjust temperature, other types of interfaces may be used such as, without limitation, up/down buttons, a touch screen, a slider switch, and/or the like.

With further reference to FIG. 8, graph 800 also illustrates how each increment of temperature change between each of the temperature settings #1 to #10 may be nonlinear to account for adequate changes in thickness of a cooled or frozen drink product. As temperature decreases, a larger change in temperature may be required to cause a material/proportional change in the amount of frozen drink particles within the drink product (e.g., a change in thickness). For example, temperature increment 802 (between settings #4 and #5) is about 0.6 degrees Celsius, while temperature increment 804 (between setting #8 and #9), in a lower temperature range, is about −1.0 degrees Celsius. In some non-limiting embodiments or aspects, the increment of temperature change between settings may be constant, resulting a linear temperature range. It will be appreciated that while a range including 10 temperature settings is illustrated in FIGS. 7 and 8, any number of settings and/or temperature ranges may be implemented.

Figure 9:
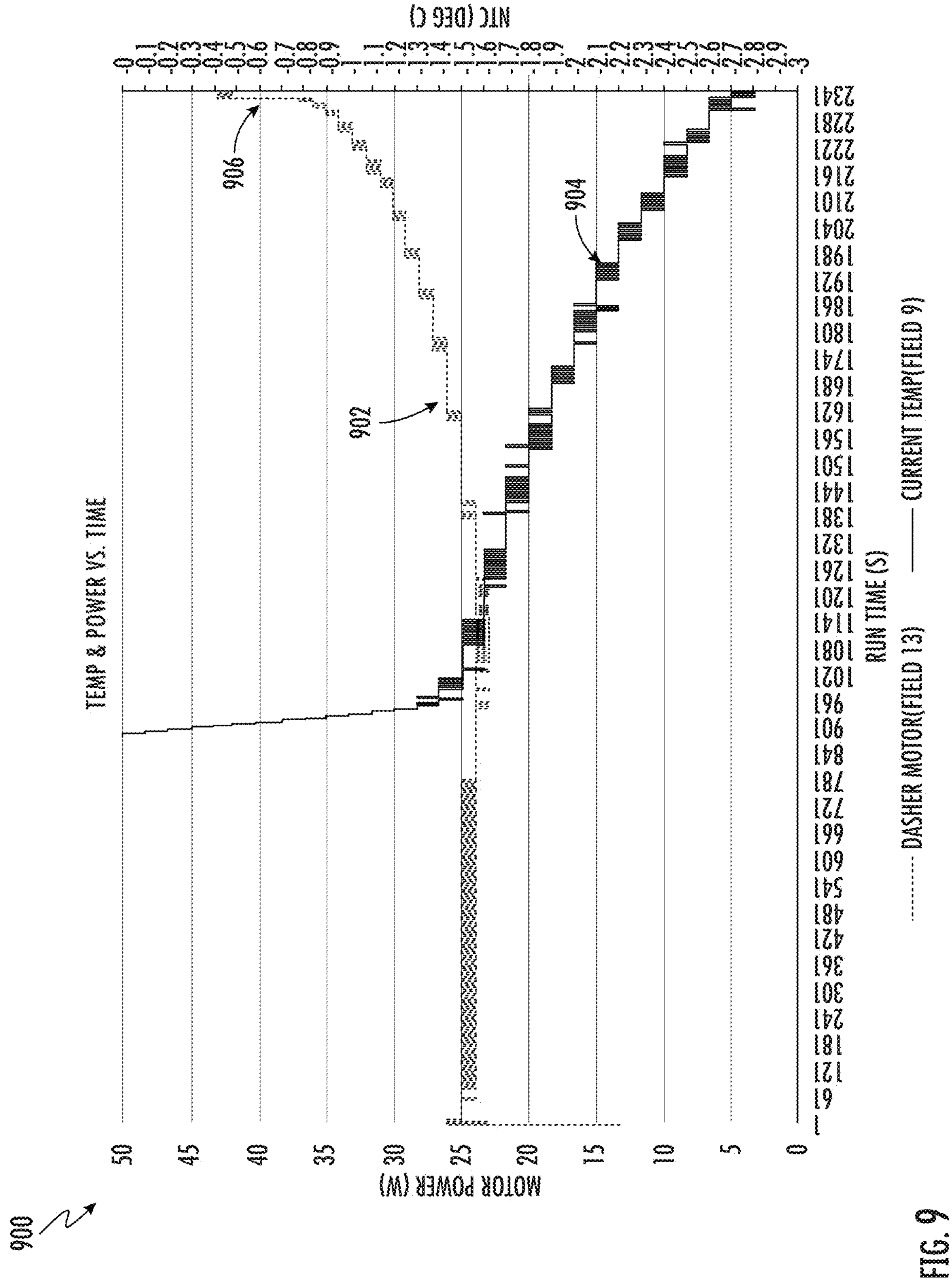
FIG. 9 is a graph of drive motor current and temperature over time as a drink product is being processed by a drink maker, according to some non-limiting embodiments or aspects.

Referring now to FIG. 9, shown is a graph 900 of drive motor 208 current and temperature of a drink product over time as the drink product is being processed by a drink maker, according to some non-limiting embodiments or aspects. Graph 900 shows changes in current 902 for drive motor 208 and corresponding drink product temperatures 904 over time as a drink product is being processed. Graph 900 illustrates how the current 902 applied to drive motor 208 increases as temperature 904 decreases, causing the thickness of the drink product to increase, which results in an increased resistance of the drink product to the rotation of dasher 204, which, in turn, requires increased motor power and/or current 902 to drive dasher 204 against the resistance. When current 902 (or power, torque, etc.) reaches or satisfies a threshold or motor condition limit 906 (e.g., about 40 Watts and/or about 0.3 amps current), controller 402 may deactivate the cooling circuit (e.g., stop coolant and/or refrigerant flow to evaporator 202) to allow temperature 904 to increase and reduce the thickness of the drink product, to thereby reduce the current 902 of drive motor 208 to below motor condition limit 906.

For example, the base target temperature value of each drink type, and permissible offsets enabled by user interface 412, may be predefined to produce a target temperature corresponding to a motor current (or power, torque, etc.) that is safely below a motor condition limit 906. Controller 402 may automatically control the temperature of the drink product in mixing vessel 104 to attain the base target temperature setting associated with the user-selected drink type, which may be adjusted (e.g., fine-tuned) by an offset corresponding to a user-selected temperature adjustment and/or temperature offset, to a new temperature setting (e.g., the target temperature value), at which temperature the magnitude of motor current 902 may be lower than the motor condition limit 906. The target temperature may be set to be, for example, 0.25, 0.5, 0.75, 1, 1.25, 1.5, or 2.0 degrees Celsius above (e.g., by a relatively small offset) the base target temperature. However, it is possible that the ingredients put into mixing vessel 104 may result in a drink product that results in ice build-up during processing, such that motor condition limit 906 is exceeded. For example, if there is insufficient sugar and/or alcohol content in the drink product, ice may form at a higher (e.g., warmer) temperature than expected and be more difficult for dasher 204 to scrape from a surface of evaporator 202. By deactivating the cooling circuit, if the motor condition limit 906 is exceeded, controller 402 may prevent an overcurrent condition and possible damage to drive motor 208, avoid a stall condition, and enable operation of drink maker 100 and dasher 204 to continue. Otherwise, drive motor 208 may stall and drink maker 100 may become jammed up, blocking slush output from mixing vessel 104 and requiring a user to defrost and/or unblock mixing vessel 104 before normal operations can be resumed. Hence, the stall prevention described herein may enable drink maker 100 to produce and output slush and other outputs that it otherwise would not be able to do if a stall condition occurred. Further, an excessive current (or power, torque, etc.) condition of drive motor 208 caused by an object (e.g., excessive ice formation) blocking rotations of dasher 204 can also be prevented.

Controller 402 may perform actions in addition to stopping drive motor 208, such as shutting down compressor 214 to deactivate the cooling circuit. Graph 900 also shows how controller 402 may continuously and/or periodically monitor temperature associated with a drink product within mixing vessel 104 via temperature sensor(s) 406 to enable continuous control of components such as compressor 214, and other components, of drink maker 100 to enable automatic control of the temperature of a drink product.

Figure 10:
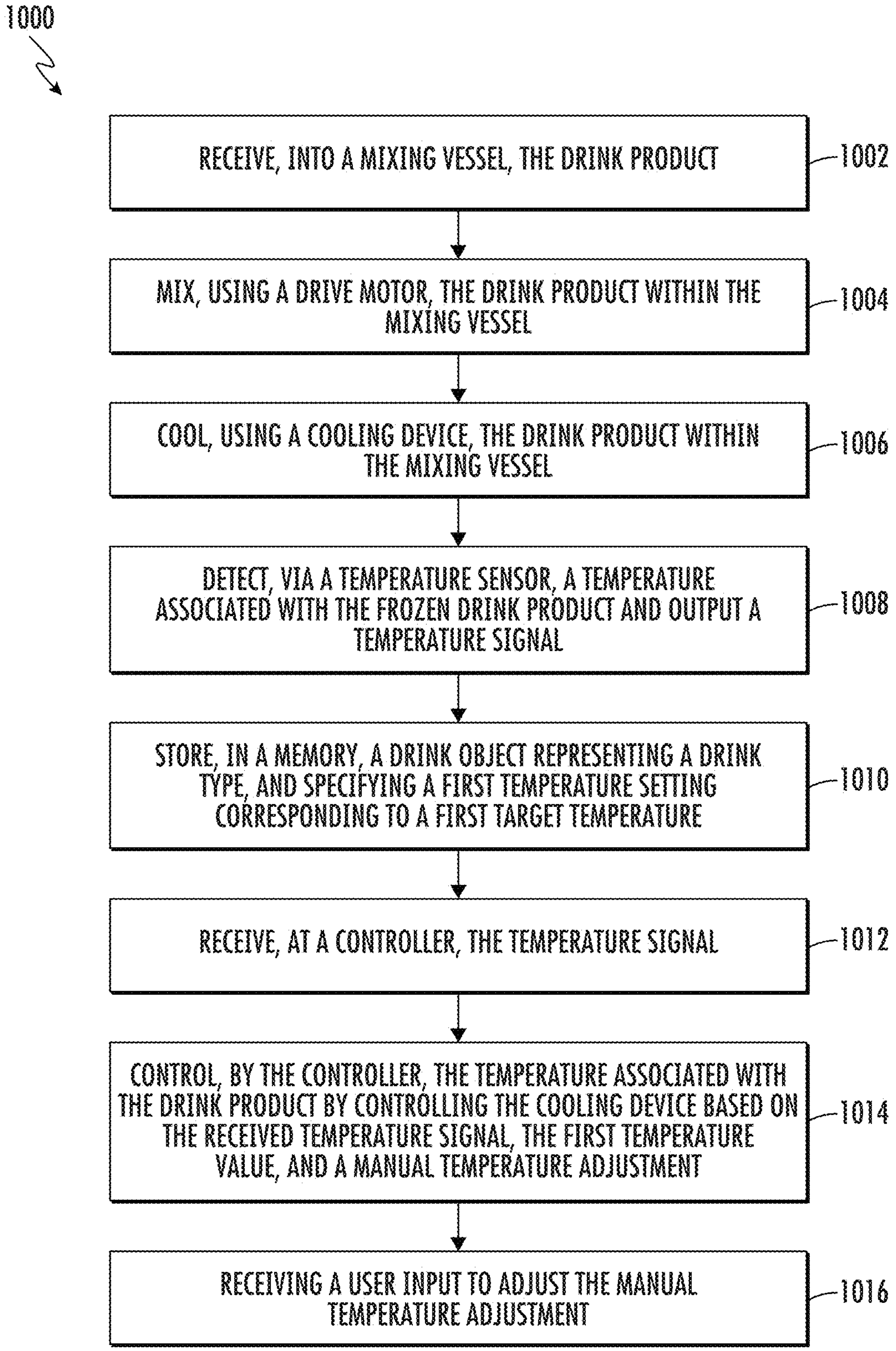
FIG. 10 is a flow diagram of a method for processing a drink product in a drink maker, according to some non-limiting embodiments or aspects.

Referring now to FIG. 10, shown is a flow diagram of a method 1000 for processing a drink product in a drink maker, according to some non-limiting embodiments or aspects. The steps shown in FIG. 10 are for example purposes only. It will be appreciated that additional, fewer, different, and/or a different order of steps may be used in some non-limiting embodiments or aspects. In some non-limiting embodiments or aspects, a step may be automatically performed in response to performance and/or completion of a prior step. As shown, method 1000 includes steps for making a cooled drink product using a program for initial or coarse temperature and/or texture control and then using a user input to fine tune the temperature and/or texture of the drink product.

As shown in FIG. 10, method 1000 may include, at step 1002, receiving, into mixing vessel 104 of drink maker 100, a drink product. For example, a user may pour a drink product into pour-in opening 106 of mixing vessel 104 to fill mixing vessel 104, at least partly, with the drink product. When pouring is complete, the user may close pour-in opening 106.

As shown in FIG. 10, method 1000 may include, at step 1004, mixing, using drive motor 208, the drink product within mixing vessel 104. For example, user may interact with user interface 112 and select a power button, temperature setting, drink product type, and/or a chill button to cause controller 402 to initiate a mixing process. Controller 402 may cause drive motor 208 to turn dasher 204 within mixing vessel 104 to mix the drink product.

As shown in FIG. 10, method 1000 may include, at step 1006, cooling, using a cooling device (e.g., a cooling circuit), the drink product within mixing vessel 104. For example, controller 402 may cause compressor 214 to turn on, causing refrigerant to circulate through the cooling circuit, reducing a temperature in evaporator 202. As the drink product is mixed by dasher 204, the drink product may come into contact with evaporator 202 (e.g., a drum thereof), thereby cooling the drink product.

As shown in FIG. 10, method 1000 may include, at step 1008, detecting, via temperature sensor(s) 406, a temperature associated with the drink product and output a temperature signal. For example, a temperature sensor 406 positioned in the front of mixing vessel 104 (e.g., on a front, lower end of a drum of evaporator 202), may periodically detect temperatures associated with the mixing drink product, and may generate temperature signals based on each respectively detected temperature.

As shown in FIG. 10, method 1000 may include, at step 1010, storing, in memory 404, a drink data object representing a drink type and specifying a first temperature setting corresponding to a first target temperature. For example, controller 402 may cause a drink data object to be stored in memory 404 of drink maker 100, where the drink data object represents a drink type, and where the drink data object specifies a first temperature setting corresponding to a first target temperature. In some non-limiting embodiments or aspects, step 1010 may be performed before step 1002. The user may select an operational setting of drink maker 100 via user interface 112 that is associated with a drink data object.

As shown in FIG. 10, method 1000 may include, at step 1012, receiving, at controller 402, the temperature signal. For example, one or more of the periodic temperature signals generated by temperature sensor(s) 406 in step 1008 may be output to, and received by, controller 402. Controller 402 may be configured to interpret the temperature signal as being associated with a temperature, and controller 402 may further control drink maker 100 based on the temperature signals.

As shown in FIG. 10, method 1000 may include, at step 1014, controlling, by controller 402, the temperature associated with the drink product by controlling the cooling device (e.g., cooling circuit) based on the received temperature signal, a first temperature value, and a manual temperature adjustment. For example, controller 402 may control the on/off state of compressor 214 to control the cooling circuit. Controller 402 may control the cooling circuit to achieve and maintain a temperature in the drink product based on the first temperature value that is associated with the stored drink data object (e.g., to bring the detected temperature of the drink product down to, and around the first temperature value). If the user of drink maker 100 input any manual temperature adjustments (e.g., upward or downward increments of temperature in user interface 112), controller 402 may target a temperature for the drink product that is the first temperature value plus a positive or negative offset that corresponds to the manual temperature adjustment.

As shown in FIG. 10, method 1000 may include, at step 1016, receiving a user input to adjust the manual temperature adjustment. For example, controller 402 may receive, via user interface 112, one or more user inputs to the manual temperature adjustment. Controller 402 may then modify an offset to a target temperature based on the user's input. Step 1016 may be performed before, during, or after the drink product begins mixing and/or cooling in mixing vessel 104.

In some non-limiting embodiments or aspects, the user input may be indicative of a desired thickness corresponding to the manual temperature adjustment. In some non-limiting embodiments or aspects, the manual adjustment may be customized per drink type. In some non-limiting embodiments or aspects, the manual adjustment may be universal for all drink types. In some non-limiting embodiments or aspects, the manual adjustment may be finer and/or for a smaller range specific to a drink type (e.g., corresponding to FIG. 6), or may be coarser and/or for a larger range not specific to a drink type (e.g., spanning multiple or all drink types), thereby enabling a user greater latitude in adjusting thickness and/or temperature.

Figure 11:
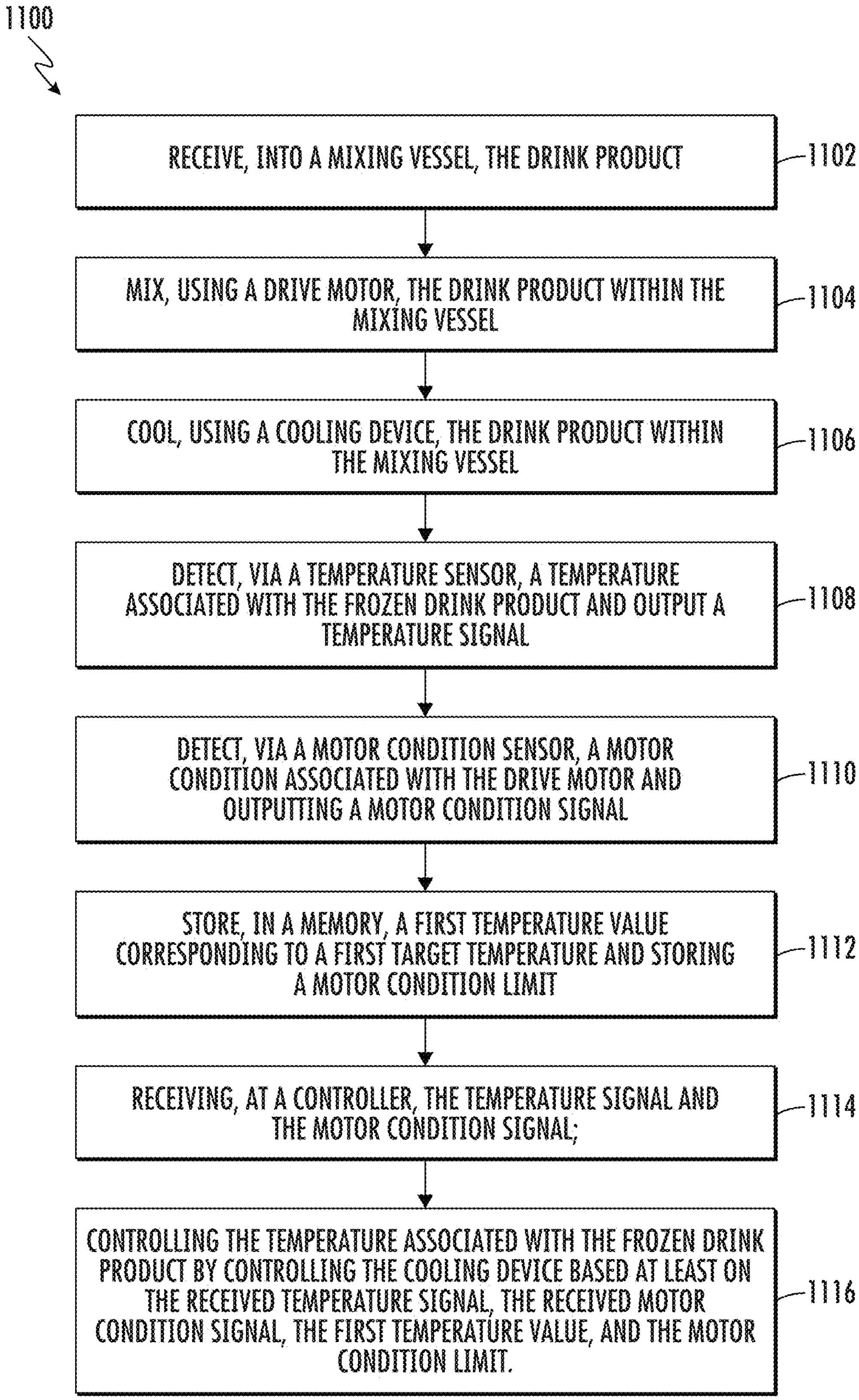
FIG. 11 is a flow diagram of a method for processing a drink product in a drink maker, according to some non-limiting embodiments or aspects.

Referring now to FIG. 11, shown is a flow diagram of a method 1100 for processing a drink product in a drink maker, according to some non-limiting embodiments or aspects. The steps shown in FIG. 11 are for example purposes only. It will be appreciated that additional, fewer, different, and/or a different order of steps may be used in some non-limiting embodiments or aspects. In some non-limiting embodiments or aspects, a step may be automatically performed in response to performance and/or completion of a prior step. As shown, method 1100 include steps for automatically detecting when drive motor 208 current (e.g., current through drive motor 208) is too high (e.g., as a result of a drink product being too thick and/or an ice formation on evaporator 202 surface) and, in response, adjusting the temperature of the drink product to reduce drive motor 208 current, to thereby reduce a thickness of the drink product and/or thaw an ice block.

As shown in FIG. 11, method 1100 may include, at step 1102, receiving, into mixing vessel 104 of drink maker 100, a drink product. For example, a user may pour a drink product into pour-in opening 106 of mixing vessel 104 to fill mixing vessel 104, at least partly, with the drink product. When pouring is complete, the user may close pour-in opening 106.

As shown in FIG. 11, method 1100 may include, at step 1104, mixing, using drive motor 208, the drink product within mixing vessel 104. For example, user may interact with user interface 112 and select a power button, temperature setting, drink product type, and/or a chill button to cause controller 402 to initiate a mixing process. Controller 402 may cause drive motor 208 to turn dasher 204 within mixing vessel 104 to mix the drink product.

As shown in FIG. 11, method 1100 may include, at step 1106, cooling, using a cooling device (e.g., a cooling circuit), the drink product within mixing vessel 104. For example, controller 402 may cause compressor 214 to turn on, causing refrigerant to circulate through the cooling circuit, reducing a temperature in evaporator 202. As the drink product is mixed by dasher 204, the drink product may come into contact with evaporator 202 (e.g., a drum thereof), thereby cooling the drink product.

As shown in FIG. 11, method 1100 may include, at step 1108, detecting, via temperature sensor(s) 406, a temperature associated with the drink product and output a temperature signal. For example, a temperature sensor 406 positioned in the front of mixing vessel 104 (e.g., on a front, lower end of a drum of evaporator 202), may periodically detect temperatures associated with the mixing drink product, and may generate temperature signals based on each respectively detected temperature.

As shown in FIG. 11, method 1100 may include, at step 1110, detecting, via motor condition sensor(s) 406, a motor condition associated with drive motor 208 and outputting a motor condition signal. For example, a motor condition sensor 406 configured to measure one or more motor conditions of drive motor 208 (e.g., motor current, power, torque, etc.) may periodically detect a motor condition associated with drive motor 208, and may generate motor condition signals based on each respectively detected motor condition.

As shown in FIG. 11, method 1100 may include, at step 1112, storing, in memory 404, a first temperature value corresponding to a first target temperature and storing a motor condition limit. For example, controller 402 may cause a first temperature value and a motor condition limit to be stored in memory 404 of drink maker 100, where the first temperature value corresponds to a first target temperature, and the motor condition limit (e.g., threshold) corresponds to a motor condition, such as, but not limited to, current, power, torque, and/or the like.

As shown in FIG. 11, method 1100 may include, at step 1114, receiving, at controller 402, the temperature signal and the motor condition signal. For example, one or more of the periodic temperature signals generated by temperature sensor(s) 406 in step 1108 may be output to, and received by, controller 402. Moreover, one or more of the periodic motor condition signals generated by motor condition sensor(s) 406 in step 1110 may be output to, and received by, controller 402.

As shown in FIG. 11, method 1100 may include, at step 1116, controlling, by controller 402, the temperature associated with the drink product by controlling the cooling device (e.g., cooling circuit) based on the received temperature signal, the received motor condition signal, a first temperature value, and a motor condition limit. For example, controller 402 may control the on/off state of compressor 214 to control the cooling circuit. Controller 402 may control the cooling circuit to achieve and maintain a temperature in the drink product based on the first temperature value (e.g., to bring the detected temperature of the drink product down to, and around the first temperature value). If the motor condition signal satisfies the motor condition limit (e.g., meets and/or exceeds a threshold motor condition value), controller 402 may cycle compressor 214, pulse drive motor 208, and/or turn off compressor 214 and/or drive motor 208 for a time. Controller 402 may return compressor 214 and/or drive motor 208 to otherwise expected operation in response to the motor condition signal no longer satisfying the motor condition limit.

In some non-limiting embodiments or aspects, controller 402 may stop and/or deactivate drive motor 208 to stop rotation of dasher 204 when the motor condition signal satisfies a motor knockdown threshold (e.g., the motor current, power, or torque is too high and/or high enough to damage drive motor 208, which may be caused by an excessive buildup of ice within mixing vessel 104). Excessive ice buildup may be caused, for example, by filling mixing vessel with only water or a liquid predominantly consisting of water (e.g., not having a high-enough percentage of other ingredients, such as sugar/alcohol), thereby producing ice on the surface of evaporator 202 that is more difficult for dasher 204 to scrape away from the surface of evaporator 202. Shutdown of drive motor 208 may also prevent damage to dasher 204 caused by excessive buildup of hard ice. Controller 402 may perform other actions in additional to deactivating drive motor 208. Additionally, or alternatively, controller 402 may cause an alert to a user, via user interface 112, to add more ingredients (e.g., including sugar or alcohol) to the drink product, to turn off drink maker 100, and/or the like. A different motor shutdown threshold for drive motor 208 may be set higher than the motor knockdown threshold limit. In this way, controller 402 may attempt to increase temperature in mixing vessel 104 when a motor knockdown threshold limit is reached, but only shut down and/or stop drive motor 208 when a motor shutdown threshold is reached, to prevent damage to drive motor 208. Controller 402 may take action based on determining whether the motor knockdown threshold limit or the motor shutdown limit has been reached or exceeded for a period of time, e.g., 0.5, 1.0, 1.5, 2.0, 5 seconds, or more. By observing motor current (or power, torque, etc.) for a period of time, a false positive and/or reading of current (or power, torque, etc.) may be eliminated.

Figure 12A:
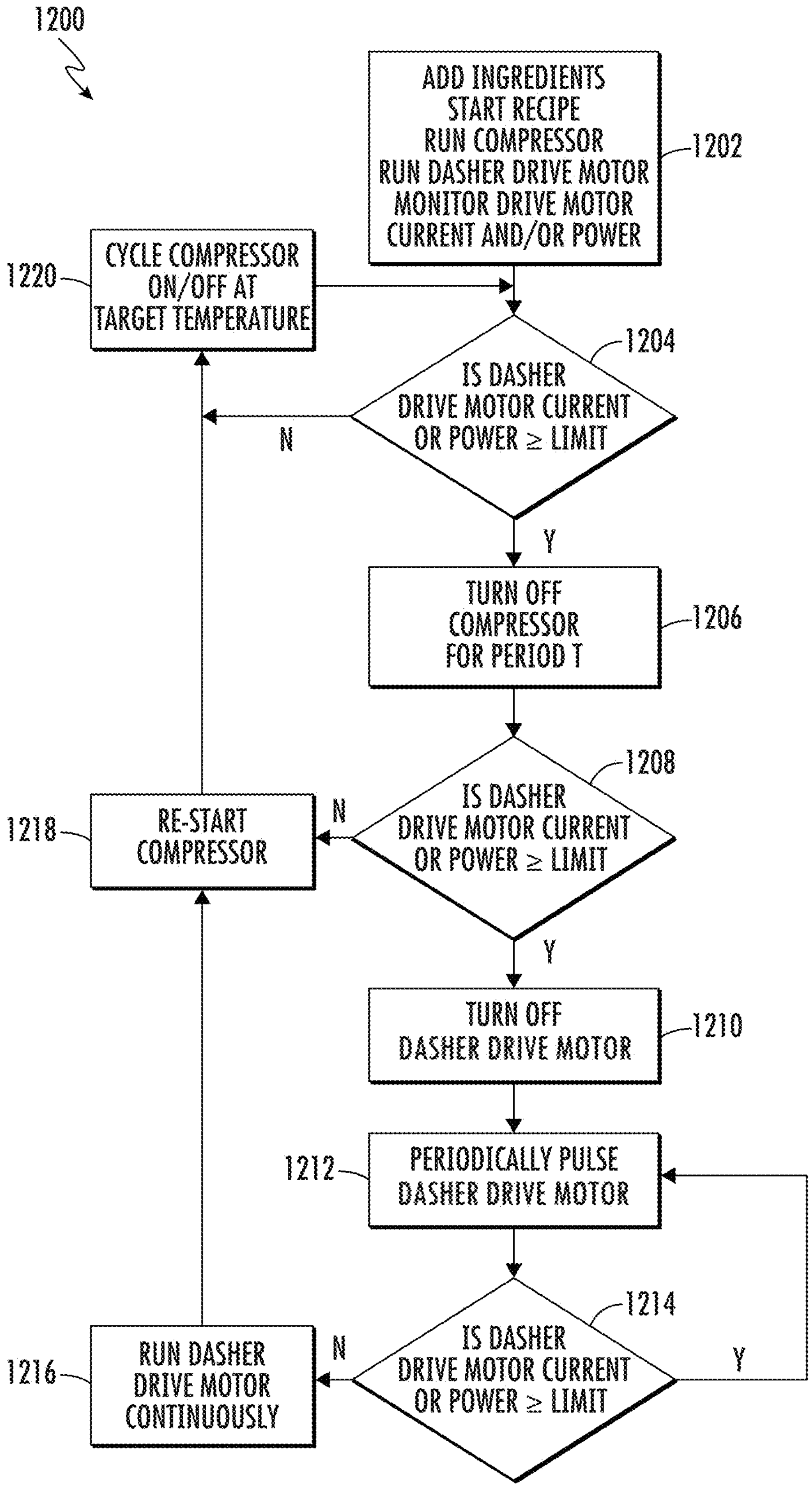
FIG. 12A is a flow diagram of method for processing a drink product in a drink maker, according to some non-limiting embodiments or aspects.

Referring now to FIG. 12A, shown is a method 1200 for processing a drink product in a drink maker, according to some non-limiting embodiments or aspects. The steps shown in FIG. 12A are for example purposes only. It will be appreciated that additional, fewer, different, and/or a different order of steps may be used in some non-limiting embodiments or aspects. In some non-limiting embodiments or aspects, a step may be automatically performed in response to performance and/or completion of a prior step. As shown, method 1200 may include steps for automatically controlling a drink maker in response to detecting when drive motor current (or power, torque, etc.) exceeds a limit such as, for example, as a result of excessive ice buildup on evaporator 202 which could interfere with operations of or damage dasher 204 and/or dasher drive motor 208. Such a situation may arise when a drink product has an insufficient amount of ingredients, such as a low percentage of sugar, alcohol, or other content, e.g., 4-6% or about 2%, or even lower.

As shown in FIG. 12A, method 1200 may include, at step 1202, adding ingredients of a drink product into mixing vessel 104 and starting a program or processing sequence associated with a drink data object stored in, for example, memory 404. For example, the program may include running a cooling circuit and/or compressor 214, running drive motor 208 to rotate dasher 204, and monitoring drive motor 208 current (or power, torque, etc.).

As shown in FIG. 12A, method 1200 may include, at step 1204, comparing a detected motor current (or power, torque, etc.) to a limit. For example, controller 402 may compare and determine whether the detected current (or power, torque, etc.) is greater than or equal to a current limit (or power limit, torque limit, etc.), such as a 40 watts power limit (see, e.g., FIG. 9). If the detected current (or power, torque, etc.) is less than the limit, method 1200 may proceed to step 1220. In step 1220, controller 402 may cycle the cooling circuit (e.g., turning off and on compressor 214) at a temperature set by the program and/or drink data object for the drink product being processed (e.g., the predefined temperature value defined by the drink data object).

In some non-limiting embodiments or aspects, for a drink product being processed by a drink maker, a predefined temperature value for the drink type selected or determined for the drink product may be predefined in that it was determined (e.g., calculated) and set as the target temperature value for the drink type before the drink maker began processing the drink product, e.g., before the drink maker began executing a program for the drink type. For example, the drink maker may be configured with the predefined temperature value prior to sale, or the predefined temperature value may be downloaded (e.g., via a wireless interface) to the drink maker prior to processing the drink product.

In some non-limiting embodiments or aspects, the predefined temperature value for a drink type may be based on a predetermined phase change temperature value associated with the drink type. A phase change of a drink product may be deemed to have occurred when at least some of a volume of drink product has started nucleating from a liquid state to a solid state (e.g., started to freeze). A phase change temperature value of a drink product or drink type, which may be referred to herein as the freezing point of the drink product or drink type, respectively, may be the temperature at which it is determined that the phase change of the drink product or drink type, respectively, occurs.

In some non-limiting embodiments or aspects, during the cooling of a drink product by a drink maker, at the point in time of the phase change, the drink product may not yet be in a state one would consider a slush (e.g., a particulate frozen or semi-frozen drink, such as a slurry), or at least not a desired slush state. That is, at the time of the phase change, the drink product may be primarily a liquid with some small ice pieces dispersed therein. As the drink product continues to cool, a larger percentage of the volume of the drink product may nucleate (e.g., freeze), such that the amount and size of ice pieces increases. As ice pieces combine into larger masses of ice pieces, the drink product as a whole becomes a slush. In this slush state, there may be a range of slush consistency or thickness as the slush continues to be cooled, becoming slushier (e.g., thicker), until ultimately, if cooling continued unchecked, the drink product may become frozen solid. The target temperature value for a drink product or drink type, respectively, may be a temperature value determined to produce a desirable, ideal, and/or average slush consistency for the drink product or drink type, respectively. Thus, the target temperature value of a drink product or drink type may be a lower temperature value than the phase change temperature value of the drink product or drink type, respectively. In some non-limiting embodiments or aspects, the target temperature value for the drink type selected by a user may be predefined (e.g., before processing the drink product) based on empirical data—e.g., based on experiments/testing with users, based on applying a formula to the predefined phase change temperature value of the drink type (e.g., a temperature offset, a linear equation, or a more complex formula), and/or the like.

In some non-limiting embodiments or aspects, as described herein, the phase change temperature value and target temperature value for a drink product, e.g., a drink type of the drink product, may be predetermined prior to processing of the drink product by the drink maker, or the phase change temperature value and target temperature value for a drink product may be determined by a drink maker while processing the drink product. The drink maker may take actions based on the predetermined and/or in-process-determined phase change temperature value and/or target temperature value.

As shown in FIG. 12A, method 1200 may include, at step 1206, turning off the cooling circuit. For example, if the detected current (or power, torque, etc.) is greater than or equal to the limit, then controller 402 may turn off the cooling circuit (e.g., by turning off compressor 214) for a period of time. The period may be greater than or equal to 5, 10, 15, 20, 30 seconds, or longer.

As shown in FIG. 12A, method 1200 may include, at step 1208, determining whether a motor current (or power, torque, etc.) is greater than or equal to a limit. For example, after the period of time of turning off the cooling circuit, controller 402 may then compare and determine whether the motor current (or power, torque, etc.) is greater than or equal to a limit (e.g., a 40 watt power limit, as shown in FIG. 9). If the detected current (or power, torque, etc.) is less than the limit, controller 402 may proceed to step 1218.

As shown in FIG. 12A, method 1200 may include, at step 1218, restarting the compressor. For example, controller 402 may restart the cooling circuit (e.g., compressor 214), and then proceed to step 1220.

As shown in FIG. 12A, method 1200 may include, at step 1220, cycling the compressor off and on at the target temperature value. For example, controller 402 may cycle the cooling circuit (e.g., compressor 214) at the target temperature value. An exemplary threshold or current (or power, torque, etc.) limit (e.g., 40 W) may be dynamically set based on at least two different inputs: (i) motor free load power (e.g., set during a calibration process in production), and (ii) input voltage due to power supply variations, as such variations can impact motor power.

In addition to addressing ice build-up that may be caused by inadequate amounts of certain ingredients (e.g., relative to the volume of drink product), the methods and techniques described in relation to FIGS. 11 and 12, and variations thereof, may be implemented to address user error in controlling the determination of a target temperature value for a drink product being processed. Such user error may occur in selecting a drink type that is not the same or similar enough to the drink product being processed and/or by selecting temperature adjustments that produce a target temperature value that is too low for the drink product. Regarding drink type selection, for example, if a user selects a drink type having relatively high sugar or alcohol concentrations, but the actual drink product being processed has less (e.g., significantly less) sugar and/or alcohol concentrations than the selected drink type, then the predefined temperature value will be too low, such that it is lower (e.g., much lower) than a reasonable target temperature value for the drink product. As a result, left unchecked, the drink maker may continue to cool the drink product significantly past a reasonable target temperature, possibly to a point that the resulting slush gets so thick that drive motor 208 is overworked and dasher 204 stalls.

In some non-limiting embodiments or aspects, the cycling of compressor 214 (e.g., turning compressor 214 off and on) may avoid the above-described complications. In some non-limiting embodiments or aspects, controller 402 may be configured to determine user error and take action accordingly. For example, during processing of a drink product, after satisfying a drive motor threshold multiple times, controller 402 may change the target temperature value to a higher value (e.g., in some cases, changing to a predetermined target temperature for another drink type). In some non-limiting embodiments or aspects, the time that compressor 214 is off may be about 3 minutes due to configuration of the cooling circuit. In some non-limiting embodiments or aspects, different periods of off-time may be used. For example, approximately 30 seconds or less may be optimal. If the detected current (or power, torque, etc.) remains greater than or equal to the limit after the period of time, then controller 402 may proceed to step 1210.

As shown in FIG. 12A, method 1200 may include, at step 1210, turning off the drive motor. For example, controller 402 may turn off drive motor 208 of dasher 204. Controller 402 may then proceed to step 1212.

As shown in FIG. 12A, method 1200 may include, at step 1212, periodically pulsing drive motor 208. For example, controller 402 may periodically pulse drive motor 208 of dasher 204. Pulsing may include running drive motor 208 for a portion of a time period. For example, during a 20 second time period, drive motor 208 may be run or pulsed for 5 seconds (e.g., drive motor 208 is on for 5 seconds and off for 15 seconds). The time period may be varied as well as the pulse period. For example, the pulse may first be for 10 seconds out of a 30 second time period, then the pulse may be for 8 seconds out of a 16 second time period, and/or the like. In some non-limiting embodiments or aspects, drive motor 208 of dasher 204 may be turned off for the same period (e.g., 3 minutes) that compressor 214 is off. And then both drive motor 208 and compressor 214 may be turned back on, which may provide less on and off pulsing/cycling.

As shown in FIG. 12A, method 1200 may include, at step 1214, determining whether the detected current (or power, torque, etc.) is greater than or equal to the limit. For example, during the pulsing process of step 1212, controller 402 may continuously compare and determine whether the detected current (or power, torque, etc.) is greater than or equal to the limit. If the detected current (or power, torque, etc.) is greater than the limit, controller 402 may proceed with step 1212. If controller 402 detects that the current (or power, torque, etc.) is less than the limit, controller 402 may proceed to step 1216.

As shown in FIG. 12A, method 1200 may include, at step 1216, running drive motor 208 continuously. For example, controller 402 may start and run drive motor 208 continuously, proceed to step 1218, where compressor 214 is restarted, and then proceed to step 1220 where controller 402 cycles the cooling circuit (e.g., compressor 214) off and on at the target temperature. Controller 402 may then continuously monitor the current (or power, torque, etc.) of drive motor 208 according to step 1204.

Figure 12B:
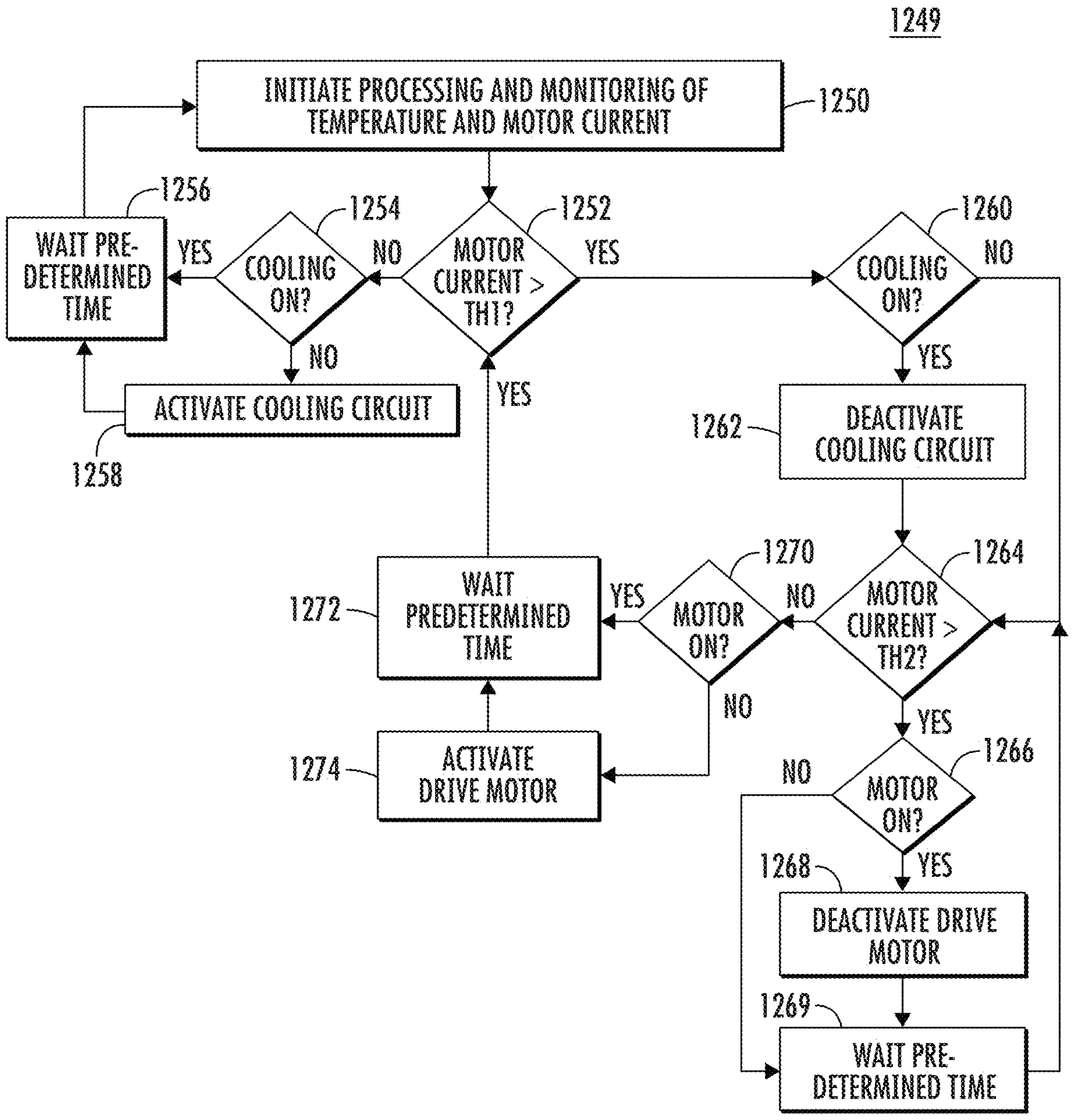
FIG. 12B is a flow diagram of a method for processing a drink product in a drink maker, according to some non-limiting embodiments or aspects.

Referring now FIG. 12B, shown is a method 1249 for processing a drink product in a drink maker, according to some non-limiting embodiments or aspects. The steps shown in FIG. 12B are for example purposes only. It will be appreciated that additional, fewer, different, and/or a different order of steps may be used in some non-limiting embodiments or aspects. In some non-limiting embodiments or aspects, a step may be automatically performed in response to performance and/or completion of a prior step. As shown, method 1249 may include steps for automatically controlling a drink maker in response to detecting when drive motor current (or power, torque, etc.) exceeds one or more limits. It will be appreciated that reference to a motor current in the following description may also refer to a motor power, torque, and/or the like, and motor current is used for ease of reference.

As shown in FIG. 12B, method 1249 may include, at step 1250, initiating processing and monitoring of temperature of a drink product and motor current of a drive motor. For example, controller 402 may initiate processing of the drink product by activating drive motor 208, and controller 402 may further monitor the temperature of the drink product and a motor current of drive motor 208.

As shown in FIG. 12B, method 1249 may include, at step 1252, comparing a motor current to a first threshold. For example, controller 402 may compare a motor current to a first threshold (e.g., a first motor current limit). If the motor current satisfies (e.g., is greater than or equal to) the first threshold, controller 402 may proceed to step 1260. If the motor current does not satisfy the first threshold, controller 402 may proceed to step 1254.

As shown in FIG. 12B, method 1249 may include, at step 1254, determining if the cooling circuit is on. For example, controller 402 may determine if the cooling circuit (e.g., compressor 214) is on. If the cooling circuit is not on, controller 402 may proceed to step 1258. If the cooling circuit is on, controller 402 may proceed to step 1256.

As shown in FIG. 12B, method 1249 may include, at step 1258, activating the cooling circuit. For example, controller 402 may activate the cooling circuit (e.g., compressor 214).

As shown in FIG. 12B, method 1249 may include, at step 1256, waiting a predetermined period of time. For example, controller 402 may wait a predetermined period of time (e.g., 5, 10, 15, 20, 25, 30 seconds, or more) before returning to step 1250 and/or step 1252.

As shown in FIG. 12B, method 1249 may include, at step 1260, determining if the cooling circuit is on. For example, controller 402 may determine if the cooling circuit (e.g., compressor 214) is on. If the cooling circuit is on, controller 402 may proceed to step 1262. If the cooling circuit is not on, controller 402 may proceed to step 1264.

As shown in FIG. 12B, method 1249 may include, at step 1262, deactivating the cooling circuit. For example, controller 402 may deactivate the cooling circuit (e.g., compressor 214). Thereafter, controller 402 may proceed to step 1264.

As shown in FIG. 12B, method 1249 may include, at step 1264, determining whether the motor current satisfies a second threshold. For example, controller 402 may compare the motor current to a second threshold (e.g., second motor current limit) and determine whether the second threshold is satisfied (e.g., met or exceeded). If the second threshold is not satisfied, controller 402 may proceed to step 1270. If the second motor threshold is satisfied, controller 402 may proceed to step 1266.

As shown in FIG. 12B, method 1249 may include, at step 1266, determining whether the drive motor is on. For example, controller 402 may determine whether drive motor 208 is on. If the drive motor 208 is on, controller 402 may proceed to step 1268. If the drive motor 208 is not on, controller 402 may proceed to step 1269.

As shown in FIG. 12B, method 1249 may include, at step 1268, deactivating the drive motor. For example, controller 402 may deactivate drive motor 208. Thereafter, controller 402 may proceed to step 1269.

As shown in FIG. 12B, method 1249 may include, at step 1269, waiting a predetermined period of time. For example, controller 402 may wait a predetermined period of time (e.g., 5, 10, 15, 20, 25, 30 seconds, or more), before proceeding back to step 1264.

As shown in FIG. 12B, method 1249 may include, at step 1270, determining whether the drive motor is on. For example, controller 402 may determine whether drive motor 208 is on. If drive motor 208 is on, controller 402 may proceed to step 1272. If drive motor 208 is not on, controller 402 may proceed to step 1274.

As shown in FIG. 12B, method 1249 may include, at step 1274, activating the drive motor. For example, controller 402 may activate drive motor 208. Thereafter, controller 402 may proceed to step 1272.

As shown in FIG. 12B, method 1249 may include, at step 1272, waiting a predetermined period of time. For example, controller 402 may wait a predetermined period of time (e.g., 5, 10, 15, 20, 25, 30 seconds, or more), before proceeding back to step 1252.

Figure 13:
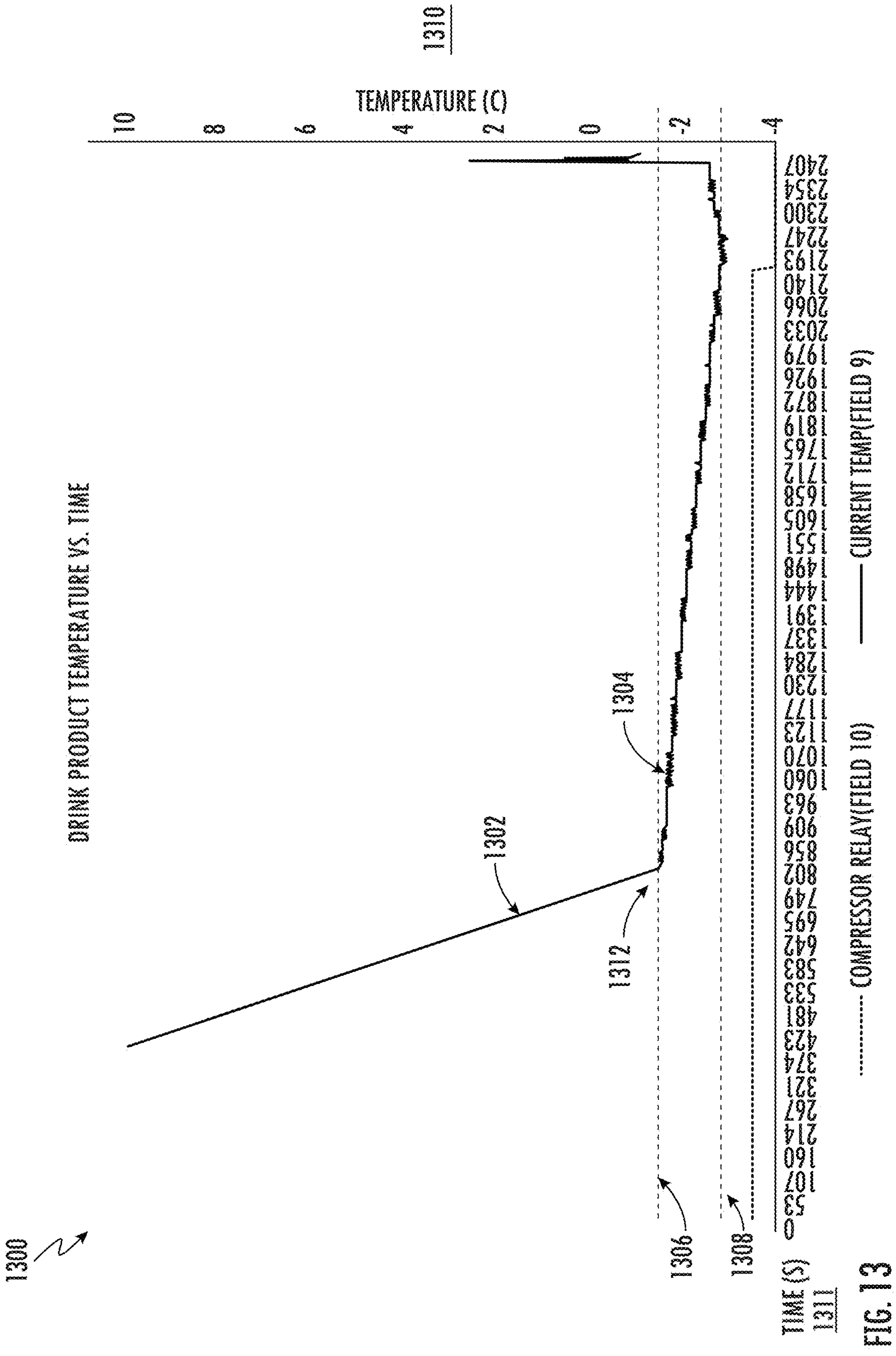
FIG. 13 is a graph of drink product temperature over time that illustrates how a controller may determine the phase change of the drink product when the rate of temperature change decreases from a first rate of change to a second rate of change, according to some non-limiting embodiments or aspects.

Referring now to FIG. 13, shown is a graph 1300 of drink product temperature 1310 over time 1311 that illustrates an example of how a controller (e.g., controller 402) may determine the phase change of the drink product when the rate of temperature change decreases from a first rate of change to a second rate of change, according to some non-limiting embodiments or aspects. While compressor 214 (and thus the cooling circuit) is on, the cooling circuit may be continuously pulling energy out of the ingredients of a drink product in mixing vessel 104. When the drink product temperature is above the phase change temperature value, the thermal gradient associated with the drink product may be steep, because all the energy removed is going entirely to a thermal change. When the liquid of the drink product starts to freeze, the thermal gradient becomes shallow because the phase change is an isothermic event. Therefore, even as the cooling circuit is pulling energy out of the drink product at the same rate, the thermal gradient dramatically reduces. In some non-limiting embodiments or aspects, the phase change (e.g., at point 1312) may be determined to occur when the thermal gradient transitions from steep (e.g., a higher rate of change) to shallow (a lower rate of change).

For illustrative purposes, FIG. 13 shows the temperature gradient for a cola soft drink as a drink product, as temperature is decreased within mixing vessel 104 of drink maker 100. The temperature of the drink product initially decreases at a first rate of temperature change along a first portion 1302 of the temperature gradient, but then changes to a second rate of temperature change along a second portion 1304 of the temperature gradient. Controller 402 may determine that the point at which there is a change in the rate of change of temperature, from a higher rate of change (e.g., steeper slope) to a lower rate of change (e.g., lesser slope), is approximately the phase change temperature value at point 1312. The determined phase change temperature value 1306 corresponds to the temperature at the determined and/or identified freezing point. In this instance, the phase change temperature value for a cola soft drink is about −1.5° C., while the calculated target temperature is about −2.0° C.

In some non-limiting embodiments or aspects, another approach to determining and/or calculating when a phase change has occurred is for controller 402 to continuously monitor temperature via a sliding window over a period of time where the window of the period of time progresses in time incrementally as each temperature signal is detected. For example, controller 402 may receive temperature signals every 0.5 seconds indicating the temperature of a drink product being processed. Controller 402 may compare the first temperature signal with the last temperature signal over a period of time, e.g., a 30 second period. Controller 402 may compare the temperature at time t=30.0 seconds with the temperature at time t=0.0 seconds to determine the temperature change. Then, controller 402 may compare the temperature at time t=0.5 seconds with the temperature at time t=30.5 seconds to determine the temperature change, and so on, continuously. Controller 402 may determine the change in temperature over the period of time, e.g., 30 seconds, by subtracting the first temperature detected from the last temperature detected to determine and/or calculate the rate of change of temperature over the period of time. In some non-limiting embodiments or aspects, controller 402 may compare the determined rate of change of temperature with a constant rate of change value stored in memory that corresponds to a rate of change of temperature associated with one or more drink product types after a phase change from liquid to slush. For example, certain drink product types may have a constant rate of change of temperature in the slush phase (e.g., of about 0.18 degrees Celsius).

In some non-limiting embodiments or aspects, controller 402 may continuously and/or repeatedly determine the rate of change of temperature of a drink product being processed until it determines and/or calculates a rate of change that is about equal to an expected or constant rate of change of temperature associated with a drink product type that has transitioned from a liquid phase to a slush phase. Once controller 402 detects the expected rate of change of temperature, controller 402 may reference the first temperature detection increment of the time period to determine and/or calculate when the phase change and/or transition occurred. As shown in FIG. 13, the slope and/or rate of change of the second portion 1304 of the temperature gradient may correspond to, for example, a constant rate of change of about 0.18 degrees Celsius associated with the drink product type of the drink product being processed. Hence, controller 402 may determine the phase change temperature value by determining when phase change temperature value at point 1312 is reached. The relationship between the expected phase change temperature value and the target temperature value is described further as follows.

Figure 14:
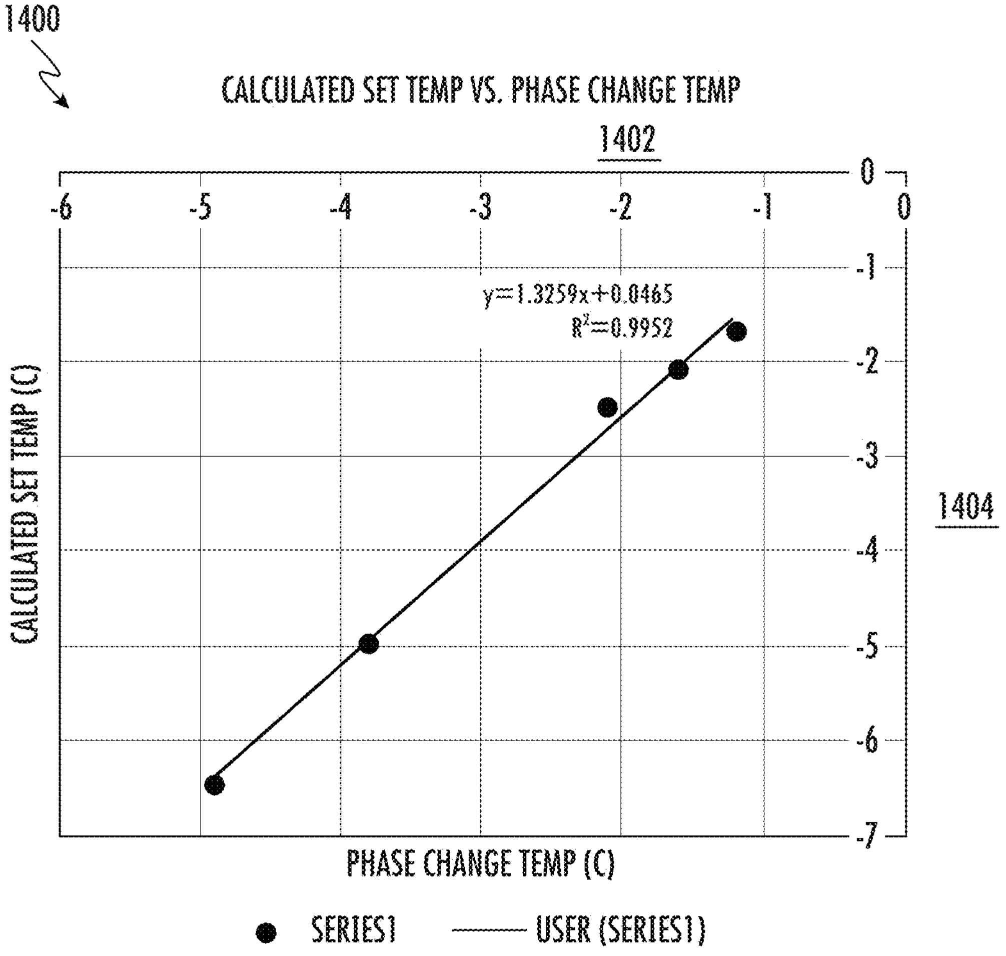
FIG. 14 is a graph of the linear relationship between the temperature at a phase change to a drink type temperature, according to some non-limiting embodiments or aspects.

Referring now to FIG. 14, shown is a graph 1400 that illustrates a linear relationship between a phase change temperature value to a target temperature value, according to some non-limiting embodiments or aspects. Setting temperature to get a desired slush thickness for a given drink type may be difficult. Different ingredients of different drink types may require significantly different temperatures for a given slush thickness. While the impact of a minor change of temperature for a given drink type of as low as 0.1° C. or 0.2° C. may be perceptible to a user, a wide range of temperatures may be needed. Therefore, knowing where to start and how to dial in a temperature setting for a particular drink type may be difficult. Hence, controller 402 may be configured to more efficiently and timely determine a target temperature where an optimal and/or desired slush thickness can be achieved. The temperature to achieve a roughly desired slush thickness may correlate with the phase change temperature value of the ingredients of a particular drink type in a linear manner. By programming this correlation into a memory (e.g., memory 404), controller 402 may automatically determine and/or calculate a target temperature based on the identified phase change temperature value for a particular drink type. FIG. 14 illustrates the linear relationship between the phase change temperature value 1402 and the calculated target temperature or nominal slush thickness value 1404. As shown in FIG. 14, the phase change temperature value of −1.5° C. correlates to a target temperature value of about −2.0° C. Graph 1400 illustrates the linear relationship of various phase change temperature values to target temperature values for multiple drink types. This linear relationship between phase change temperature and target temperature may be similar across all ingredient types such as, without limitation, dairy, soda, alcohol, and/or the like.

Figure 15:
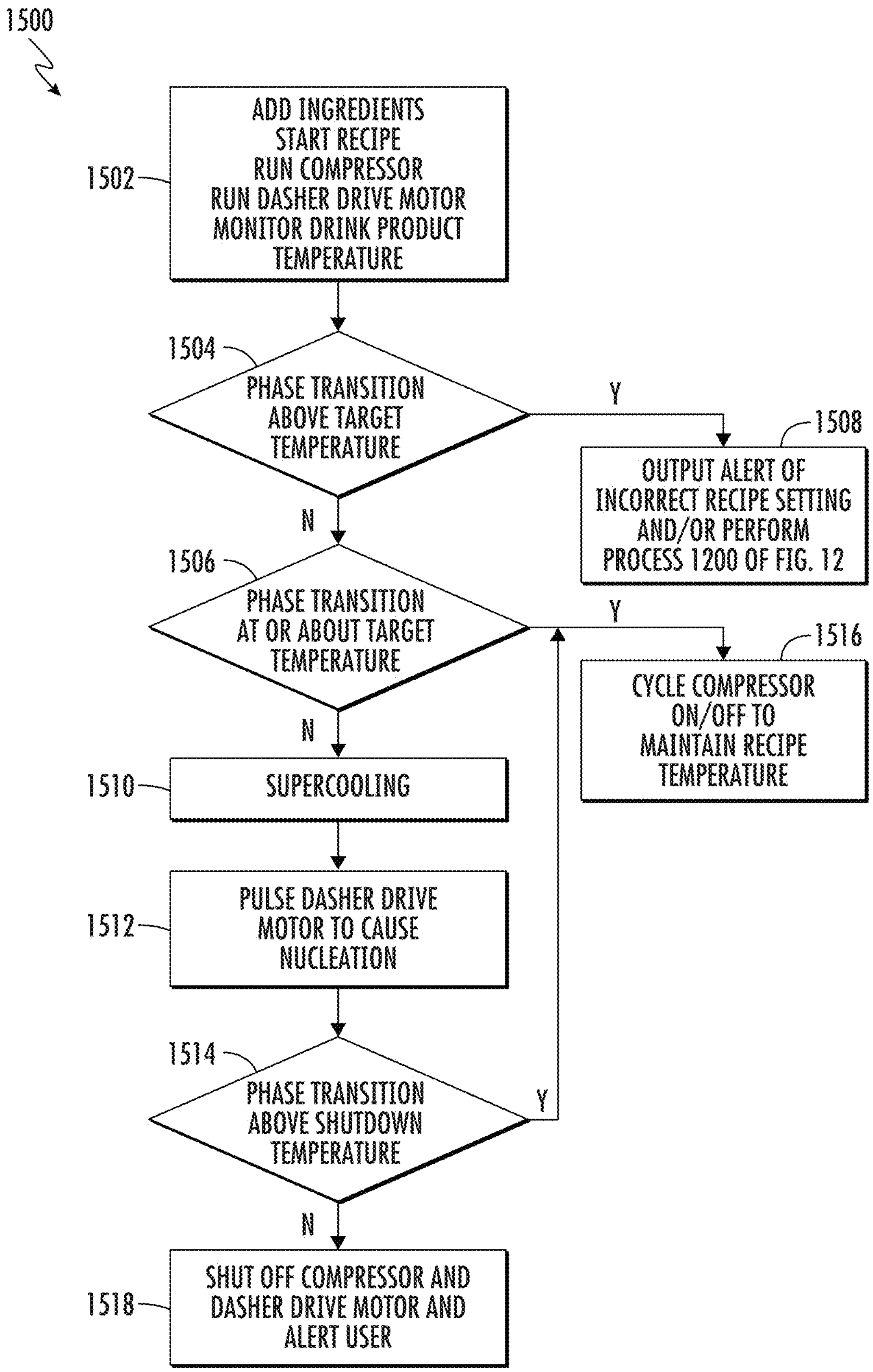
FIG. 15 is a flow diagram of a method for processing a drink product in a drink maker, according to some non-limiting embodiments or aspects.

Referring now to FIG. 15, shown is a flow diagram of a method 1500 for processing a drink product in a drink maker, according to some non-limiting embodiments or aspects. The steps shown in FIG. 15 are for example purposes only. It will be appreciated that additional, fewer, different, and/or a different order of steps may be used in some non-limiting embodiments or aspects. In some non-limiting embodiments or aspects, a step may be automatically performed in response to performance and/or completion of a prior step. As shown, method 1500 may include steps for automatically controlling a drink maker (e.g., drink maker 100), in response to detecting conditions related to the temperature of a drink product, such as when a phase change occurs.

As shown in FIG. 15, method 1500 may include, at step 1502, adding ingredients of a drink product into mixing vessel 104 and starting a program, which may be based on a drink data object stored in memory 404. For example, the program started may include: running a cooling circuit and/or compressor 214, running drive motor 208 to rotate dasher 204, and continuously monitoring the drink product temperature using at least one sensor 406.

As shown in FIG. 15, method 1500 may include, at step 1504, determining if a phase transition of the drink product has occurred above a target temperature. For example, controller 402 may determine whether a phase transition has occurred in the drink product at a temperature above a target temperature. If the phase transition has occurred above the target temperature, controller 402 may proceed to step 1508. If the phase transition has not yet occurred, controller 402 may proceed to step 1506 after a period of time.

For example, if the drink product is a cola soft drink, the expected phase change temperature value may be about −1.5° C. while the preset target temperature value may be about −2.0° C. If the cola soft drink product was diluted with additional water, causing its sugar concentration to decrease significantly, the cola soft drink product's actual phase change may occur at about −1.0° C., which is above the expected phase change temperature of −1.5° C. and the target temperature of −2.0° C. Water has a phase change temperature of 0° C., so the addition of water would increase the phase change temperature of a drink product. Controller 402 may detect this early phase transition and/or phase change above the target temperature value and take action, as in step 1508. Additionally, or alternatively, controller 402 may perform a portion of method 1200, as shown in FIG. 12. Controller 402 may perform portions of method 1500 and method 1200 separately, concurrently, or integrally depending on the circumstances. In some non-limiting embodiments or aspects, the only action taken by controller 402 based on the determined phase change temperature relative to a threshold and/or target temperature may be to continue processing (e.g., if the detected temperature of a drink product is within an allowable temperature range, such as between maximum and minimum temperature limits associated with the drink product that may be stored in the associated drink data object in memory) or output an error via user interface 112 if outside of range.

As shown in FIG. 15, method 1500 may include, at step 1508, alerting a user. For example, controller 402 may, in response to the phase transition occurring above a target temperature, cause an alert to be output to user (e.g., via user interface 112), indicating that an insufficient amount of sugar, alcohol, and/or other ingredients have been added to the drink product associated with the drink type, or that an incorrect drink type was selected for the ingredients of the drink product being processed.

As shown in FIG. 15, method 1500 may include, at step 1506, determining whether a phase transition has occurred at or about the target temperature. For example, controller 402 may determine whether a phase transition has occurred at or about the target temperature. If a phase transition has occurred at or about the target temperature, controller 402 may proceed to step 1516. If a phase transition has not occurred at or about the target temperature, controller 402 may proceed to step 1510.

As shown in FIG. 15, method 1500 may include, at step 1516, cycling the compressor off and on. For example, controller 402 may cycle the cooling circuit (e.g., compressor 214) off and on to maintain the drink product temperature at or about the target temperature. In some non-limiting embodiments or aspects, controller 402 may apply an offset and/or error adjustment that is equal to a positive or negative 10% of the target temperature value when identifying and/or determining the phase change temperature value of the drink product.

As shown in FIG. 15, method 1500 may include, at step 1510, detecting supercooling. For example, if a phase change is not identified at or about the target temperature and the drink product temperature continues to decrease at about the same rate of change, controller 402 may determine that the drink product is in a state of supercooling (e.g., the drink product is still in its liquid phase and no phase change has occurred yet, while the drink product temperature is below its expected phase change temperature). Once controller 402 determines that supercooling is occurring, controller 402 may optionally proceed to step 1512.

As shown in FIG. 15, method 1500 may include, at step 1512, pulsing the dasher drive motor to cause nucleation. For example, controller 402 may pulse drive motor 208 of dasher 204 so that ice may more easily begin nucleating when the churning is stopped and, thereby, trigger a phase change of the drink product.

As shown in FIG. 15, method 1500 may include, at step 1514, determining if a phase transition has occurred above the shutdown temperature. For example, if the drink product temperature continues to decrease but controller 402 identifies a phase transition above the shutdown temperature, method 1500 may proceed to step 1516, where controller 402 cycles compressor 214 on and off to maintain the drink product temperature at about the target temperature. If controller 402 determines that a phase transition has not yet occurred above the shutdown temperature, controller 402 may proceed to step 1518.

As shown in FIG. 15, method 1500 may include, at step 1518, shutting off the compressor, shutting off the dasher drive motor, and alerting the user. For example, controller 402 may shut off compressor 214 and drive motor 208 and alert a user via user interface 112 about the shutdown. In some non-limiting embodiments or aspects, a maximum shutdown temperature and a minimum shutdown temperature may be configured or predefined in association with a type of drink product. The maximum shutdown temperature and minimum shutdown temperature may be stored in memory associated with the particular type of drink product and/or specific drink product. Controller 402 may shut off compressor 214 and/or drive motor 208 when either the maximum or minimum shutdown temperature thresholds are reached or exceeded.

Figure 16:
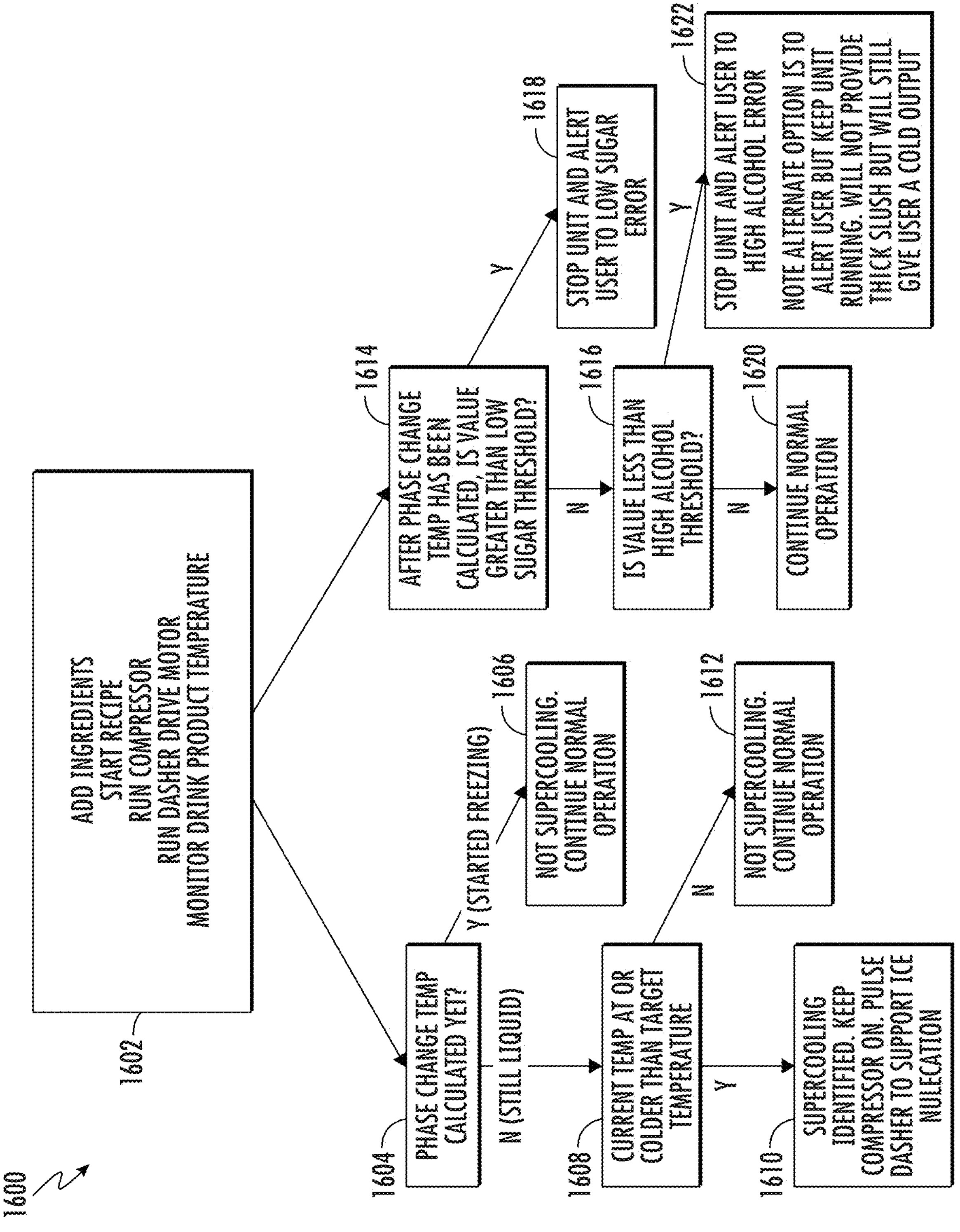
FIG. 16 is a flow diagram of a method for processing a drink product in a drink maker, according to some non-limiting embodiments or aspects.

Referring now to FIG. 16, shown is a flow diagram of a method 1600 for processing a drink product in a drink maker, according to some non-limiting embodiments or aspects. The steps shown in FIG. 16 are for example purposes only. It will be appreciated that additional, fewer, different, and/or a different order of steps may be used in some non-limiting embodiments or aspects. In some non-limiting embodiments or aspects, a step may be automatically performed in response to performance and/or completion of a prior step. As shown, method 1600 may include steps for automatically controlling a drink maker in response to detecting conditions related to the temperature of a drink product, such as when a phase change occurs.

As shown in FIG. 16, method 1600 may include, at step 1602, adding ingredients to mixing vessel 104, starting processing based on a programmed drink data object, activating compressor 214, activating drive motor 208, and monitoring drink product temperature. Controller 402 may use a sliding window temperature monitoring technique, as described above in connection with FIG. 13. Controller 402 may monitor the drink product temperature and continuously determine the rate of change of temperature of the drink product to determine if a phase change has occurred.

As shown in FIG. 16, method 1600 may include, at step 1604, determining whether a phase change has occurred yet based on rate of change of temperature. For example, controller 402 may determine whether a phase change in the drink product has occurred based on a rate of change of temperature. If a phase change has occurred, controller 402 may proceed to step 1606. If a phase change has not yet occurred, controller 402 may proceed to step 1608.

As shown in FIG. 16, method 1600 may include, at step 1606, continuing normal operation of the drink maker. For example, in response to determining that the phase change has occurred, controller 402 may determine that supercooling has not occurred, and controller 402 may proceed with normal operation of drink maker 100.

As shown in FIG. 16, method 1600 may include, at step 1608, determining whether the drink product temperature is at or below the target temperature. For example, controller 402 may determine whether the drink product temperature is at or below the target temperature. If the current drink product temperature is not at or below the target temperature, controller 402 may proceed to step 1612. If controller 402 determines that the current drink product temperature is at or below the target temperature, controller 402 may proceed to step 1610.

As shown in FIG. 16, method 1600 may include, at step 1612, continuing normal operation of the drink maker. For example, in response to determining that the drink product temperature is not at or below the target temperature, controller 402 may determine that supercooling has not occurred, and controller 402 may proceed with normal operation of drink maker 100.

As shown in FIG. 16, method 1600 may include, at step 1610, identifying supercooling and performing mitigating action. For example, controller 402 may determine that supercooling is occurring. Controller 402 may keep compressor 214 on and pulse drive motor 208 to pulse rotation of dasher 204 and, thereby, promote ice nucleation.

As shown in FIG. 16, method 1600 may include, at step 1614, determining a phase change temperature and determining if the drink product temperature value is greater than a low sugar threshold temperature. For example, after monitoring the drink product temperature for a period of time, controller 402 may determine and/or calculate the phase change temperature, and controller 402 may determine if the drink product temperature value is greater than a low sugar threshold temperature. If the drink product temperature value is greater than the low sugar threshold temperature, controller 402 may proceed to step 1618. If the drink product temperature is not greater than the low sugar threshold temperature, controller 402 may proceed to step 1616.

As shown in FIG. 16, method 1600 may include, at step 1618, stopping the drive motor and compressor and generating an alert. For example, controller 402 may stop compressor 214 and drive motor 208, and may further issue an alert via user interface 112 indicating a low sugar condition and/or error.

As shown in FIG. 16, method 1600 may include, at step 1616, determining if the drink product temperature value is less than a high alcohol threshold. For example, controller 402 may compare the drink product temperature value to a high alcohol threshold temperature and determine whether the drink product temperature value is less than a high alcohol threshold temperature. If the drink product temperature value is less than the high alcohol threshold temperature, controller 402 may proceed to step 1622. If the drink product temperature value is not less than the high alcohol threshold temperature, controller 402 may proceed to step 1620.

As shown in FIG. 16, method 1600 may include, at step 1620, continuing normal operation of the drink maker. For example, in response to determining that the drink product temperature is not less than the high alcohol threshold temperature, controller 402 may determine that the drink product is being processed as expected, and controller 402 may proceed with normal operation of drink maker 100.

As shown in FIG. 16, method 1600 may include, at step 1622, stopping the drive motor and compressor, and generating an alert to the user. For example, controller 402 may stop compressor 214 and drive motor 208, and may further issue an alert via user interface 112 indicating a high alcohol condition and/or error. Alternatively, controller 402 may issue a high alcohol alert but keep compressor 214 and drive motor 208 running. In such a circumstance, drink maker 100 may not provide a drink product with a thick slush, but the drink product will still be chilled.

In some non-limiting embodiments or aspects, controller 402 may determine a temperature to achieve a roughly desired slush thickness based on the correlation with the phase change temperature value of the ingredients of particular types of drink products. By programming in this correlation, controller 402 may automatically determine a target temperature based on the calculated phase change temperature value as described above (see, e.g., FIG. 14). In certain circumstances, a user may be able to configure and/or program a custom drink product type based on custom ingredients, where controller 402 may determine the phase change temperature value of the custom drink type and may, thereby, automatically determine a target temperature where the customer drink product type has a desired and/or typical slush thickness. In some non-limiting embodiments or aspects, controller 402 may have a "training mode" for new drink types and custom drink types without known target temperature values. In the training mode, controller 402 may determine a phase change temperature value and a target temperature value therefrom. Controller 402 may be able show settings for new and/or custom drink product types via user interface 112.

Figure 17:
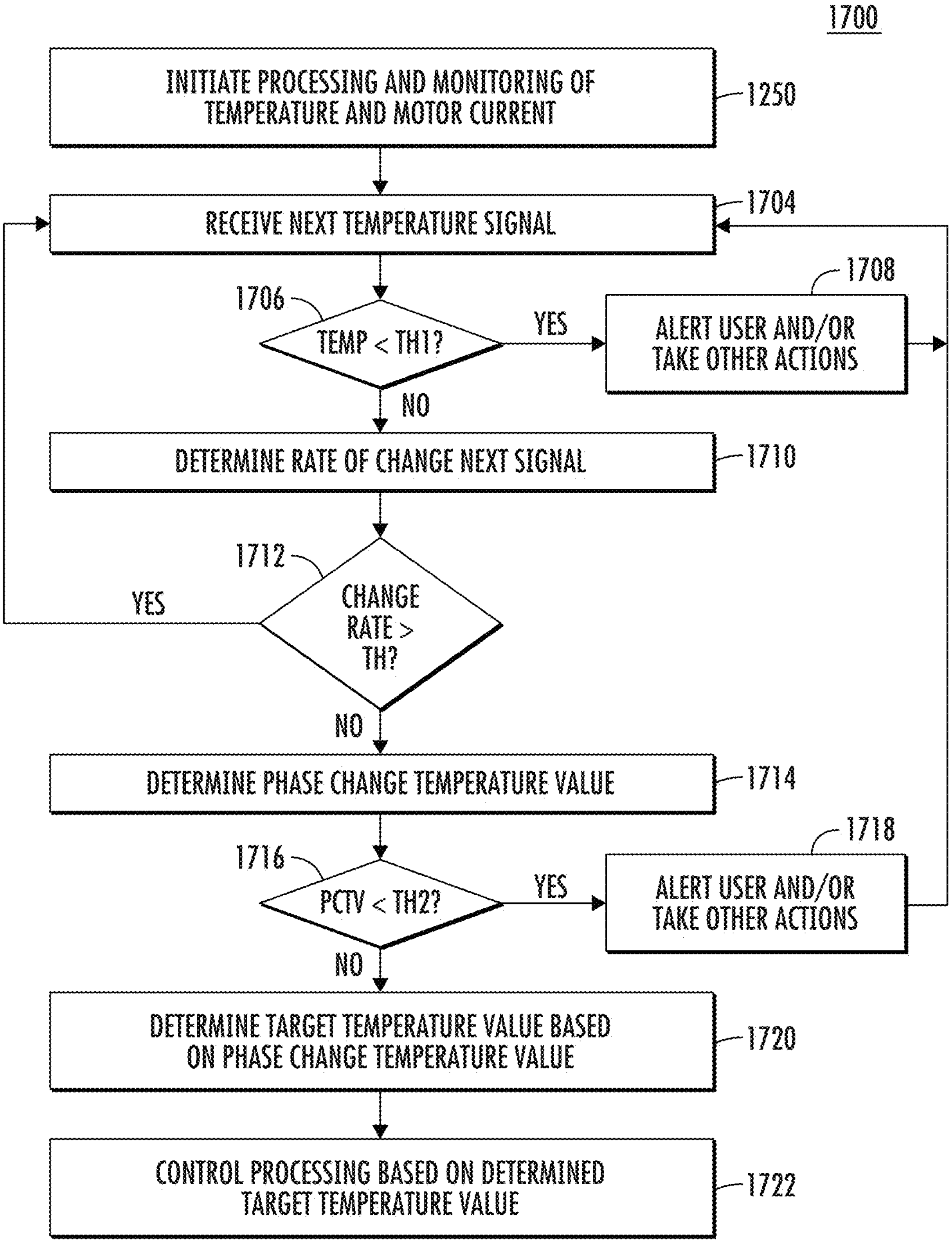
FIG. 17 is a flow diagram of a method for processing a drink product in a drink maker, according to some non-limiting embodiments or aspects.

Referring now to FIG. 17, shown is a flow diagram of a method 1700 for processing a drink product in a drink maker, according to some non-limiting embodiments or aspects. The steps shown in FIG. 17 are for example purposes only. It will be appreciated that additional, fewer, different, and/or a different order of steps may be used in some non-limiting embodiments or aspects. In some non-limiting embodiments or aspects, a step may be automatically performed in response to performance and/or completion of a prior step. As shown, method 1700 may include steps for automatically determining a phase change temperature value of a drink product being processed, and controlling a drink maker based on such determination.

As shown in FIG. 17, method 1700 may include, at step 1250, initiating processing and monitoring of temperature of the drink product and motor current (or power, torque, etc.) of the drive motor. For example, controller 402 may initiate processing of the drink product by activating drive motor 208, and controller 402 may further monitor the temperature of the drink product and a motor current (or power, torque, etc.) of drive motor 208.

As shown in FIG. 17, method 1700 may include, at step 1704, receiving a next temperature signal. For example, controller 402 may receive a next temperature signal of a plurality of temperature signals communicated by temperature sensor 406.

As shown in FIG. 17, method 1700 may include, at step 1706, comparing the next temperature signal to a first temperature threshold. For example, controller 402 may compare the next temperature signal received at step 1704 with a first temperature threshold (e.g., comparing the temperature values associated with each). If the next temperature signal is less than the first temperature threshold, controller 402 may proceed to step 1708. If the next temperature signal is not less than the first temperature threshold, controller 402 may proceed to step 1710.

As shown in FIG. 17, method 1700 may include, at step 1708, alerting the user of drink maker 100, and/or taking other actions. For example, controller 402 may, in response to the next temperature signal being less than the first temperature threshold, cause an alert to be generated to the user and/or take one or more remedial actions, including shutting off drive motor 208, shutting off compressor 214, and/or the like.

As shown in FIG. 17, method 1700 may include, at step 1710, determining a rate of change of the next temperature signal. For example, controller 402 may determine a rate of change of temperature of the next temperature signal by comparing the next temperature signal to a prior temperature signal and dividing by the time that elapsed between temperature signals.

As shown in FIG. 17, method 1700 may include, at step 1712, comparing the determined rate of change to a threshold rate of change. For example, controller 402 may compare the rate of change in temperature determined at step 1710 to a threshold rate of change. If the determined rate of change is greater than the threshold rate of change, controller 402 may proceed back to step 1704 and receive the next temperature signal. If the determined rate of change is not greater than the threshold rate of change, controller 402 may proceed to step 1714.

As shown in FIG. 17, method 1700 may include, at step 1714, determining a phase change temperature value. For example, if the rate of change is less than the threshold rate of change, then controller 402 may detect that a phase change is occurring in the drink product. Controller 402 may then determine the temperature of the drink product at the point of phase change.

As shown in FIG. 17, method 1700 may include, at step 1716, comparing the determined phase change temperature value to a second temperature threshold. For example, controller 402 may compare the phase change temperature value determined at step 1714 to a second temperature threshold. If the phase change temperature value is less than the second temperature threshold, controller 402 may proceed to step 1718. If the phase change temperature value is greater than or equal to the second temperature threshold, controller 402 may proceed to step 1720.

As shown in FIG. 17, method 1700 may include, at step 1718, alerting the user of drink maker 100, and/or taking other actions. For example, controller 402 may, in response to the phase change temperature value being less than the second temperature threshold, cause an alert to be generated to the user and/or take one or more remedial actions, including shutting off drive motor 208, shutting off compressor 214, and/or the like.

As shown in FIG. 17, method 1700 may include, at step 1720, determining a target temperature value based on the phase change temperature value. For example, controller 402 may determine a target temperature value based on the phase change temperature value. The determined target temperature value may be proximal to (e.g., an offset lower temperature from) the phase change temperature value.

As shown in FIG. 17, method 1700 may include, at step 1722, controlling processing based on the determined target temperature value. For example, controller 402 may control processing of drink maker 100 based on the determined target temperature value at step 1720. By way of further example, controller 402 may cycle compressor 214 to maintain the drink product at or around the target temperature value.

Figure 18:
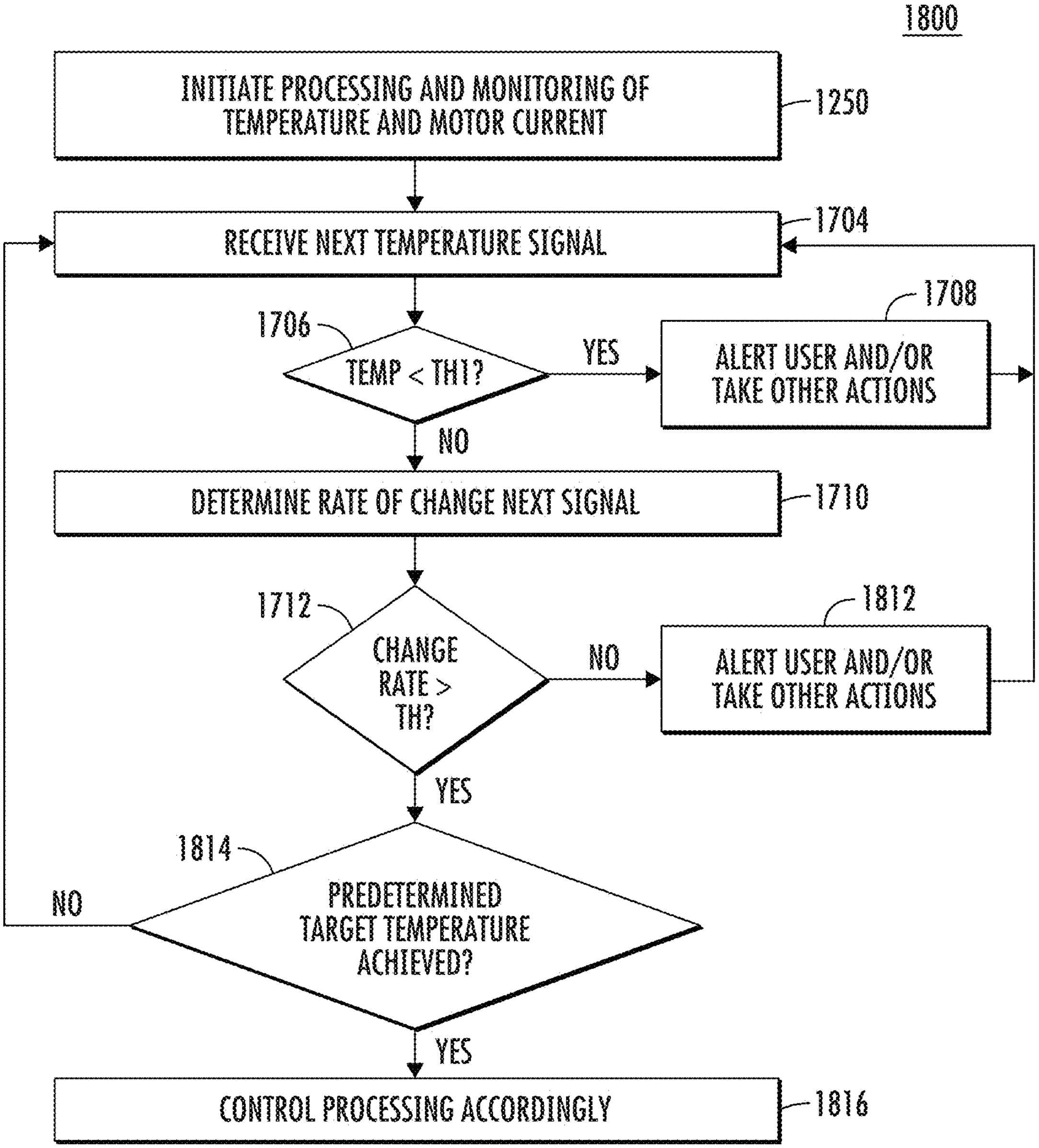
FIG. 18 is a flow diagram of a method for processing a drink product in a drink maker, according to some non-limiting embodiments or aspects.

Referring now to FIG. 18, shown is a flow diagram of a method 1800 for processing a drink product in a drink maker, according to some non-limiting embodiments or aspects. The steps shown in FIG. 18 are for example purposes only. It will be appreciated that additional, fewer, different, and/or a different order of steps may be used in some non-limiting embodiments or aspects. In some non-limiting embodiments or aspects, a step may be automatically performed in response to performance and/or completion of a prior step. As shown, method 1800 may include steps for automatically determining when supercooling or certain user error has occurred, and taking action accordingly.

As shown in FIG. 18, method 1800 may include, at step 1250, initiating processing and monitoring of temperature of the drink product and motor current (or power, torque, etc.) of the drive motor. For example, controller 402 may initiate processing of the drink product by activating drive motor 208, and controller 402 may further monitor the temperature of the drink product and a motor current (or power, torque, etc.) of drive motor 208.

As shown in FIG. 18, method 1800 may include, at step 1704, receiving a next temperature signal. For example, controller 402 may receive a next temperature signal of a plurality of temperature signals communicated by temperature sensor 406.

As shown in FIG. 18, method 1800 may include, at step 1706, comparing the next temperature signal to a first temperature threshold. For example, controller 402 may compare the next temperature signal received at step 1704 with a first temperature threshold (e.g., comparing the temperature values associated with each). If the next temperature signal is less than the first temperature threshold, controller 402 may proceed to step 1708. If the next temperature signal is not less than the first temperature threshold, controller 402 may proceed to step 1710.

As shown in FIG. 18, method 1800 may include, at step 1708, alerting the user of drink maker 100, and/or taking other actions. For example, controller 402 may, in response to the next temperature signal being less than the first temperature threshold, cause an alert to be generated to the user and/or take one or more remedial actions, including shutting off drive motor 208, shutting off compressor 214, and/or the like.

As shown in FIG. 18, method 1800 may include, at step 1710, determining a rate of change of the next temperature signal. For example, controller 402 may determine a rate of change of temperature of the next temperature signal by comparing the next temperature signal to a prior temperature signal and dividing by the time that elapsed between temperature signals.

As shown in FIG. 18, method 1800 may include, at step 1712, comparing the determined rate of change to a threshold rate of change. For example, controller 402 may compare the rate of change in temperature determined at step 1710 to a threshold rate of change. If the determined rate of change is greater than the threshold rate of change, controller 402 may proceed to step 1814. If the determined rate of change is not greater than the threshold rate of change, controller 402 may proceed to step 1812.

As shown in FIG. 18, method 1800 may include, at step 1812, alerting the user of drink maker 100, and/or taking other actions. For example, controller 402 may, in response to the next temperature signal being less than the first temperature threshold, cause an alert to be generated to the user and/or take one or more remedial actions, including shutting off drive motor 208, shutting off compressor 214, and/or the like.

As shown in FIG. 18, method 1800 may include, at step 1814, determining if a predetermined target temperature has been achieved in the drink product. For example, controller may determine a current temperature of the drink product from the temperature signal received from temperature sensor 406 and compare the current temperature to a predetermined target temperature. By way of further example, controller 402 may determine that the predetermined target temperature has been achieved if the current temperature is equal to, or within an acceptable range from, the predetermined target temperature. If the predetermined target temperature has been achieved, controller 402 may proceed to step 1816. If the predetermined target temperature has not been achieved, controller 402 may proceed back to step 1704 and receive the next temperature signal from temperature sensor 406.

As shown in FIG. 18, method 1800 may include, at step 1816, controlling processing based on the predetermined target temperature value. For example, controller 402 may control processing of drink maker 100 based on the predetermined target temperature value. By way of further example, controller 402 may cycle compressor 214 to maintain the drink product at or around the predetermined target temperature value.

Figure 19:
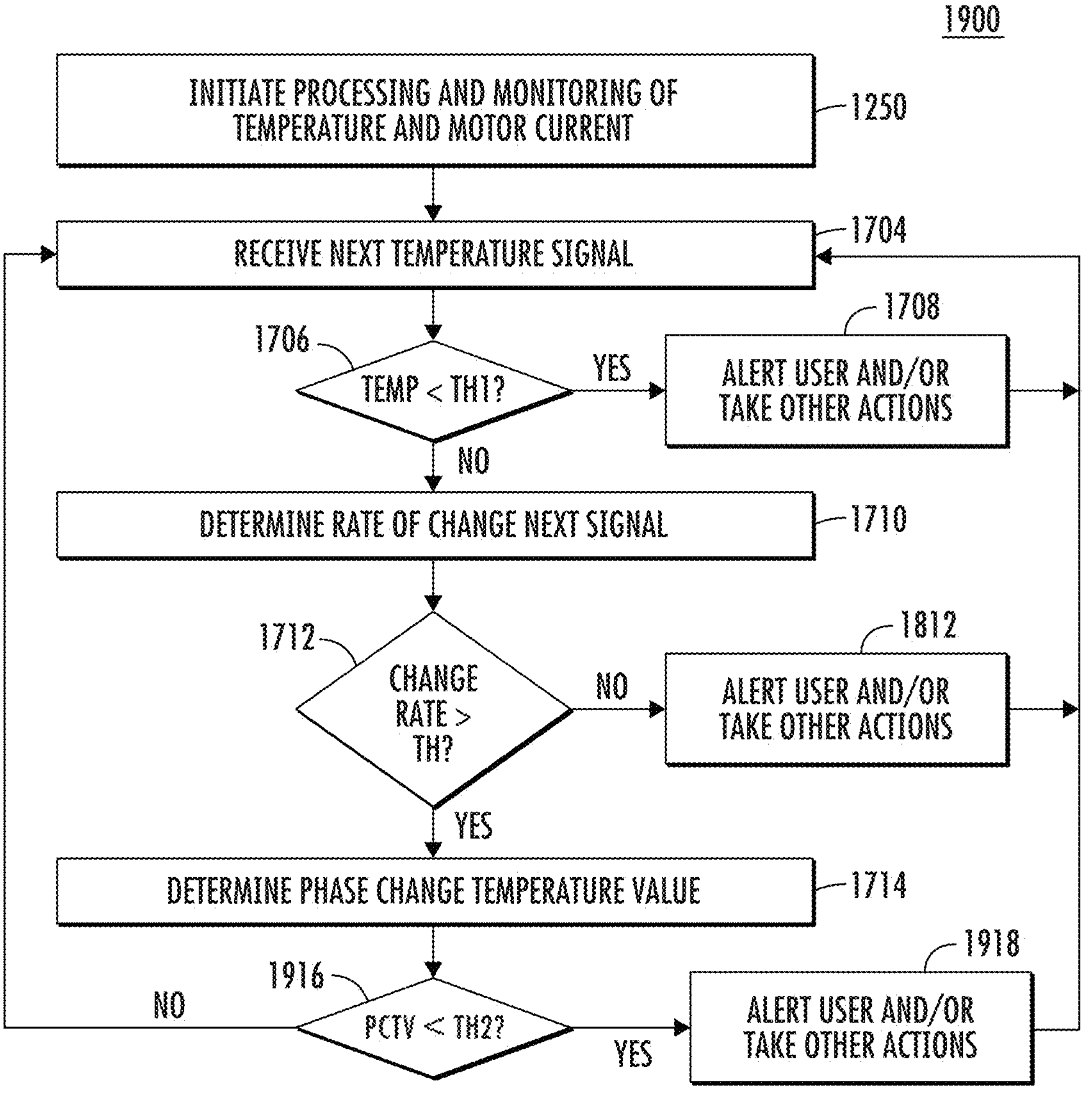
FIG. 19 is a flow diagram of a method for processing a drink product in a drink maker, according to some non-limiting embodiments or aspects.

Referring now to FIG. 19, shown is a flow diagram of a method 1900 for processing a drink product in a drink maker, according to some non-limiting embodiments or aspects. The steps shown in FIG. 19 are for example purposes only. It will be appreciated that additional, fewer, different, and/or a different order of steps may be used in some non-limiting embodiments or aspects. In some non-limiting embodiments or aspects, a step may be automatically performed in response to performance and/or completion of a prior step. As shown, method 1900 may include steps for automatically determining when a phase change temperature value is too high, and taking actions accordingly.

As shown in FIG. 19, method 1900 may include, at step 1250, initiating processing and monitoring of temperature of the drink product and motor current (or power, torque, etc.) of the drive motor. For example, controller 402 may initiate processing of the drink product by activating drive motor 208, and controller 402 may further monitor the temperature of the drink product and a motor current (or power, torque, etc.) of drive motor 208.

As shown in FIG. 19, method 1900 may include, at step 1704, receiving a next temperature signal. For example, controller 402 may receive a next temperature signal of a plurality of temperature signals communicated by temperature sensor 406.

As shown in FIG. 19, method 1900 may include, at step 1706, comparing the next temperature signal to a first temperature threshold. For example, controller 402 may compare the next temperature signal received at step 1704 with a first temperature threshold (e.g., comparing the temperature values associated with each). If the next temperature signal is less than the first temperature threshold, controller 402 may proceed to step 1708. If the next temperature signal is not less than the first temperature threshold, controller 402 may proceed to step 1710.

As shown in FIG. 19, method 1900 may include, at step 1708, alerting the user of drink maker 100, and/or taking other actions. For example, controller 402 may, in response to the next temperature signal being less than the first temperature threshold, cause an alert to be generated to the user and/or take one or more remedial actions, including shutting off drive motor 208, shutting off compressor 214, and/or the like.

As shown in FIG. 19, method 1900 may include, at step 1710, determining a rate of change of the next temperature signal. For example, controller 402 may determine a rate of change of temperature of the next temperature signal by comparing the next temperature signal to a prior temperature signal and dividing by the time that elapsed between temperature signals.

As shown in FIG. 19, method 1900 may include, at step 1712, comparing the determined rate of change to a threshold rate of change. For example, controller 402 may compare the rate of change in temperature determined at step 1710 to a threshold rate of change. If the determined rate of change is not greater than the threshold rate of change, controller 402 may proceed to step 1812. If the determined rate of change is greater than the threshold rate of change, controller 402 may proceed to step 1714.

As shown in FIG. 19, method 1900 may include, at step 1812, alerting the user of drink maker 100, and/or taking other actions. For example, controller 402 may, in response to the next temperature signal being less than the first temperature threshold, cause an alert to be generated to the user and/or take one or more remedial actions, including shutting off drive motor 208, shutting off compressor 214, and/or the like.

As shown in FIG. 19, method 1900 may include, at step 1714, determining a phase change temperature value. For example, if the rate of change is less than the threshold rate of change, then controller 402 may detect that a phase change is occurring in the drink product. Controller 402 may then determine the temperature of the drink product at the point of phase change.

As shown in FIG. 19, method 1900 may include, at step 1916, comparing the determined phase change temperature value to a second temperature threshold. For example, controller 402 may compare the phase change temperature value determined at step 1714 to a second temperature threshold. If the phase change temperature value is greater than or equal to the second temperature threshold, controller 402 may proceed back to step 1704 and receive the next temperature signal. If the phase change temperature value is less than the second temperature threshold, controller 402 may proceed to step 1918.

As shown in FIG. 19, method 1900 may include, at step 1918, alerting the user of drink maker 100, and/or taking other actions. For example, controller 402 may, in response to the next temperature signal being less than the first temperature threshold, cause an alert to be generated to the user and/or take one or more remedial actions, including shutting off drive motor 208, shutting off compressor 214, and/or the like.

Figure 20:
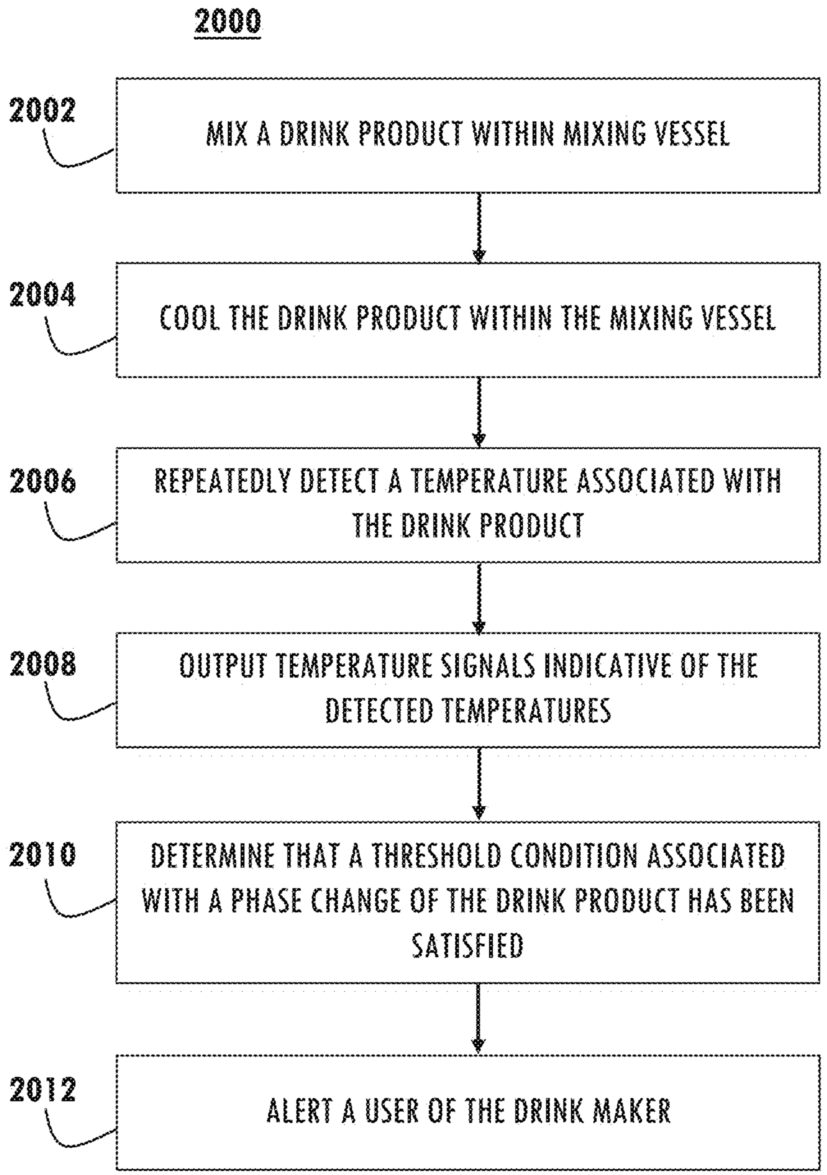
FIG. 20 is a flow diagram of a method for processing a drink product in a drink maker, according to some non-limiting embodiments or aspects.

Referring now to FIG. 20, shown is a flow diagram of a method 2000 for processing a drink product in a drink maker, according to some non-limiting embodiments or aspects. The steps shown in FIG. 20 are for example purposes only. It will be appreciated that additional, fewer, different, and/or a different order of steps may be used in some non-limiting embodiments or aspects. In some non-limiting embodiments or aspects, a step may be automatically performed in response to performance and/or completion of a prior step. As shown in FIG. 20, one or more steps of method 2000 may be performed by one or more components of drink maker 100, including control system 400 and/or controller 402. Additionally, or alternatively, one or more steps of method 2000 may be performed by one or more different components of drink maker 100, other than control system 400 and/or controller 402.

As shown in FIG. 20, method 2000 may include, at step 2002, mixing a drink product within a mixing vessel. For example, after a drink product is poured into a mixing vessel 104 of drink maker 100, dasher 204, driven by drive motor 208, may mix the drink product within mixing vessel 104.

As shown in FIG. 20, method 2000 may include, at step 2004, cooling the drink product within the mixing vessel. For example, the cooling circuit (e.g., including compressor 214, evaporator 202, condenser 216, condenser fan 218, bypass valve, and conduit) may cool the drink product within mixing vessel 104.

As shown in FIG. 20, method 2000 may include, at step 2006, repeatedly detecting a temperature associated with the drink product. For example, sensor 406 (e.g., controlled by controller 402), may repeatedly detect a temperature associated with the drink product within mixing vessel 104.

In some non-limiting embodiments or aspects, sensor 406 may be configured to, when repeatedly detecting the temperature associated with the drink product, repeatedly detect the temperature associated with the drink product a periodic interval in a range of about 0.1 seconds to about 5 seconds. A length of each interval of detection may be a same or different length as a prior interval of detection. The temperature signals output from sensor 406 may be indicative of the detected temperature at a respective periodic interval. For example, at t=0 seconds, sensor 406 may detect a temperature of the drink product of 2.37° C. and output a first temperature signal to controller 402 indicative of 2.37° C., at t=5 seconds, sensor 406 may detect a temperature of the drink product of 2.40° C. and output a second temperature signal to controller 402 indicative of 2.40° C., and at t=10 seconds, sensor 406 may detect a temperature of the drink product of 2.43° C. and output a third temperature signal to controller 402 indicative of 2.43° C.

As shown in FIG. 20, method 2000 may include, at step 2008, outputting temperature signals indicative of the detected temperatures. For example, sensor 406 (e.g., controlled by controller 402), may output temperature signals indicative of the detected temperatures of step 2006. Controller 402 may receive the temperature signals output by sensor 406.

As shown in FIG. 20, method 2000 may include, at step 2010, determining that a threshold condition associated with a phase change of the drink product has been satisfied. For example, controller 402 may determine, based on the temperature signals output in step 2008, that a threshold condition associated with a phase change (e.g., a liquid-to-solid phase transition) of the drink product has been satisfied.

In some non-limiting embodiments or aspects, the threshold condition associated with the phase change of the drink product may include a threshold temperature value associated with the phase change of the drink product. For example, the threshold temperature value may be in the range of about −1° C. to about −9° C., and the threshold temperature value may be further dependent on a drink type selected by the user in a user interface of drink maker 100. By way of further example, a drink product that is low in sugar/alcohol may have a threshold temperature value in the range of about −1° C. to about −2.3° C. (e.g., a threshold temperature value of −2° C.). To further illustrate, a drink product that is high in sugar/alcohol may have a threshold temperature value in the range of about −5.8° C. to about −8.8° C. (e.g., a threshold temperature value of −7° C.).

In some non-limiting embodiments or aspects, the threshold condition associated with the phase change of the drink product may include a threshold rate of change. For example, controller 402 may be configured to determine a rate of change of temperature based on the temperature signals received from sensor 406. By way of further example, controller 402 may determine a first temperature at a first time step, determine a second temperature at a second time step that is a time period after a first time step, determine a difference between the first temperature and the second temperature, and divide the difference by the time period.

In some non-limiting embodiments or aspects, the threshold rate of change associated with the phase change of the drink product may have a value in a range of about 0.002 Celsius/second to about 0.006 Celsius/second. Controller 402 may be configured to, when determining that the threshold condition has been satisfied, that the rate of change of temperature is less than or equal to the threshold rate of change. For example, controller 402 may determine a value (e.g., an absolute value) of a rate of change of temperature in the drink product of 0.003 Celsius/second, which may be less than or equal to a predetermined threshold value (e.g., absolute value) of rate of change of 0.004 Celsius/second, and from that comparison, controller 402 may determine that the threshold condition has been satisfied. In response to determining that the rate of change of temperature is less than or equal to the threshold rate of change, controller 402 may determine that the phase change has occurred. Additionally, or alternatively, controller 402 may be configured to, when determining that the threshold condition has been satisfied, determine that the rate of change of temperature is greater than or equal to the threshold rate of change. For example, controller 402 may determine a value (e.g., an absolute value) of a rate of change of temperature in the drink product of 0.010 Celsius/second, which may be greater than or equal to a predetermined threshold value (e.g., absolute value) of rate of change of 0.006 Celsius/second, and from that comparison, controller 402 may determine that the threshold condition has been satisfied. This determination may also be coupled with a comparison to an elapsed time, as described below.

In some non-limiting embodiments or aspects, controller 402 may be further configured to determine an elapsed time of a mixing of the drink product. The threshold condition associated with the phase change of the drink product may further include a threshold duration. Controller 402 may be further configured to, when determining that the threshold condition has been satisfied, determine that the elapsed time is greater than or equal to the threshold duration. For example, controller 402 may determine that 35 minutes have elapsed, which is greater than a 30-minute threshold duration, and that the rate of change in temperature may be 0.010 Celsius/second, which is less than or equal to the predetermined threshold value. Based on that comparison, controller 402 may determine the threshold condition to be satisfied and may generate an alert to the user (e.g., indicating that the drink product's sugar/alcohol content is too high, which may lead to the prolonged delay to achieve phase change).

As shown in FIG. 20, method 2000 may include, at step 2012, alerting a user of the drink maker. For example, controller 402 may, in response to determining that the threshold condition has been satisfied, alert a user of drink maker 100.

In some non-limiting embodiments or aspects, the threshold temperature value may include a minimum threshold temperature value. Determining that the threshold condition has been satisfied (at step 2010) may include determining that a temperature value of the phase change of the drink product is lower than or equal to the minimum threshold temperature value. For example, the minimum threshold temperature value may be −9° C., and controller 402 may determine that a temperature value of the phase change is lower (e.g., colder) than, or equal to, −9° C. The alert (at step 2012) may indicate to the user that the drink product must be modified before proper slushing can occur (e.g., adding additional liquid to mixing vessel 104 with a low- or no-sugar/alcohol content to reduce the overall sugar/alcohol content of the drink product).

In some non-limiting embodiments or aspects, the threshold temperature value may include a maximum threshold temperature value. Determining that the threshold condition has been satisfied (at step 2010) may include determining that a temperature value of the phase change of the drink product is higher than or equal to the maximum threshold temperature value. For example, the minimum threshold temperature value may be −1° C., and controller 402 may determine that a temperature value of the phase change is higher (e.g., warmer) than, or equal to, −1° C. The alert (at step 2012) may indicate to the user that the drink product must be modified before proper slushing can occur (e.g., adding additional liquid to mixing vessel 104 with a comparatively higher sugar/alcohol content to raise the overall sugar/alcohol content of the drink product).

In some non-limiting embodiments or aspects, drink maker 100 may include at least one output device, such as a display, a speaker, a light indicator, and/or the like. Controller 402 may be configured to, when alerting the user of the drink maker in step 2012, cause the at least one output device to alert the user of the drink maker. For example, the at least one output device may include one or more displays of drink maker 100, and controller 402 may be configured to cause the one or more displays to produce a visual alert (e.g., an image output, a video output, an illuminated icon/symbol, and/or the like). By way of further example, the at least one output device may include one or more speakers of drink maker 100, and controller 402 may be configured to cause the one or more speakers to produce an aural alert (e.g., a beep, a series of sounds, one or more audio waves, and/or the like). To further illustrate, the at least one output device may include one or more light indicators of drink maker 100, and controller 402 may be configured to cause the one or more light indicators to produce a visual alert (e.g., a fixed illumination, an intermittent illumination, and/or the like). Controller 402 may cause one or more of the at least one output device to activate, thereby alerting the user, in response to determining that the phase change has occurred, such as in step 2010.

In some non-limiting embodiments or aspects, the at least one output device may include at least one speaker, and controller 402 may be configured to cause the at least one speaker, when producing an alert, to emit a series of sounds (e.g., audible notes). For example, the series of sounds may include a plurality of sounds having, when produced in series, at least one of ascending pitch or ascending volume (e.g., a number of audible notes that include, therein, a rise in pitch or volume, such as, but not limited to, a rising trill). By way of another example, the series of sounds may include a plurality of sounds having, when produced in series, at least one of descending pitch or descending volume (e.g., a number of audible notes that include, therein, a fall in pitch or volume, such as, but not limited to, a falling trill).

In some non-limiting embodiments or aspects, the at least one output device may include a plurality of light indicators (e.g., LEDs). For example, the plurality of light indicators may be configured to, when caused by controller 402 to alert the user of the drink maker, illuminate in sequence. By way of further example, drink maker 100 may include user interface 112 with ten LEDs arranged in a line. When alerting the user, the ten LEDs may illuminate sequentially (e.g., forward, upward, downward, or backward along the line of LEDs). To further illustrate, a sequential activation of light indicators may be paired with a plurality of sounds produced by at least one speaker (e.g., an upward sequential illumination paired with an at least partly rising series of notes, a downward sequential illumination paired with an at least partly falling series of notes, and/or the like).

Figure 21:
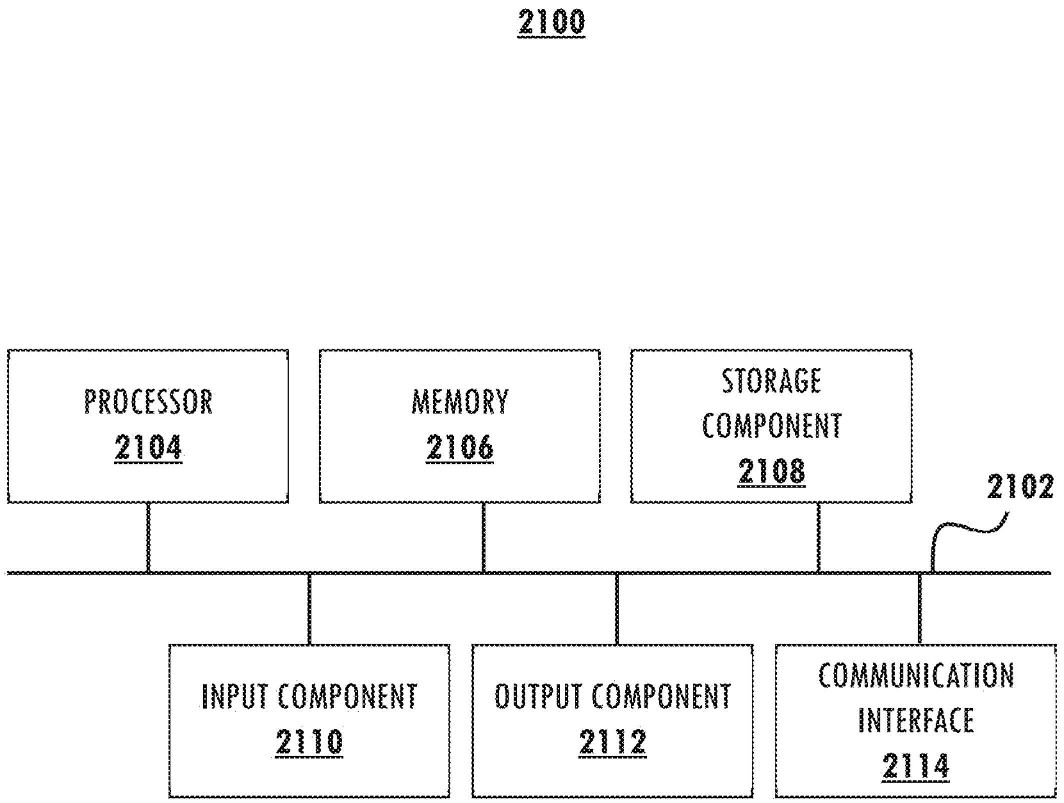
FIG. 21 is a schematic diagram of example components of one or more devices of FIG. 1, according to some non-limiting embodiments or aspects.

Referring now to FIG. 21, shown is a diagram of example components of a device 2100, according to non-limiting embodiments. Device 2100 may correspond to control system 400 and/or controller 402, as an example. In some non-limiting embodiments, such systems or devices may include at least one device 2100 and/or at least one component of device 2100. The number and arrangement of components shown are provided as an example. In some non-limiting embodiments, device 2100 may include additional components, fewer components, different components, or differently arranged components than those shown. Additionally, or alternatively, a set of components (e.g., one or more components) of device 2100 may perform one or more functions described as being performed by another set of components of device 2100.

As shown in FIG. 21, device 2100 may include a bus 2102, a processor 2104, memory 2106, a storage component 2108, an input component 2110, an output component 2112, and a communication interface 2114. Bus 2102 may include a component that permits communication among the components of device 2100. In some non-limiting embodiments, processor 2104 may be implemented in hardware, firmware, or a combination of hardware and software. For example, processor 2104 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 2106 may include random access memory (RAM), read only memory (ROM), and/or another type of dynamic or static storage device (e.g., flash memory, magnetic memory, optical memory, etc.) that stores information and/or instructions for use by processor 2104.

With continued reference to FIG. 21, storage component 2108 may store information and/or software related to the operation and use of device 2100. For example, storage component 2108 may include a hard disk (e.g., a magnetic disk, an optical disk, a magneto-optic disk, a solid-state disk, etc.) and/or another type of computer-readable medium. Input component 2110 may include a component that permits device 2100 to receive information, such as via user input (e.g., a touch screen display, a keyboard, a keypad, a mouse, a button, a switch, a microphone, etc.). Additionally, or alternatively, input component 2110 may include a sensor for sensing information (e.g., a global positioning system (GPS) component, an accelerometer, a gyroscope, an actuator, etc.). Output component 2112 may include a component that provides output information from device 2100 (e.g., a display, a speaker, one or more light-emitting diodes (LEDs), etc.). Communication interface 2114 may include a transceiver-like component (e.g., a transceiver, a separate receiver and transmitter, etc.) that enables device 2100 to communicate with other devices, such as via a wired connection, a wireless connection, or a combination of wired and wireless connections. Communication interface 2114 may permit device 2100 to receive information from another device and/or provide information to another device. For example, communication interface 2114 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 2100 may perform one or more processes described herein. Device 2100 may perform these processes based on processor 2104 executing software instructions stored by a computer-readable medium, such as memory 2106 and/or storage component 2108. A computer-readable medium may include any non-transitory memory device. A memory device includes memory space located inside of a single physical storage device or memory space spread across multiple physical storage devices. Software instructions may be read into memory 2106 and/or storage component 2108 from another computer-readable medium or from another device via communication interface 2114. When executed, software instructions stored in memory 2106 and/or storage component 2108 may cause processor 2104 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "configured to," as used herein, may refer to an arrangement of software, device(s), and/or hardware for performing and/or enabling one or more functions (e.g., actions, processes, steps of a process, and/or the like). For example, "a processor configured to" may refer to a processor that executes software instructions (e.g., program code) that cause the processor to perform one or more functions.

Figure 22:
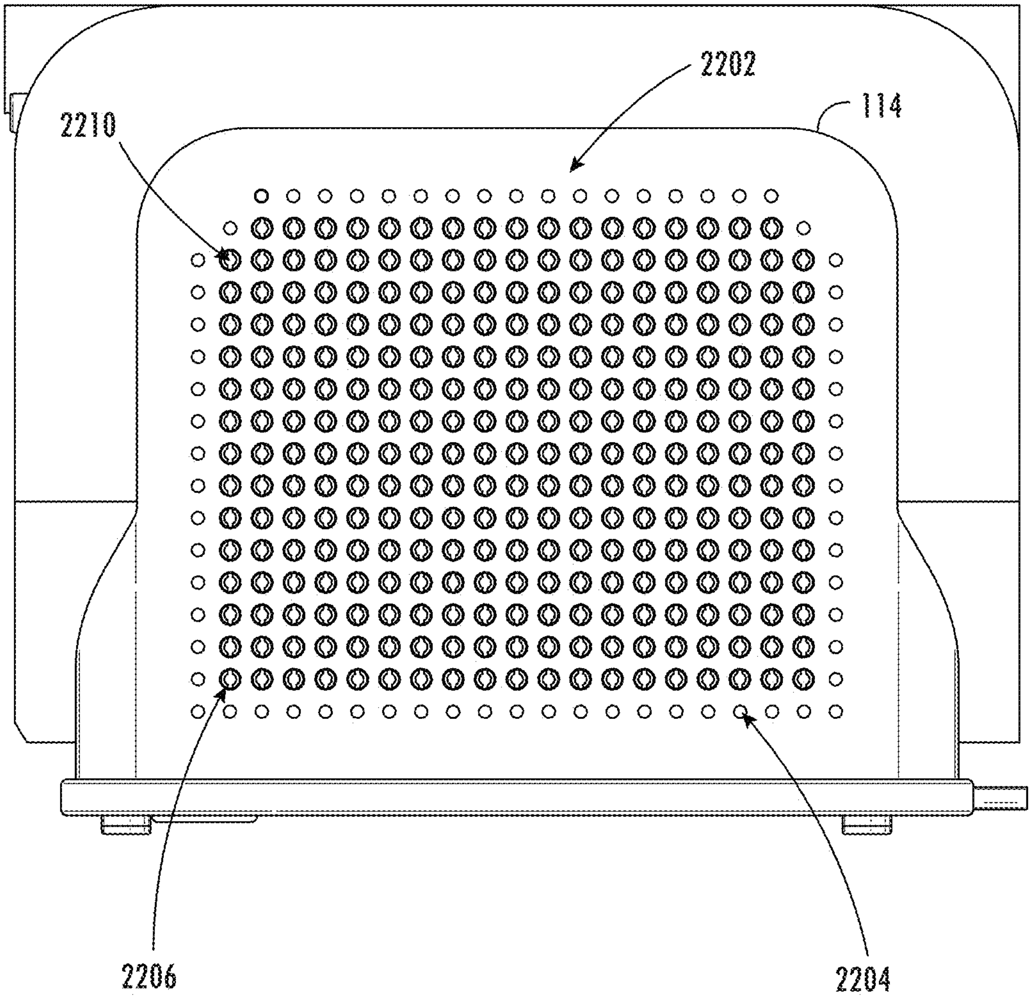
FIG. 22 is an external, side view of a ventilation panel of a drink maker, according to some non-limiting embodiments or aspects.

Referring now to FIG. 22, shown is an external, side view of ventilation panel 114 of drink maker 100, according to some non-limiting embodiments or aspects. The view of FIG. 22 is a right-side view of drink maker 100 shown in FIG. 1, however, it will be appreciated that either or both sides of drink maker 100 may be configured with ventilation panel 114, as shown in FIGS. 1 and 2. Ventilation panel 114 may include an array 2202 of holes 2204, 2206 configured to permit airflow to ventilate housing 102 of drink maker 100. Ventilation panel 114 may be included in and/or fitted to a sidewall of housing 102. Array 2202 of holes 2204, 2206 may be configured as a one-dimensional array (e.g., a linear and/or curvilinear series of holes), and/or a two-dimensional array (e.g., a symmetrical and/or asymmetrical pattern of holes across a surface area of ventilation panel 114). A hole may include a pass-through in ventilation panel 114, through which air may be permitted to flow from one side of ventilation panel 114 to the other. A hole may have a planar cross-section with a regular shape (e.g., a circle, a square, a triangle, a regular polygon, etc.), an irregularly shape (e.g., a rectangle, an oval, an irregular polygon, etc.), or a combination thereof. An array of holes may include holes of same or different shape. As shown in FIG. 22, a two-dimensional array 2202 of circular holes 2204, 2206 are depicted, for illustrative purposes only. In arrangements of housings 102 with two ventilation panels 114, each ventilation panel 114 may have a respective array 2202 of holes 2204, 2206 and a respective set of baffling 2210. Moreover, in arrangements of housings 102 with two ventilation panels 114, each panel 114 may have a same or different pattern of holes 2204, 2206 in array 2202, and one panel 114 may have a smaller number of holes 2204, 2206 to accommodate the placement of mount 302 for holding drip tray 118.

In some non-limiting embodiments or aspects, ventilation panel 114 may further include at least one baffling 2210 that is proximate to an interior surface (e.g., positioned on, positioned adjacent, positioned within a short distance of) of ventilation panel 114. In some non-limiting embodiments or aspects, ventilation panel 114 may include a plurality of baffling 2210. Baffling 2210 is configured to at least partly occlude a set of holes in array 2202 of holes 2204, 2206. Baffling 2210 may at least partly inhibit air and/or liquid from passing through a set of holes in array 2202 (e.g., by partly blocking and/or changing the cross-sectional area of a corresponding hole). In this manner, sound waves generated inside housing 102 (e.g., by drive motor 208, compressor 214, fan 218, etc.) may be dampened and/or scattered before exiting housing 102 and reaching user's perception, lessening the overall level of noise of drink maker 100 during operation. Furthermore, incidental liquid contact (e.g., from spilled drink product, rinsing liquid, etc.) on housing 102 may be inhibited from penetrating (or deeply penetrating) housing 102. As shown in FIG. 22, holes 2204, 2206 of array 2202 are at least partly occluded by a plurality of baffling 2210, for illustrative purposes only.

In some non-limiting embodiments or aspects, array 2202 may include holes of different sizes. For example, array 2202 may include a gradient of hole sizes across the array 2202 (e.g., from smaller diameter to larger diameter holes, from larger diameter to smaller diameter holes, etc.). Such a gradient effect may be achieved by positioning smaller holes 2204 (e.g., holes with a comparatively smaller diameter over a planar cross-section) on a perimeter of a two-dimensional array 2202, and with larger holes 2206 (e.g., holes with a comparatively larger diameter over a planar cross-section) positioned inside the perimeter of smaller holes 2204. A gradient arrangement of holes 2204, 2206 may provide both an improved appearance and reduce the total number of holes in array 2202 that require a baffling 2210. In some non-limiting embodiments or aspects, the set of larger holes 2206 of array 2202 may be at least partly occluded by baffling 2210, while the set of smaller holes 2204 may be free of baffling 2210. See FIG. 23 for a closer view of holes 2206 of ventilation panel 114.

In some non-limiting embodiments or aspects, the maximum diameter of each hole 2204, 2206 may be selected to prevent object intrusion and/or penetration through ventilation panel 114 (e.g., by a user's finger, a utensil, etc.), which might injure user and/or damage drink maker 100. In some non-limiting embodiments or aspects, the maximum diameter of each hole 2204, 2206 in array 2202 may be less than or equal to 0.3 inches (e.g., 0.3 inches, 0.25 inches, 0.2 inches, etc.). Furthermore, smaller holes 2204 may be configured with a maximum diameter that is 50% or smaller than the maximum diameter of larger holes 2206 (e.g., 0.15 inches, 0.125 inches, 0.1 inches, etc.). Such diameters are configured to prevent and/or lower the incident rate of an adult or child user from inserting a finger and/or kitchen utensil into housing 102 and touching an active internal component of drink maker 100 (e.g., compressor 214). In some non-limiting embodiments or aspects, baffling 2210 may further prevent object intrusion and/or penetration through ventilation panel 114 (e.g., even if an object or a user's finger is smaller than the diameter of one of the holes 2204, 2206, baffling 2210 may prevent such an object or finger from being inserted), thereby preventing injury to the user and/or damaging of drink maker 100.

In some non-limiting embodiments or aspects, a substantial portion of holes 2204, 2206 of array 2202 may be at least partly occluded by the at least one baffling 2210. For example, at least 50% of the number of holes 2204, 2206 in array 2202 may be associated with, and partly occluded by, baffling 2210, inhibiting air/liquid flow-through for at least an equal number of holes 2204, 2206. By way of another example, at least 75% of the number of holes 2204, 2206 may be associated with, and partly occluded by, baffling 2210, inhibiting air/liquid flow-through for a majority number of holes 2204, 2206. In some non-limiting embodiments or aspects, a substantial portion of a cross-sectional area of ventilation panel 114 may be dedicated to holes 2204, 2206. For example, a total cross-sectional area of array 2202 of holes 2204, 2206 (e.g., calculated by summing individual cross-sectional areas of each hole 2204, 2206) may be at least 10% of a total cross-sectional area of ventilation panel 114, where the cross-section is taken along the surface plane of ventilation panel 114. By way of further example, a total cross-sectional area of array 2202 may be at least 20% of a total cross-sectional area of ventilation panel 114. The foregoing exemplary configurations may provide enhanced airflow in and/or out of housing 102, while preventing unintentional penetration through ventilation panel 114.

In some non-limiting embodiments or aspects, the material for baffling 2210 may be selected to maximize the sound-reducing and liquid-resistant effects of baffling 2210. For example, baffling 2210 may be formed of at least one of plastic material (e.g., polypropylene, polycarbonate, polyethylene terephthalate, polystyrene, polyethylene, etc.) or elastomeric material (e.g., silicone rubber, thermoplastic elastomers, ethylene propylene diene monomer, nitrile rubber, and/or the like) configured to reflect and/or absorb sound energy from inside housing 102. By way of further example, baffling 2210 may be formed of a water- and/or oil-resistant material (e.g., stainless steel, polypropylene, silicone, nylon, polycarbonate, polyvinyl chloride, and/or the like) to reduce liquid penetration through ventilation panel 114, and to prevent such liquids from embedding and/or impregnating in ventilation panel 114.

Figure 23:
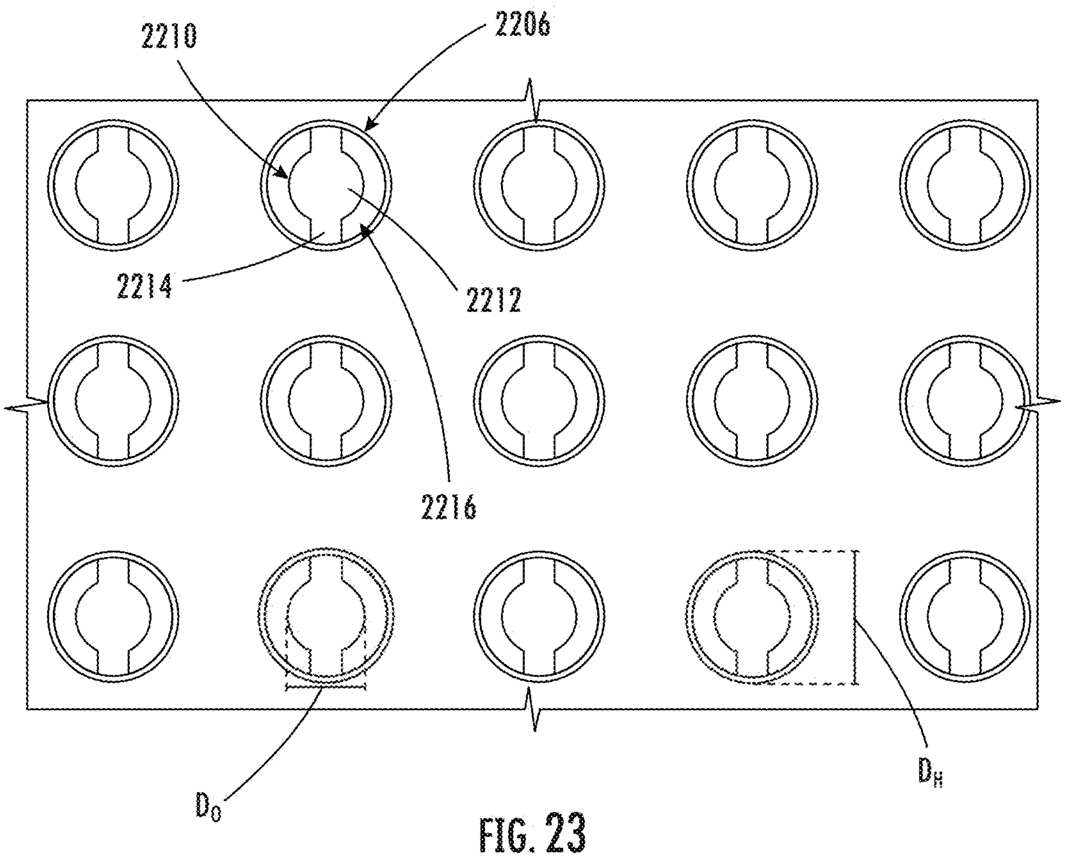
FIG. 23 is an external, close-up, side view of a ventilation panel of a drink maker, according to some non-limiting embodiments or aspects.

Referring now to FIG. 23, shown is an external, close-up, side view of ventilation panel 114 of drink maker 100, according to some non-limiting embodiments or aspects. As shown in FIG. 23, baffling 2210 may include at least one occluding portion 2212 (e.g., an element with a wider surface area than other elements of baffling 2210, such as a small plate or face) that is configured to at least partly occlude hole 2206. Gap 2216 between an inner edge of hole 2206 and an outer edge of occluding portion 2212 may permit airflow through ventilation panel 114. Each occluding portion 2212 may be connected to another occluding portion 2212 to form a larger superstructure of baffling 2210. For example, each occluding portion 2212 of baffling 2210 may be connected to another occluding portion 2212 by at least one connecting portion 2214 (e.g., an element with a narrower surface area than other elements of baffling 2210, such as an armature or a strut). In this manner, a plurality of occluding portions 2212 may be connected in a network of occluding portions 212. A set of occluding portions 2212 may be connected in series to form a strip, in parallel to form a tree and/or web, or any combination thereof. In some non-limiting embodiments or aspects, each baffling 2210 may be configured as a linear strip of occluding portions 2212 connected by a series of connecting portions 2214, such that a plurality of linear baffling 2210 strips may be used to at least partly occlude a two-dimensional array 2202 of holes 2204, 2206.

In some non-limiting embodiments or aspects, a diameter ($D_O$) of each occluding portion 2210 may be smaller than a diameter ($D_H$) of a positionally corresponding (e.g., at least partly aligned) hole 2206. In this manner, air may be permitted to flow around occluding portion 2210, through gap 2216, and through a portion of hole 2206, while also allowing baffling 2210 to be positioned against a surface of ventilation panel 114. In some non-limiting embodiments or aspects, the diameter ($D_O$) of each occluding portion 2212 may be selected to provide adequate penetration prevention vis-à-vis the diameter ($D_H$) of hole 2206. For example, diameter $D_O$ may be at least 30% of diameter $D_H$ of a positionally corresponding hole of the at least one array of holes. By way of another example, diameter $D_O$ may be at least 50% of diameter $D_H$ of a positionally corresponding hole 2206. As shown, each corresponding pair of hole 2206 and occluding portion 2212 has a substantially circular cross-section and are aligned on same center point, where diameter $D_O$ is half of diameter $D_H$. However, it will be appreciated that occluding portion 2212 and hole 2206 may have different cross-sectional geometries, relative diameters, and center points, both across configurations and within the same configuration.

Figure 24:
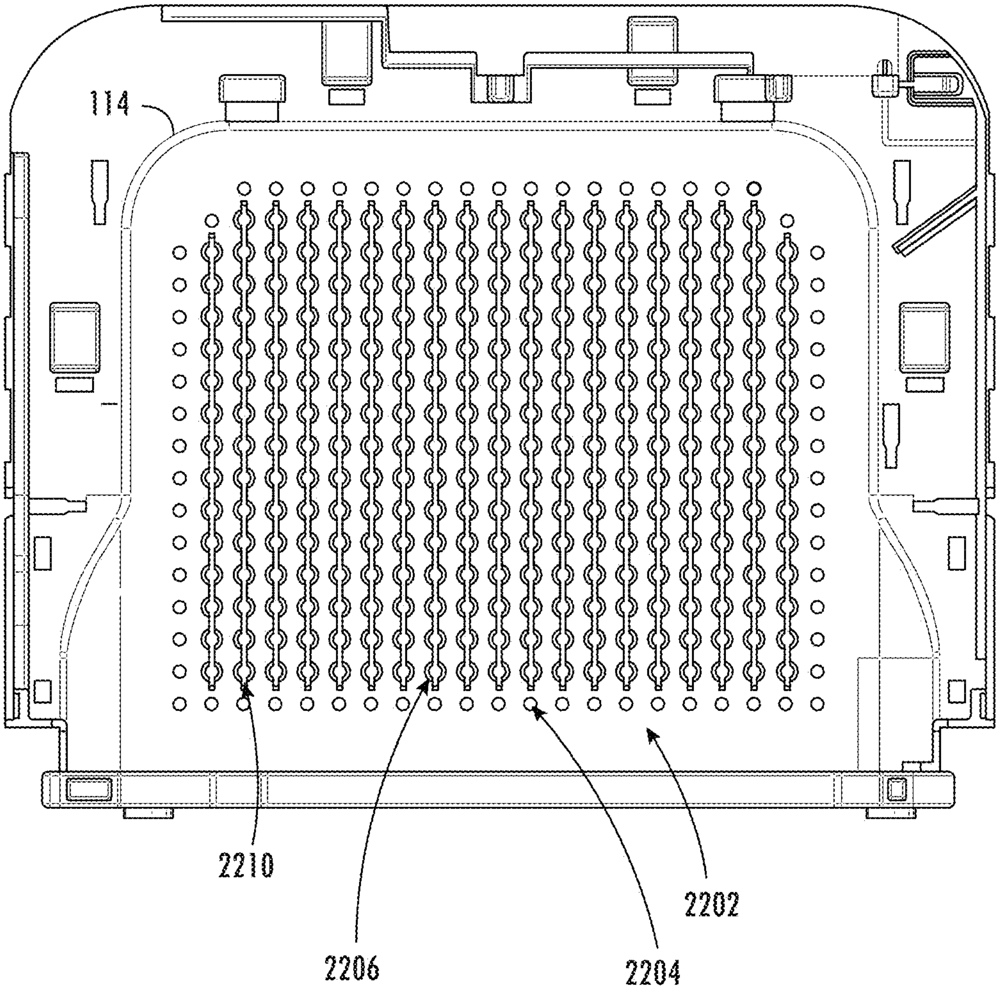
FIG. 24 is an internal, side view of a ventilation panel of a drink maker, according to some non-limiting embodiments or aspects.

Referring now to FIG. 24, shown is an internal, side view of ventilation panel 114 of drink maker 100, according to some non-limiting embodiments or aspects. FIG. 24 depicts the reverse side of ventilation panel 114, as shown in FIG. 22. As shown in FIG. 24, ventilation panel 114 includes array 2202 of holes 2204, 2206, a subset of which are at least partly occluded by baffling 2210. Each baffling 2210 is arranged as a linear strip mounted on an interior surface of ventilation panel 114. Baffling 2210 may be co-molded with ventilation panel 114, adhered to ventilation panel 114, fastened to ventilation panel 114, and/or the like. While baffling 2210 is depicted as occluding every larger hole 2206, it will be appreciated that baffling 2210 may occlude fewer than the entire set of larger holes 2206, and/or may occlude smaller holes 2204 as well. See FIG. 25 for a close-up view of baffling 2210 and holes 2204, 2206 shown in FIG. 24.

Figure 25:
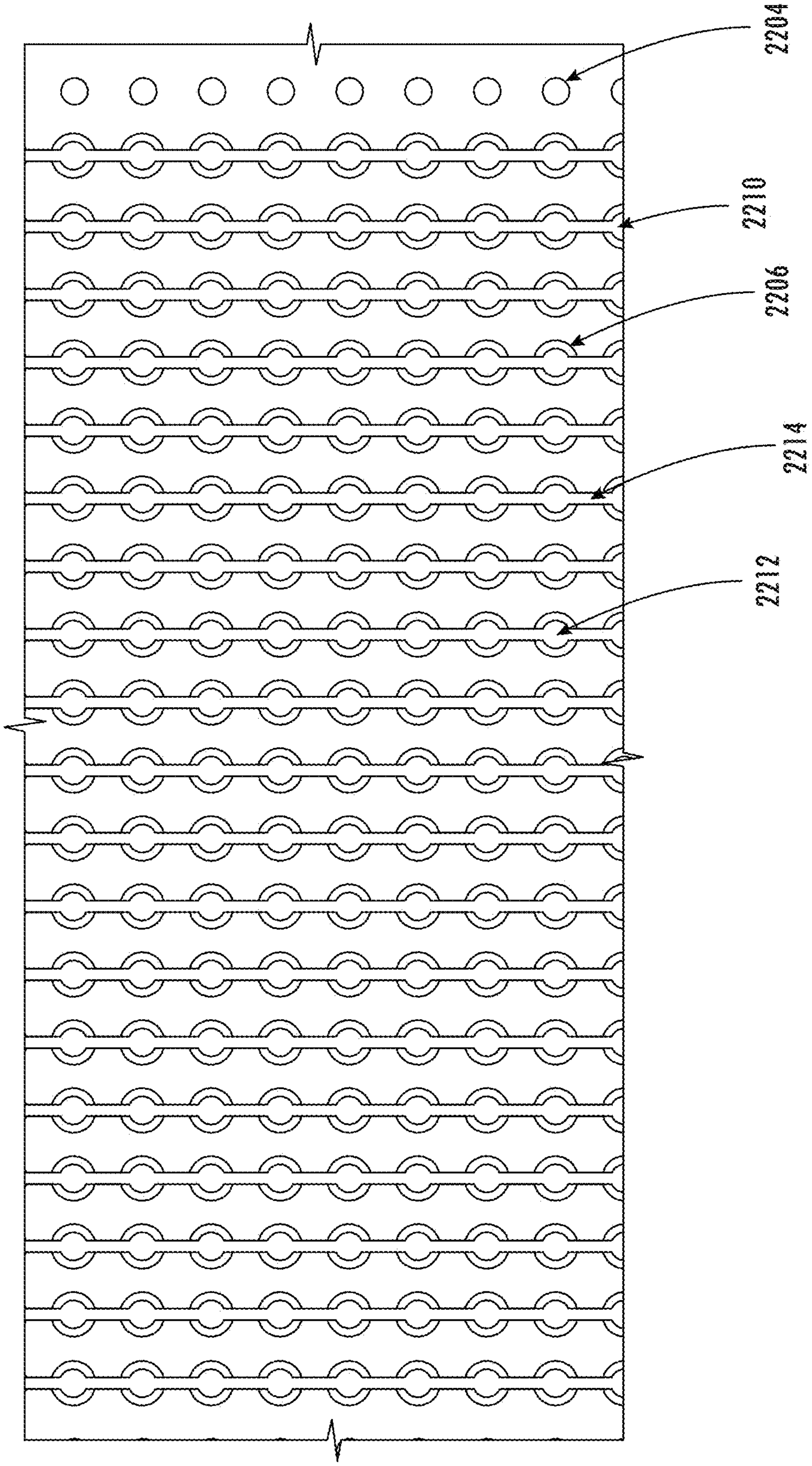
FIG. 25 is an internal, close-up, side view of a ventilation panel of a drink maker, according to some non-limiting embodiments or aspects.

Referring now to FIG. 25, shown is an internal, close-up, side view of ventilation panel 114 of drink maker 100, according to some non-limiting embodiments or aspects. As shown in FIG. 25, a plurality of baffling 2210 strips are arranged with a vertical orientation on an interior surface of ventilation panel 114, which may promote the channeling of liquid, along with the force of gravity and liquid adhesion, downward along baffling 2210 rather than further into housing 102 (e.g., in the manner of a rain chain). However, it will be appreciated that many directional arrangements are possible, including vertical orientation, horizontal orientation, diagonal orientation, or any combination thereof.

In some non-limiting embodiments or aspects, each occluding portion 2212 of a plurality of occluding portions 2212 of each baffling 2210 may positionally correspond (e.g., at least partly align) with a hole 2206 of a plurality of holes 2204, 2206 in array 2202 of ventilation panel 114. In some non-limiting embodiments or aspects, each distal end of baffling 2210 (e.g., opposing ends of baffling 2210) may be secured (e.g., co-molded, adhered, fastened, etc.) to an interior surface of ventilation panel 114. Additionally, or alternatively, one or more of the plurality of connecting portions 2214 of baffling 2210 may be secured to an interior surface of ventilation panel. In some non-limiting embodiments or aspects, each connecting portion 2214 of baffling 2210 may be secured to an interior surface of ventilation panel. The foregoing securing configurations may prevent the dislodging of baffling 2210 and prevent vibration in baffling 2210 due to the physical movement and/or sound waves produced by internal components in or associated with housing 102 (e.g., dasher 204, drive motor 208, compressor 214, fan 218, etc.).

Although embodiments have been described in detail for the purpose of illustration, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A drink maker comprising:

a mixing vessel arranged to receive a drink product, wherein the drink product is mixed within the mixing vessel;

a cooling circuit configured to cool the drink product within the mixing vessel;

a temperature sensor configured to repeatedly detect a temperature of the drink product and output temperature signals indicative of the detected temperatures; and a controller configured to:

repeatedly determine, during mixing of the drink product, a rate of change of temperature of the drink product based on the temperature signals;

determine that the rate of change of temperature of the drink product is less than or equal to a threshold rate of change;

determine that a phase change of the drink product has occurred based on determining that the rate of change of temperature of the drink product is less than or equal to the threshold rate of change, wherein the phase change occurs when at least some of the drink product has started to change from a liquid state to a solid state; and in response to determining that the phase change of the drink product has occurred, alert a user of the drink maker.

2. The drink maker of claim 1, wherein the temperature sensor is configured to, when repeatedly detecting the temperature of the drink product:

repeatedly detect the temperature of the drink product at a periodic interval in a range of about 0.1 seconds to about 5 seconds, wherein the temperature signals output from the temperature sensor are indicative of the detected temperature at a respective periodic interval.

3. The drink maker of claim 1, further comprising at least one output device, the at least one output device comprising at least one of a display, a speaker, or a light indicator, wherein the controller is configured to, when alerting the user of the drink maker:

cause the at least one output device to alert the user of the drink maker.

4. The drink maker of claim 3, wherein the at least one output device comprises at least one speaker and at least one light indicator, and wherein the controller is configured to, when alerting the user of the drink maker:

cause the at least one speaker to produce an aural alert; and cause the at least one light indicator to produce a visual alert.

5. The drink maker of claim 3, wherein the at least one output device comprises at least one speaker, and wherein the at least one output device is configured to, when caused by the controller to alert the user of the drink maker, emit a series of sounds from the at least one speaker.

6. The drink maker of claim 5, wherein the series of sounds comprises a plurality of sounds having, when produced in series, at least one of descending pitch or descending volume.

7. The drink maker of claim 5, wherein the series of sounds comprises a plurality of sounds having, when produced in series, at least one of ascending pitch or ascending volume.

8. The drink maker of claim 3, wherein the at least one output device comprises a plurality of light indicators, and wherein the at least one output device is configured to, when caused by the controller to alert the user of the drink maker, illuminate the plurality of light indicators in sequence.

9. The drink maker of claim 1, wherein the threshold rate of change has a value in a range of about 0.002 degrees Celsius/second to about 0.006 degrees Celsius/second.

10. The drink maker of claim 1, further comprising at least one output device, the at least one output device comprising at least one of a display, a speaker, or a light indicator, wherein the controller is configured to, when alerting the user of the drink maker:

cause the at least one output device to alert the user of the drink maker that the phase change has occurred.

* * * * *